US012726351B1

(12) United States Patent
Kushwaha et al.

(10) Patent No.: US 12,726,351 B1
(45) Date of Patent: Sep. 1, 2026

(54) SYSTEMS AND METHODS FOR DECENTRALIZED RECOVERABLE STORAGE OF PRIVATE DATA AND ANONYMIZED, CONFIDENTIAL, MESSAGE EXCHANGE SECURED BY USER BIOMETRICS

(71) Applicant: Seventh Sense Artificial Intelligence Private Limited, Singapore (SG)

(72) Inventors: Ashish Kushwaha, Singapore (SG); Varun Chatterji, Singapore (SG)

(73) Assignee: Seventh Sense Artificial Intelligence Private Limited, Singapore (SG)

( * ) Notice: Subject to any disclaimer, the term of this patent is extended or adjusted under 35 U.S.C. 154(b) by 0 days.

(21) Appl. No.: 19/457,944

(22) Filed: Jan. 23, 2026

(30) Foreign Application Priority Data

Dec. 18, 2025 (SG) .......................... 10202503787Q

(51) Int. Cl.
*H04L 9/08* (2006.01)
*H04L 9/32* (2006.01)

(52) U.S. Cl.
CPC .......... *H04L 9/0894* (2013.01); *H04L 9/0866* (2013.01); *H04L 9/3228* (2013.01); *H04L 9/3231* (2013.01)

(58) Field of Classification Search
CPC ... H04L 9/0894; H04L 9/0866; H04L 9/3228; H04L 9/3231

(Continued)

(56) References Cited

U.S. PATENT DOCUMENTS 8,024,784 B1 * 9/2011 Issa .................... H04L 63/0281 713/153
2020/0136824 A1 * 4/2020 Allen ...................... H04L 9/30

(Continued)

OTHER PUBLICATIONS

International Organization for Standardization and International Electrotechnical Commission, "Information Security, Cybersecurity and Privacy Protection—Biometric Information Protection," ISO/IEC 24745:2022(E), 2nd edition (2022).

(Continued)

*Primary Examiner* — Michael S McNally
(74) *Attorney, Agent, or Firm* — Ansari Katiraei LLP; Sadiq Ansari

(57) ABSTRACT

Systems, methods, and computer-readable media are described for decentralized, recoverable storage of private data and anonymized, confidential message exchange secured by user biometrics. A user device derives temporary cryptographic keys from biometric data and a personal identification number to encrypt a recovery token containing a master password. The master password is further used with biometric data to encrypt a secure data store containing sensitive user information. The temporary cryptographic keys are discarded without persistent storage, preventing recovery by unauthorized parties. The encrypted recovery token may be encoded for offline storage and later used to restore access to the secure data store without reliance on centralized credential storage. Secure data stores may be updated, versioned, and retrieved from a remote recovery system that is unable to decrypt their contents. The described techniques provide privacy-preserving authentication, secure account recovery, and protection against credential compromise while enabling user-controlled data access.

20 Claims, 42 Drawing Sheets

(58) Field of Classification Search
USPC .......................................................... 380/286
See application file for complete search history.

(56) References Cited

U.S. PATENT DOCUMENTS

2022/0216996 A1* 7/2022 Taylor ................... H04L 9/0866
2024/0160629 A1* 5/2024 Srivastava ........ G06F 16/24545
2024/0170113 A1* 5/2024 Schneider ............... G06F 21/64
2025/0141682 A1* 5/2025 Hutchinson ............. G06F 21/32
2025/0211434 A1* 6/2025 Kerschbaum ......... H04L 9/0894
2025/0266987 A1* 8/2025 Bennison .............. H04L 9/0819
2026/0019245 A1* 1/2026 Nakamura ............. G06F 21/32

OTHER PUBLICATIONS

International Organization for Standardization and International Electrotechnical Commission, "Information Technology—Performance Testing of Biometric Template Protection Schemes," ISO/IEC 30136:2018(E), 1st edition (2018).

* cited by examiner

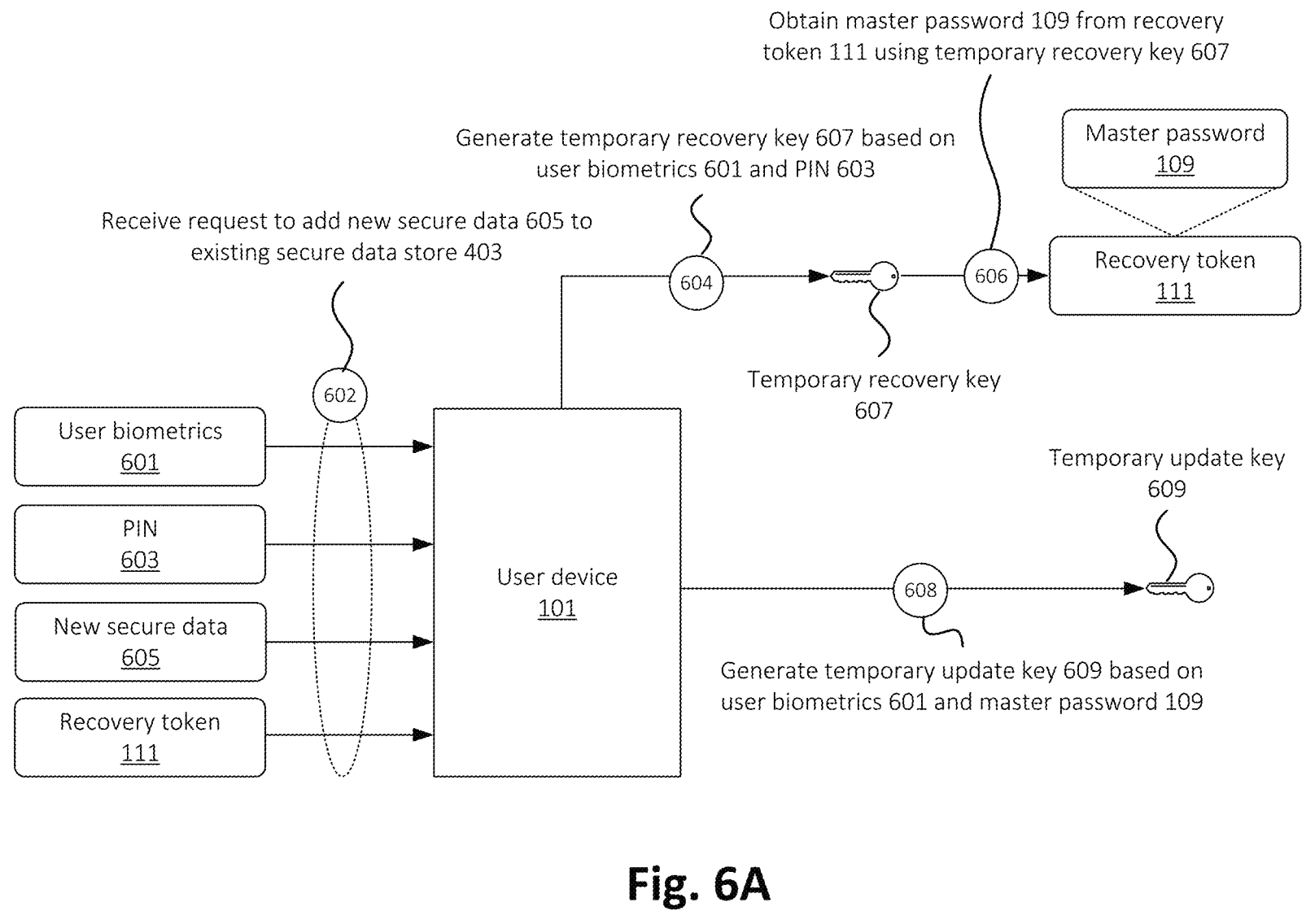

User biometrics 601

PIN 603

New secure data 605

Recovery token 111

602 Receive request to add new secure data 605 to existing secure data store 403

User device 101

604 Generate temporary recovery key 607 based on user biometrics 601 and PIN 603

Temporary recovery key 607

606 Obtain master password 109 from recovery token 111 using temporary recovery key 607

Master password 109

Recovery token 111

608 Generate temporary update key 609 based on user biometrics 601 and master password 109

Temporary update key 609

Fig. 6A

Figure 6B:
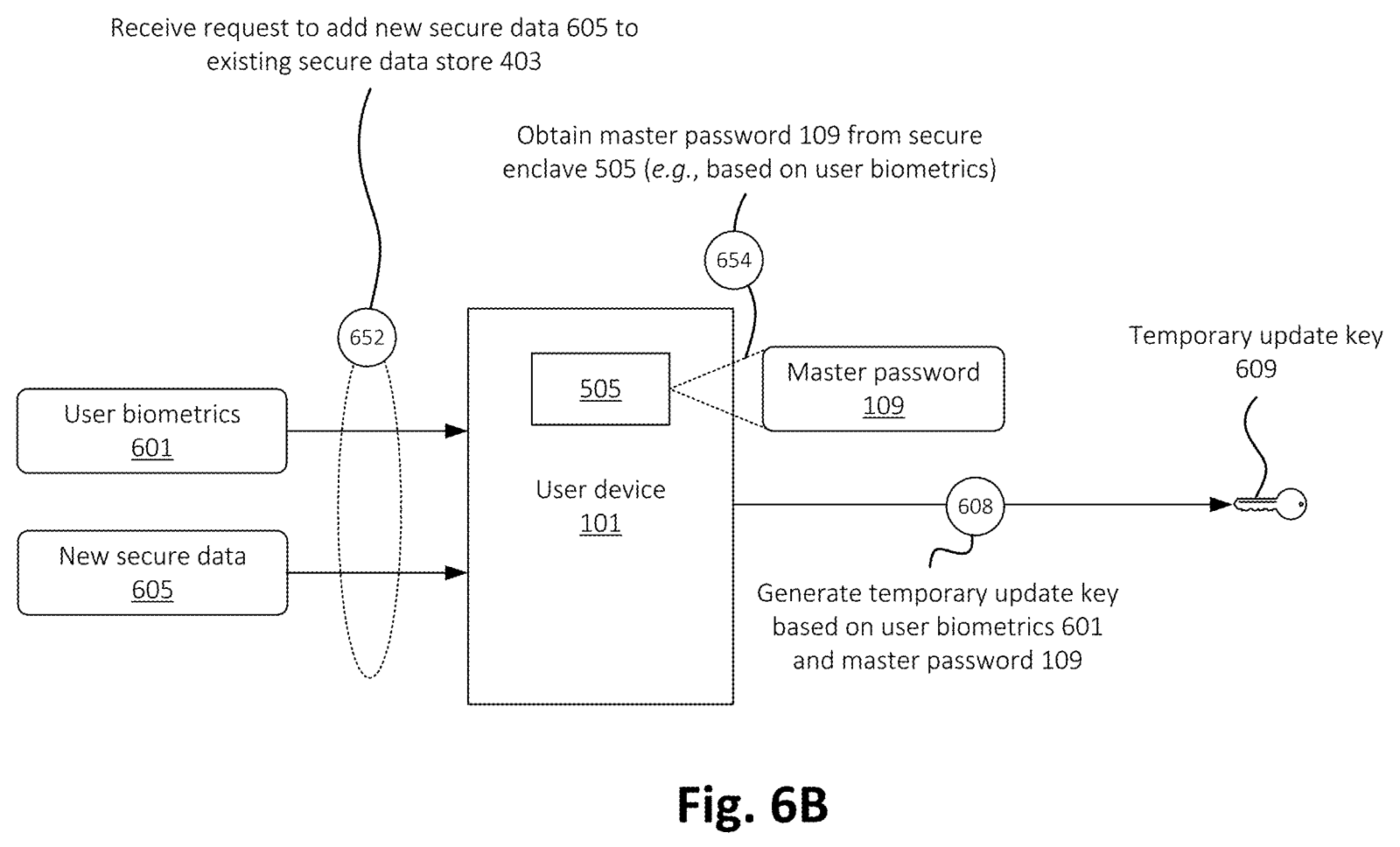

Receive request to add new secure data 605 to existing secure data store 403

652

User biometrics 601

New secure data 605

Obtain master password 109 from secure enclave 505 (*e.g.*, based on user biometrics)

654

505

User device 101

Master password 109

608

Generate temporary update key based on user biometrics 601 and master password 109

Temporary update key 609

| Session ID | Activation tokens |
| --- | --- |
| *Session_1* | *T1, T2* |
| *Session_2* | *T3, T4* |
| *Session_3* | *T5, T6* |

Fig. 15C

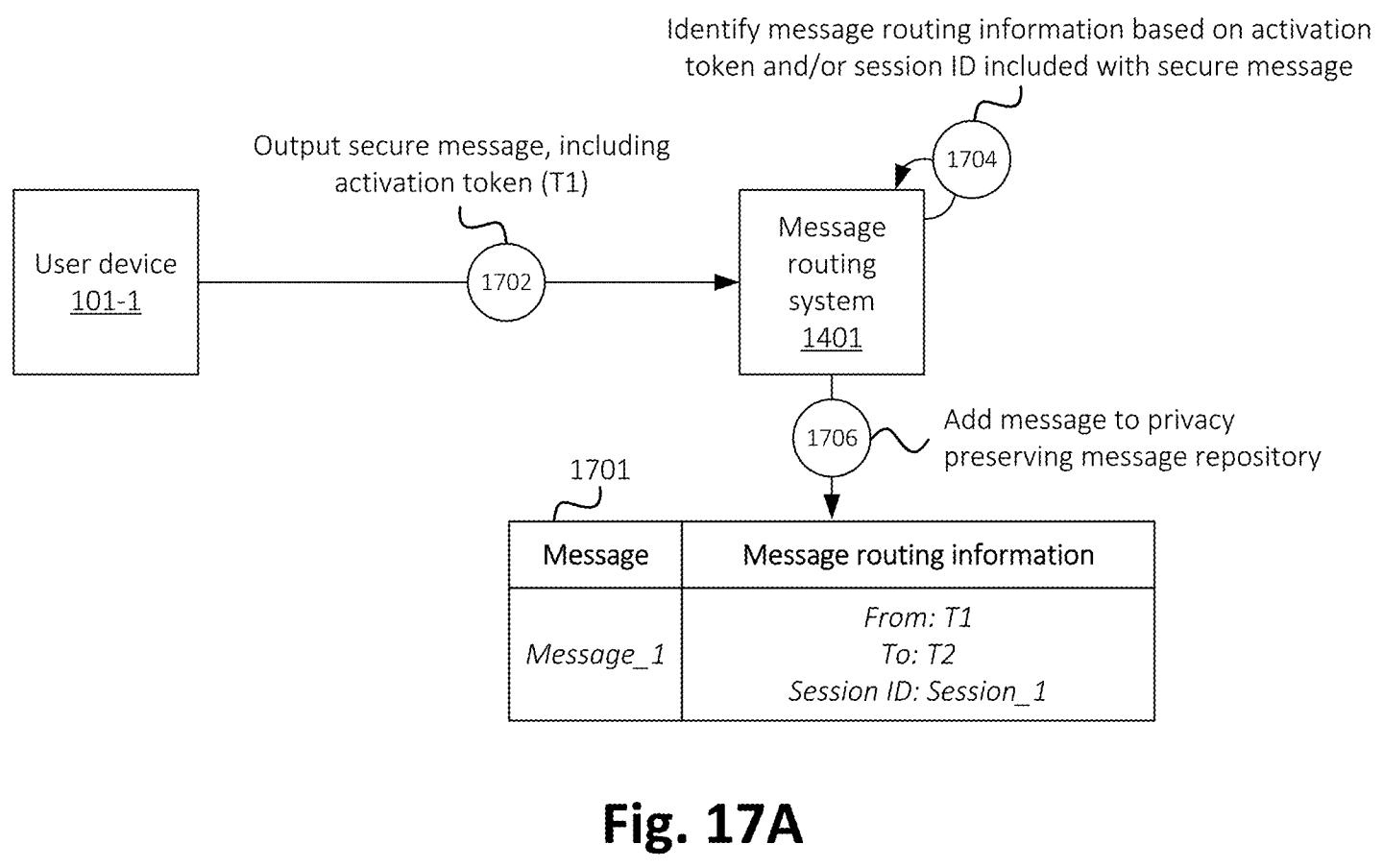

User device
101-1

1702
Output secure message, including activation token (T1)

Message routing system
1401

1704
Identify message routing information based on activation token and/or session ID included with secure message 1706
Add message to privacy preserving message repository

1701

| Message | Message routing information |
| --- | --- |
| *Message_1* | *From: T1*<br>*To: T2*<br>*Session ID: Session_1* |

Fig. 17A

SYSTEMS AND METHODS FOR DECENTRALIZED RECOVERABLE STORAGE OF PRIVATE DATA AND ANONYMIZED, CONFIDENTIAL, MESSAGE EXCHANGE SECURED BY USER BIOMETRICS

BACKGROUND

As reliance on digital services for banking, communication, and other types of sensitive data storage continues to grow, so does the need for robust identity verification and account recovery mechanisms. Traditional authentication methods typically rely on centralized servers to store user credentials, such as password hashes or symmetric keys. Consequently, these centralized repositories have become high-value targets for malicious actors. A single breach can compromise millions of user accounts. Furthermore, conventional account recovery mechanisms, which often rely on mechanisms such as email resets or Short Message Service ("SMS") messages, are increasingly vulnerable to interception, Subscriber Identification Module ("SIM") swapping, social engineering attacks, and other attack vectors.

BRIEF DESCRIPTION OF THE DRAWINGS

FIGS. 6A-6E demonstrate methods and schemas for updating a secure data store, including generating temporary update keys, modifying encrypted data, and managing data store versions.

FIGS. 15A-15E detail the establishment of a communication session, including the generation of an activation bundle and activation tokens by a message routing system.

FIGS. 17A and 17B show the routing of secure messages to a privacy-preserving repository and the subsequent retrieval of queued messages by a recipient device.

DETAILED DESCRIPTION OF EXAMPLE EMBODIMENTS

The following detailed description refers to the accompanying drawings. The same reference numbers in different drawings may identify the same or similar elements.

Figure 1:
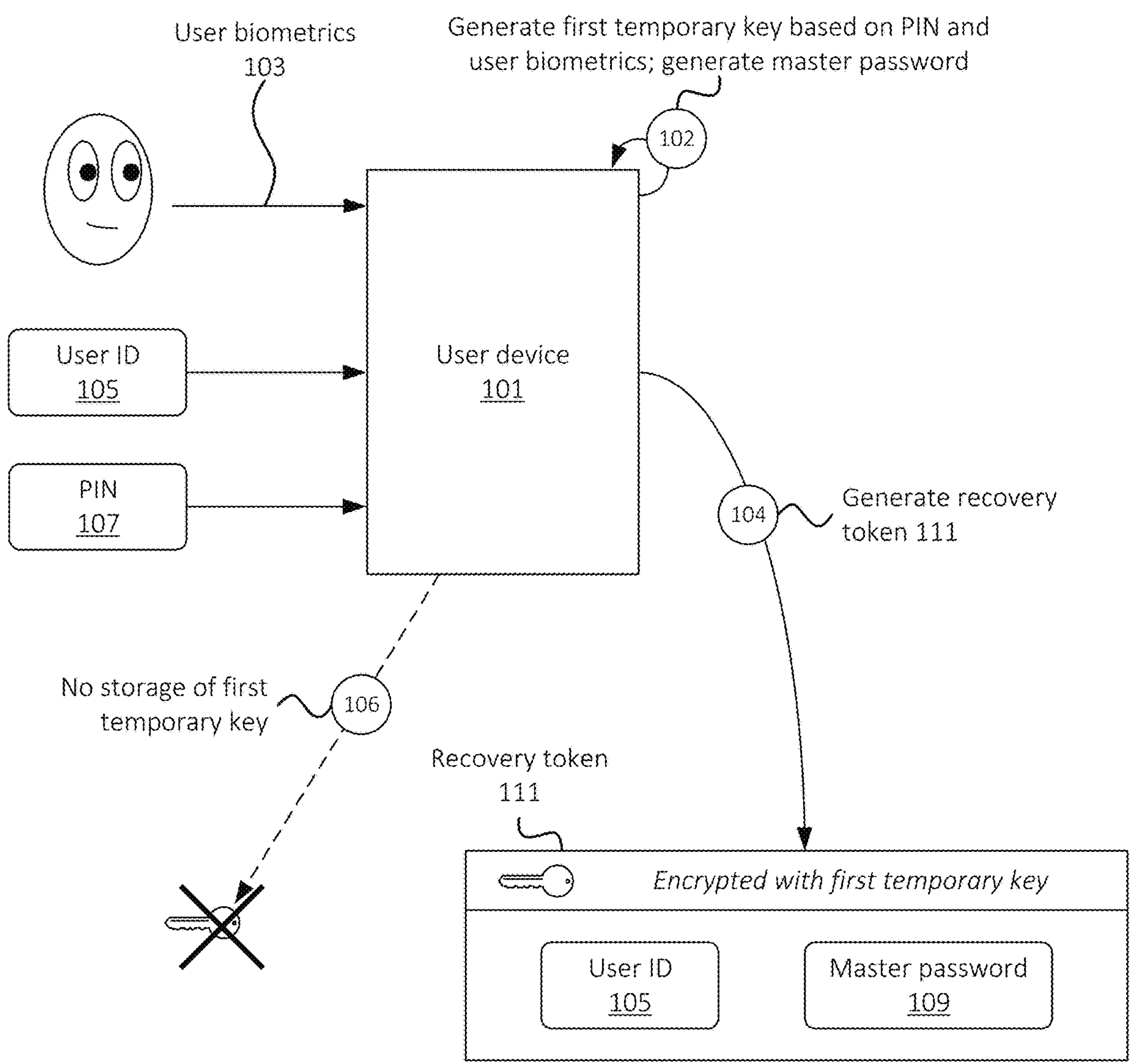
FIG. 1 illustrates a system and process for generating a recovery token and a first temporary key based on user biometrics and a Personal Identification Number (PIN).

FIG. 1 is a block diagram illustrating the generation of cryptographic recovery materials based on user-specific inputs, in accordance with some embodiments. As shown, a particular user device 101, which may be a personal computing device such as a smartphone, tablet, laptop, etc. may receive input data such as user biometrics 103, such as a facial scan or fingerprint captured by a sensor on the user device 101, a user identifier 105, such as an email address or mobile phone number, and a PIN 107. For example, user device 101 may execute or implement an application, an application programming interface ("API"), an software development kit ("SDK"), or the like, that facilitates the security and recovery mechanisms described herein.

As shown, user device 101 may generate (at 102) a first temporary key based on user biometrics 103 and PIN 107. In some embodiments, generating the first temporary key may include performing one or more suitable cryptographic operations, Key Derivation Function ("KDF") operations, transformations, or variance detection mechanisms, key derivation operations, and/or other suitable types of operations based on user biometrics 103 and PIN 107 (e.g., using user biometrics 103 and PIN 107 as input for such operations).

User device 101 may further generate master password 109 in accordance with some embodiments. In some embodiments, master password 109 may be a random value (e.g., a 32-byte string, a 64-byte string, or some other type of cryptographically secure value), which may serve as a root secret for the system. As discussed below, master password 109 may be used in the secure storage of sensitive data, such as One-Time Password ("OTP") seeds, private keys used in secure messaging protocols, personally identifiable information ("PII"), or other types of data that should remain secure and private.

User device 101 may additionally generate (at 104) recovery token 111. In some embodiments, recovery token 111 may include or may be a secure data store, such as a privacy-preserving data structure ("PPDS") containing a renewable biometric reference, as defined in the International Organization for Standardization ("ISO")/International Electrotechnical Commission ("IEC") 30136:2018 standard, the contents of which are incorporated herein by reference. Recovery token 111 may be or may include a data structure that includes user identifier 105, master password 109, and/or other suitable information.

In accordance with some embodiments, recovery token 111 (e.g., the contents stored therein) may be encrypted using the first temporary key (generated at 102). Consequently, as discussed in more detail below, master password 109 is secured such that it is only accessible upon re-derivation of the first temporary key (e.g., a fresh key that matches the first temporary key) via a subsequent collection of user biometrics (e.g., which match the original user biometrics 103, subject to variance detection mechanisms, which may aid in working with biometrics collected under different conditions such as different lighting conditions, different angles of a facial scan, etc.) and a PIN (e.g., a PIN matching PIN 107).

In some embodiments, recovery token 111 may include or may be associated with metadata and/or other additional information that is not encrypted with the same mechanisms that are used to encrypt user identifier 105 and master password 109. In some embodiments, the metadata (e.g., which is not encrypted with the first temporary key) may include information derived from or otherwise associated with user biometrics 103 and/or one or more other inputs used to generate the first temporary key.

As further shown, user device 101 may forgo storing (at 106) the first temporary key. For example, user device 101 may forgo storing the first temporary key in persistent memory, may discard the first temporary key after using it to secure (e.g., encrypt) recovery token 111, and/or may otherwise not store the first temporary key. For example, upon completion of the encryption of recovery token 111, user device 101 may delete (at 106) the first temporary key from a volatile memory of the user device 101. This operation prevents the first temporary key from being recovered from the device storage, ensuring that the master password 109 remains protected even if the user device 101 is subsequently compromised.

Figure 2:
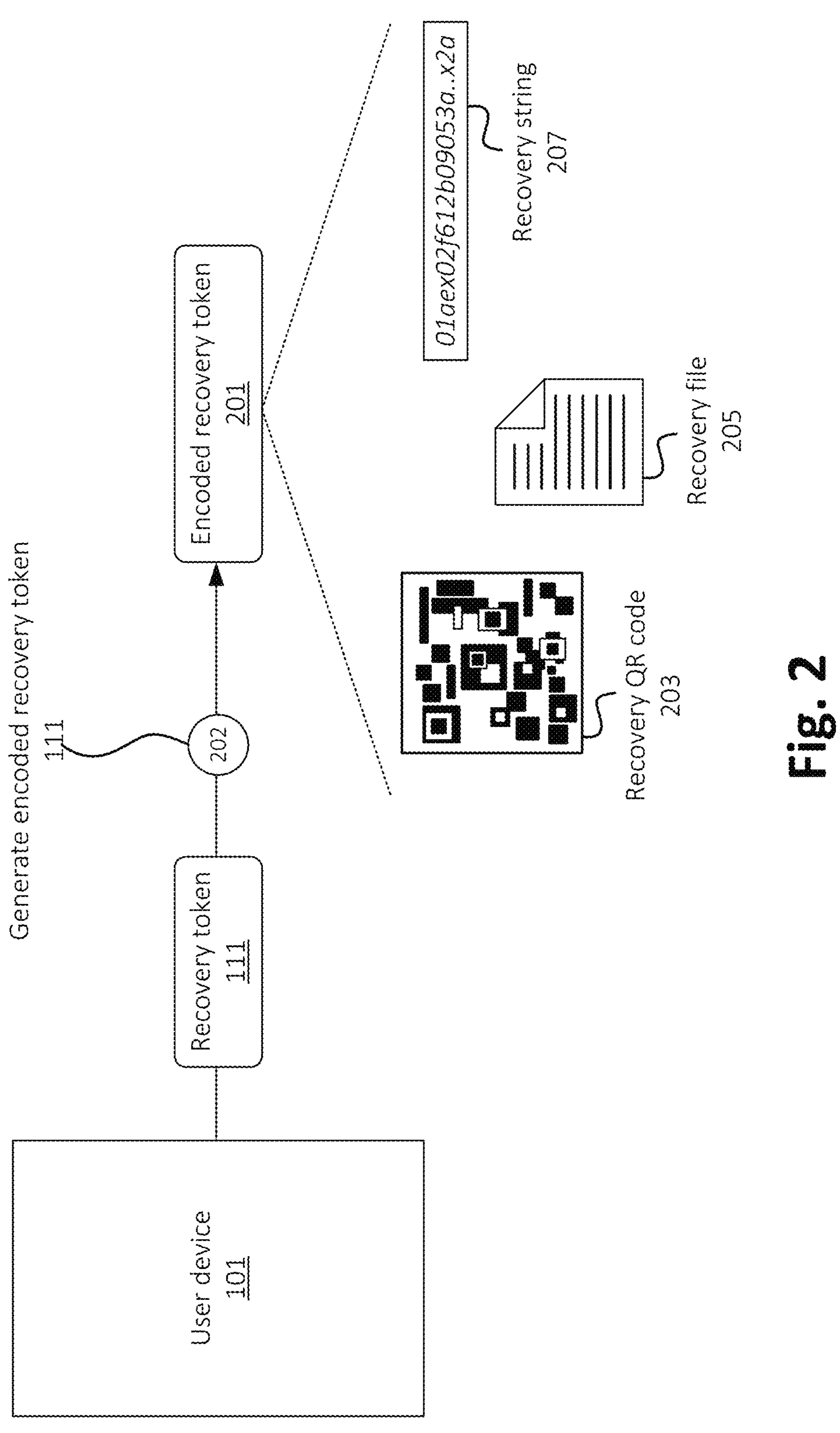
FIG. 2 depicts the encoding of a recovery token into a machine-readable format, such as a QR code or recovery file.

FIG. 2 is a schematic diagram illustrating encoding of a recovery token (e.g., recovery token 111) into a machine-readable format for secure external storage (e.g., which may include storing such information external to user device 101), in accordance with some embodiments. As shown, user device 101 may encode (at 202) on recovery token 111 (e.g., generated as described above with respect to FIG. 1). For example, in some embodiments, user device 101 may convert binary, encrypted, and/or serialized data of recovery token 111 into encoded recovery token 201 suitable for export, display, and/or non-volatile storage.

In some embodiments, encoded recovery token 201 may include metadata such as API calls, application information, etc., which may be used to identify that encoded recovery token 201 is able to be parsed or otherwise analyzed in order to extract recovery token 111. Encoded recovery token 201 may be formatted in various machine-readable or human-readable representations. In one embodiment, encoded recovery token 201 is rendered as recovery quick response ("QR") code 203. Recovery QR code 203 may include, for example, the encrypted payload of recovery token 111 encoded into a two-dimensional matrix barcode. As discussed above, recovery QR code 203 may include metadata and/or other suitable information.

In another embodiment, encoded recovery token 201 is formatted as recovery file 205 (e.g., a JavaScript Object Notation ("JSON") file, an Extensible Markup Language ("XML") file, a binary file, a text file, etc.) that facilitates saving to a storage medium. In yet another embodiment, encoded recovery token 201 is represented as recovery string 207 (e.g., a Base64 encoded string, a Hexadecimal string, or other character string). For example, recovery string 207 may be displayed to a user to be printed, written down, or copied. In this manner, encoded recovery token 201 (e.g., which may include recovery QR code 203, recovery file 205, recovery string 207, etc.) may ultimately include encrypted master password 109 and user identifier 105 without exposing such information in plaintext, ensuring secure portability of such information.

Figure 3:
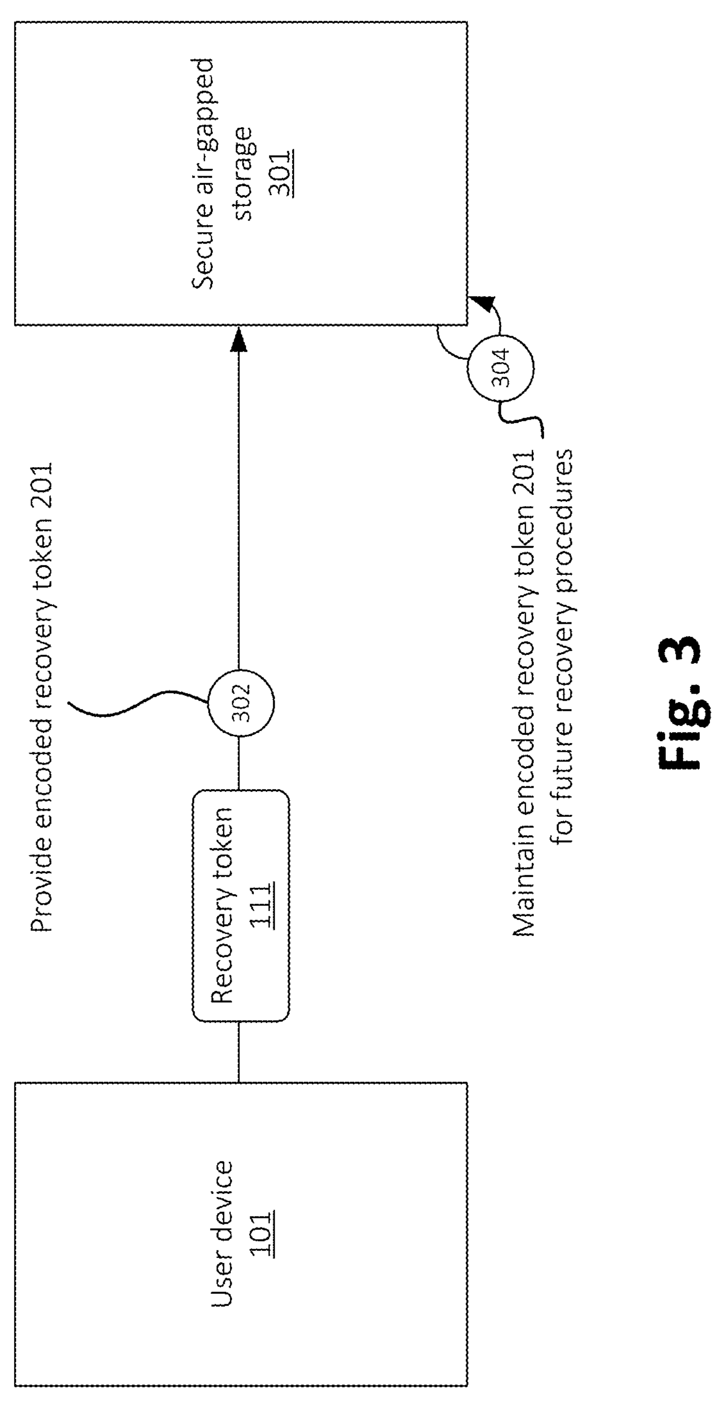
FIG. 3 shows the transfer and maintenance of an encoded recovery token in a secure air-gapped storage environment.

FIG. 3 is a schematic diagram illustrating secure storage of an encoded recovery token (e.g., encoded recovery token 201). For example, as shown, user device 101 may provide (at 302) encoded recovery token 201 to secure air-gapped storage 301. For example, providing at 302 may include user device 101 displaying recovery QR code 203 to be scanned by an offline device, saving recovery file 205 to a removable storage medium (e.g., a Universal Serial Bus ("USB") drive, an external hard drive, etc.) that is disconnected from a network, or displaying recovery string 207 for manual transcription.

Secure air-gapped storage 301 may be or may include a physical storage medium or environment that is physically isolated from unsecured networks (e.g., the Internet). In some embodiments, secure air-gapped storage 301 may include a physical safe, a printed piece of paper, a cold storage cryptocurrency wallet, a disconnected computing device, or other suitable storage mechanism. In other example, although FIG. 3 is presented in the context of an "air-gapped" storage, similar concepts may apply to the transfer of recovery token 111 to some other device that is not air-gapped (e.g., is connected to the Internet and/or one or more other networks or devices), but is otherwise considered safe, secure, or trusted.

As further shown, secure air-gapped storage 301 may maintain (at 304) encoded recovery token 201 for future recovery procedures. By maintaining encoded recovery token 201 in an air-gapped state, the system ensures that master password 109 remains protected from remote network-based attacks, malware, or unauthorized remote access, while remaining available to a user for account recovery (e.g., as described below with respect to FIGS. 6A and 9A-9C). For example, any security or authentication mechanism, which can be implemented by secure air-gapped storage 301, can be leveraged to further secure encoded recovery token 201 from unauthorized access.

Figure 4:
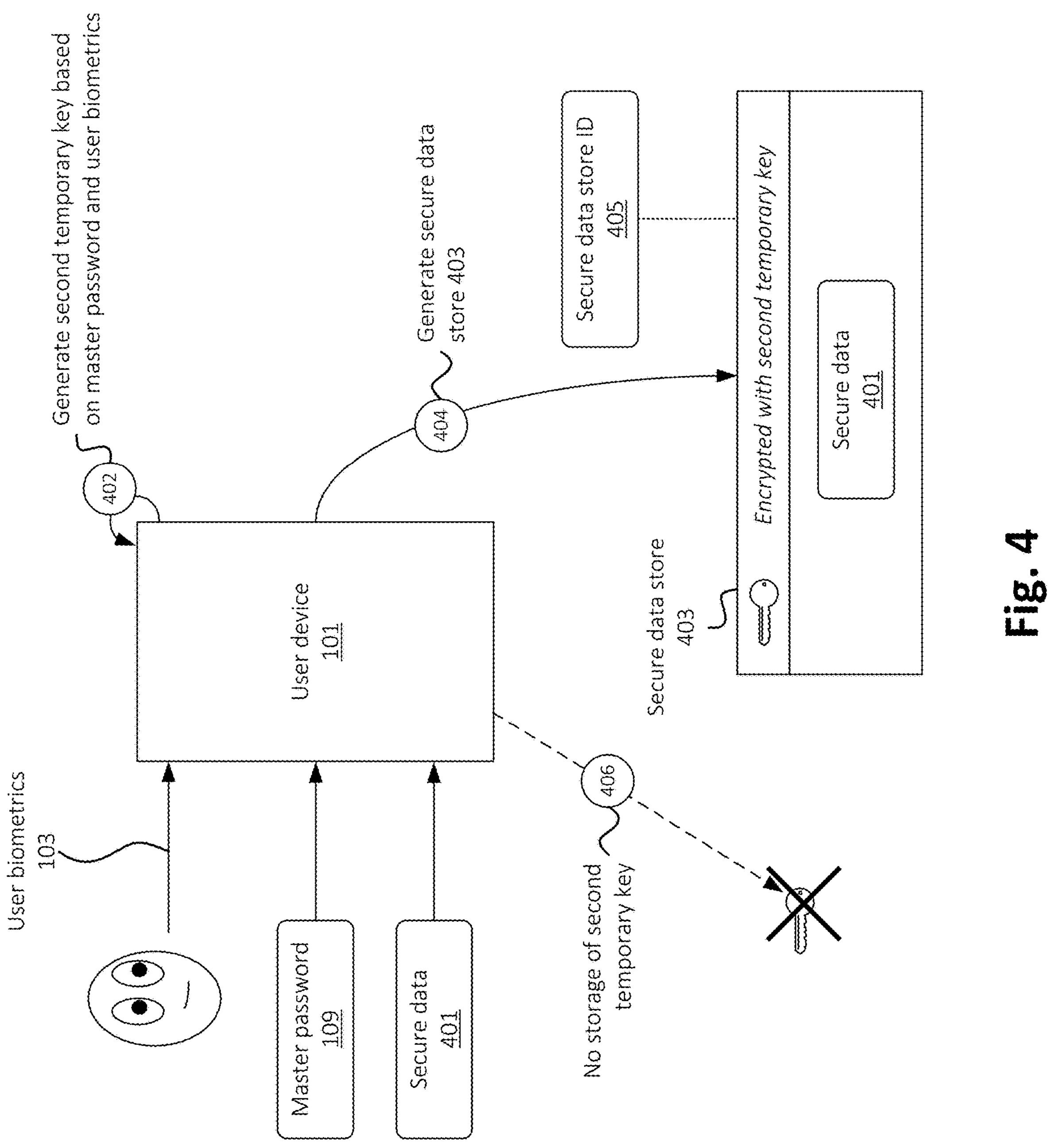
FIG. 4 details the generation of a secure data store encrypted with a second temporary key derived from a master password and user biometrics.

FIG. 4 is a block diagram illustrating generation of a secure data store (e.g., which may include a PPDS or some other type of secure data structure) encrypted with a second temporary key derived from a master password (e.g., which may be master password 109, as stored in recovery token 111, as discussed above) and user biometrics 103, in accordance with some embodiments. As shown, user device 101 may receive or access master password 109. In some embodiments, "receiving" master password 109, in this context, may include or may be tied to the generation (at 102) of master password 109, as performed in a procedure in which recovery token 111 is generated.

As further shown, user device 101 may receive user biometrics 103 and secure data 401. In some embodiments, user biometrics 103 may refer to the same user biometrics 103 received by user device 101 as part of the procedure by which recovery token 111 is generated. For example, user biometrics 103 in FIGS. 1 and 4 may refer to the same input of user biometrics 103 (e.g., the same face scan, the same fingerprint scan, etc.). Secure data 401 may include sensitive user information, such as cryptographic private keys (e.g., Module-Lattice-Based Key-Encapsulation Mechanism ("ML-KEM") keys, Module-Lattice-Based Digital Signature Algorithm ("ML-DSA") keys), private keys of one or more asymmetric key pairs, the OTP seeds, secure notes, contact lists, application passwords, or other suitable confidential data.

User device 101 may generate (at 402) a second temporary key based on master password 109 and user biometrics 103. In some embodiments, generating the second temporary key may include performing a KDF operation or other cryptographic operation, in which master password 109 and user biometrics 103 are used as inputs. User device 101 may further generate (at 404) secure data store 403. Secure data store 403 may be a data structure (e.g., a PPDS) configured to store secure data 401 in an encrypted format.

As shown, secure data store 403 may be encrypted using the second temporary key (generated at 402). Because the second temporary key is derived from master password 109 (which is not stored on or transmitted to a server such as an application server, an authentication system, etc.) and user biometrics 103, the contents of secure data store 403 ultimately remain inaccessible to any entity other than a user that initially provided user biometrics 103. For example, even a server or other device that hosts, stores, etc. secure data store 403, is unable to access the contents of secure data store 403.

As similarly discussed above with respect to recovery token 111, secure data store 403 may, in some embodiments, include or may be associated with metadata and/or other additional information that is not encrypted with the same mechanisms that are used to encrypt secure data 401. In some embodiments, such metadata and/or additional information may include secure data store identifier ("ID") 405. Secure data store ID 405 may be a unique identifier (e.g., a Universally Unique Identifier ("UUID"), a hash of user identifier 105, or other tag) used to reference secure data store 403 in storage and retrieval operations. In some embodiments, the metadata (e.g., which is not encrypted with the second temporary key) may include additional or different information, which may include information derived from or otherwise associated with user biometrics 103 and/or one or more other inputs used to generate the second temporary key.

As further shown, user device 101 may forgo storing (at 406) the second temporary key. For example, similar to operation 106 described in FIG. 1, user device 101 may delete the second temporary key from volatile memory immediately after encrypting secure data store 403, preventing the key from being persisted to disk or recovered by unauthorized processes.

Figure 5A:
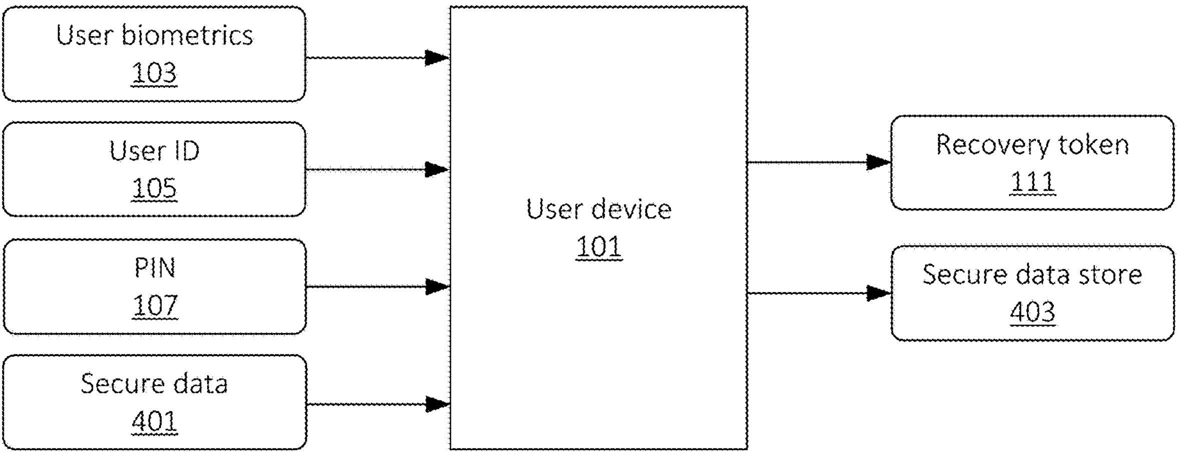
FIGS. 5A-5D present various configurations for generating and securing recovery tokens and secure data stores, including cryptographic key hierarchies and the use of device secure enclaves.

FIG. 5A is a block diagram illustrating simultaneous generation of a recovery token and a secure data store on a user device (e.g., based on the same occurrence of receiving user biometrics 103), in accordance with some embodiments. As shown, user device 101 may receive multiple inputs including user biometrics 103, user identifier 105, PIN 107, and secure data 401. In some embodiments, these inputs may be received in a single session or workflow (e.g., a registration procedure in which a user opts to initiate secure data store 403, such as to securely store secure data 401, along with a new recovery token 111 associated with such secure data store 403). Based on these inputs, user device 101 may generate recovery token 111 (e.g., containing master password 109 and user identifier 105) and secure data store 403 (e.g., containing secure data 401), according to procedures described above with respect to FIGS. 1-4.

Figure 5B:
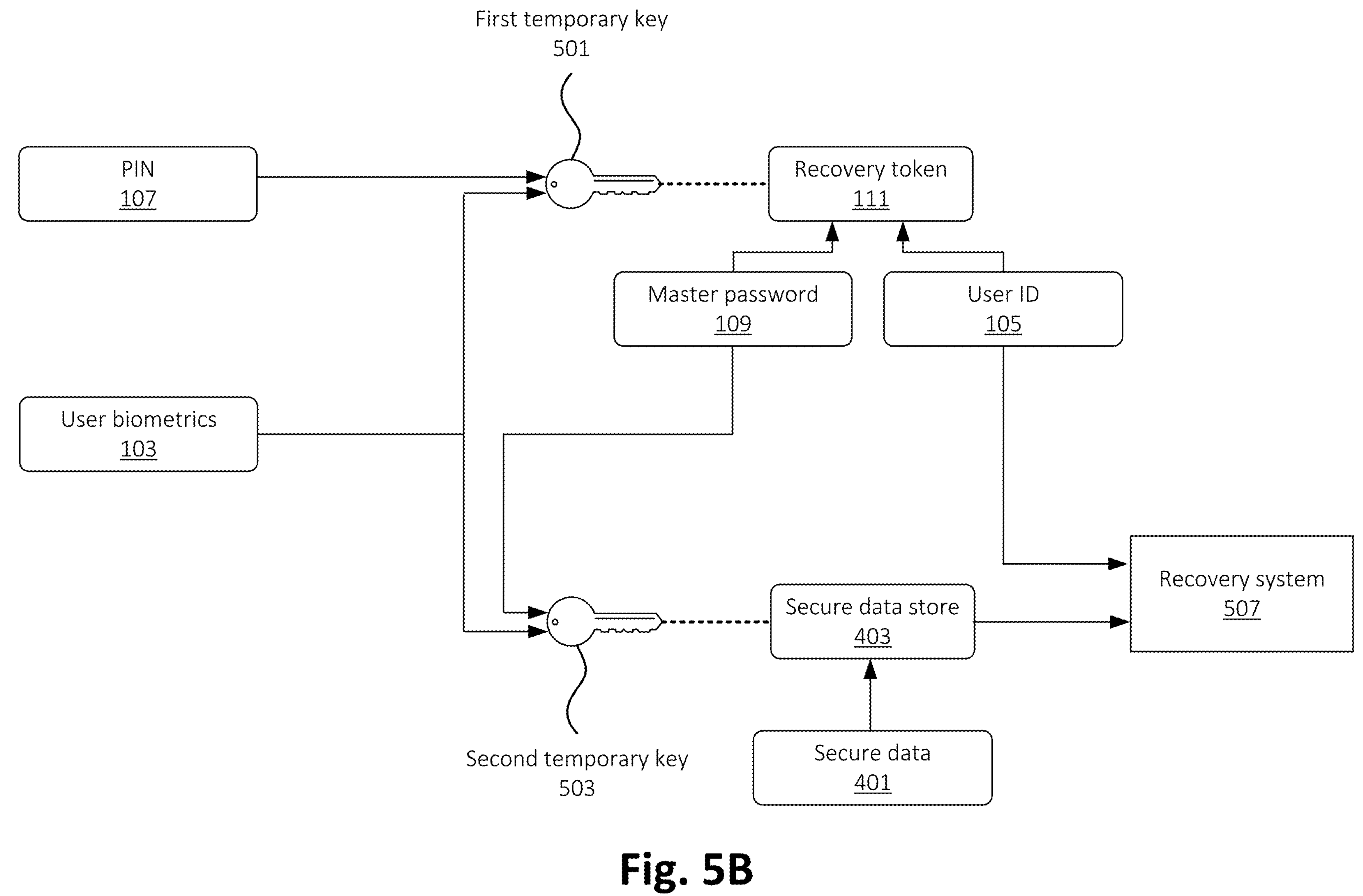

FIG. 5B is a schematic diagram illustrating a cryptographic key hierarchy for encrypting a recovery token (e.g., recovery token 111) and a secure data store (e.g., secure data store 403), in accordance with some embodiments. As shown, and as similarly discussed above, user device 101 may generate first temporary key 501 based on PIN 107 and user biometrics 103. In some embodiments, this generation corresponds to operation 102 described above with respect to FIG. 1. First temporary key 501 may be used to encrypt recovery token 111, effectively securing master password 109 and user identifier 105 within recovery token 111. Additionally, user device 101 may generate second temporary key 503 based on master password 109 and user biometrics 103. In some embodiments, this generation corresponds to operation 402 described above with respect to FIG. 4.

Second temporary key 503 is used to encrypt secure data store 403 (containing secure data 401). As further shown, encrypted recovery token 111 and encrypted secure data store 403 may be transmitted to recovery system 507. Recovery system 507 may include a remote server, cloud infrastructure, or distributed database configured to persist user data. Because the decryption keys (e.g., first temporary key 501 and second temporary key 503) are derived from inputs known and/or available only to the user (e.g., user biometrics 103 and PIN 107) or generated locally (master password 109), recovery system 507 is able to host or store secure data store 403, without being able to decrypt secure data store 403.

Figure 5C:
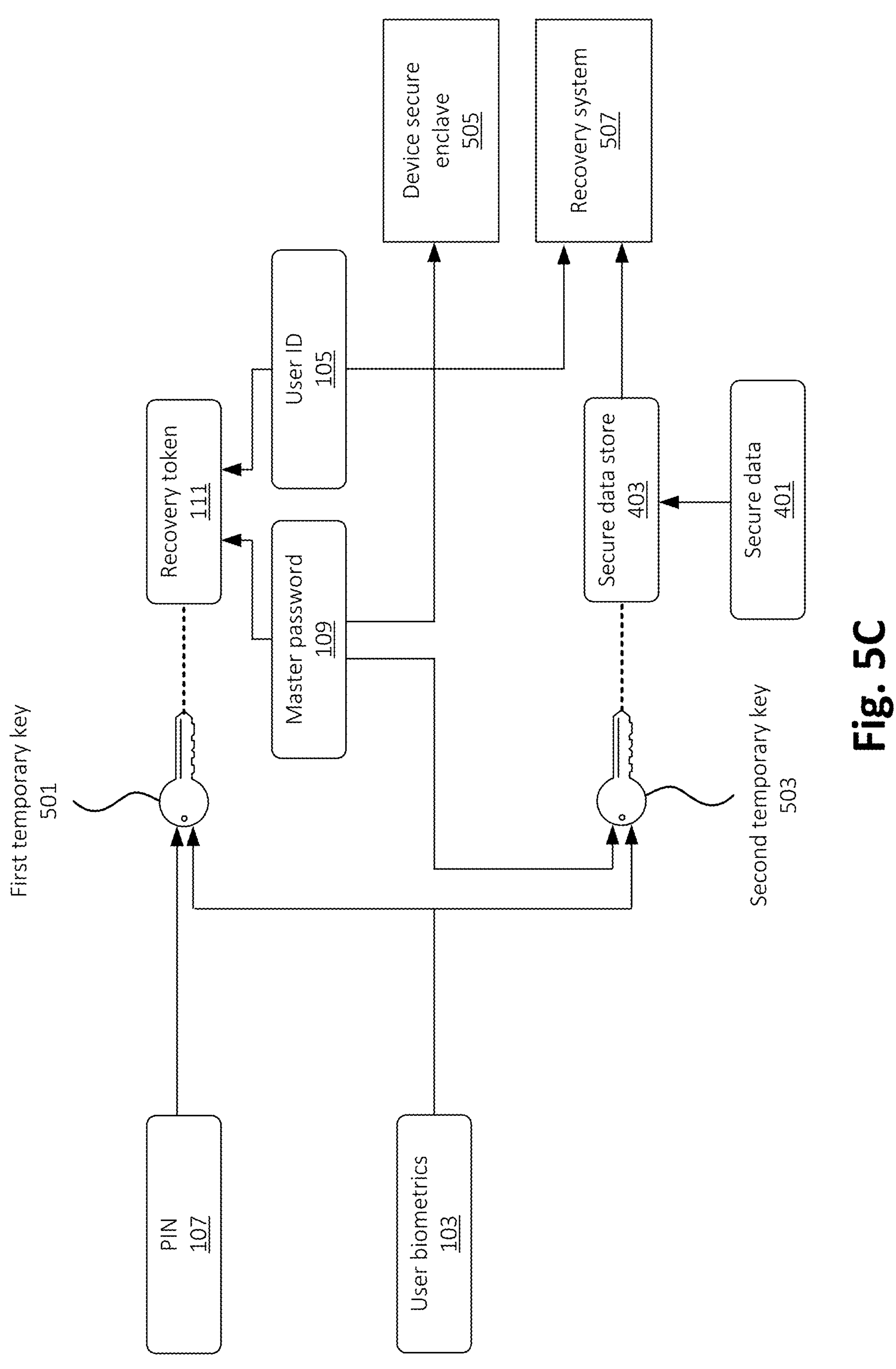

FIG. 5C is a schematic diagram illustrating a variation of the cryptographic key hierarchy within which master password 109 is secured within a device secure enclave, in accordance with some embodiments. For example, as shown, in addition to or in lieu of storing master password 109 within recovery token 111, user device 101 may store master password 109 in device secure enclave 505. Device secure enclave 505 may be or may include a Trusted Execution Environment ("TEE"), a Secure Element ("SE"), a hardware security module, or other hardware-isolated storage mechanism within user device 101. In some embodiments, device secure enclave 505 may implement its own authentication and/or access mechanisms, which may include biometric authentication mechanisms, location-based authentication mechanisms, device policy-based authentication mechanisms, and/or other suitable mechanisms.

In this manner, the security capabilities of device secure enclave 505 may be leveraged to secure some or all of the information contained in recovery token 111, and accessing such data may be performed using the authentication mechanisms implemented by device secure enclave 505. For example, in some situations, device secure enclave 505 may implement an authentication mechanism in which user biometrics are required to access the contents of device secure enclave 505, but a PIN is not required, thus providing secure storage of data otherwise stored in recovery token 111 (e.g., user identifier 105 and/or master password 109) without necessarily requiring the same mechanisms needed to decrypt recovery token 111.

For example, by storing master password 109 in device secure enclave 505, user device 101 may subsequently retrieve master password 109 to derive second temporary key 503 (e.g., upon a successful local biometric authentication) without requiring the user to present, scan, or decrypt recovery token 111. In some implementations, recovery token 111 stored at recovery system 507 may thus serve primarily as a backup mechanism for device loss or replacement scenarios, while device secure enclave 505 may facilitate frequent, seamless access to secure data store 403.

Figure 5D:
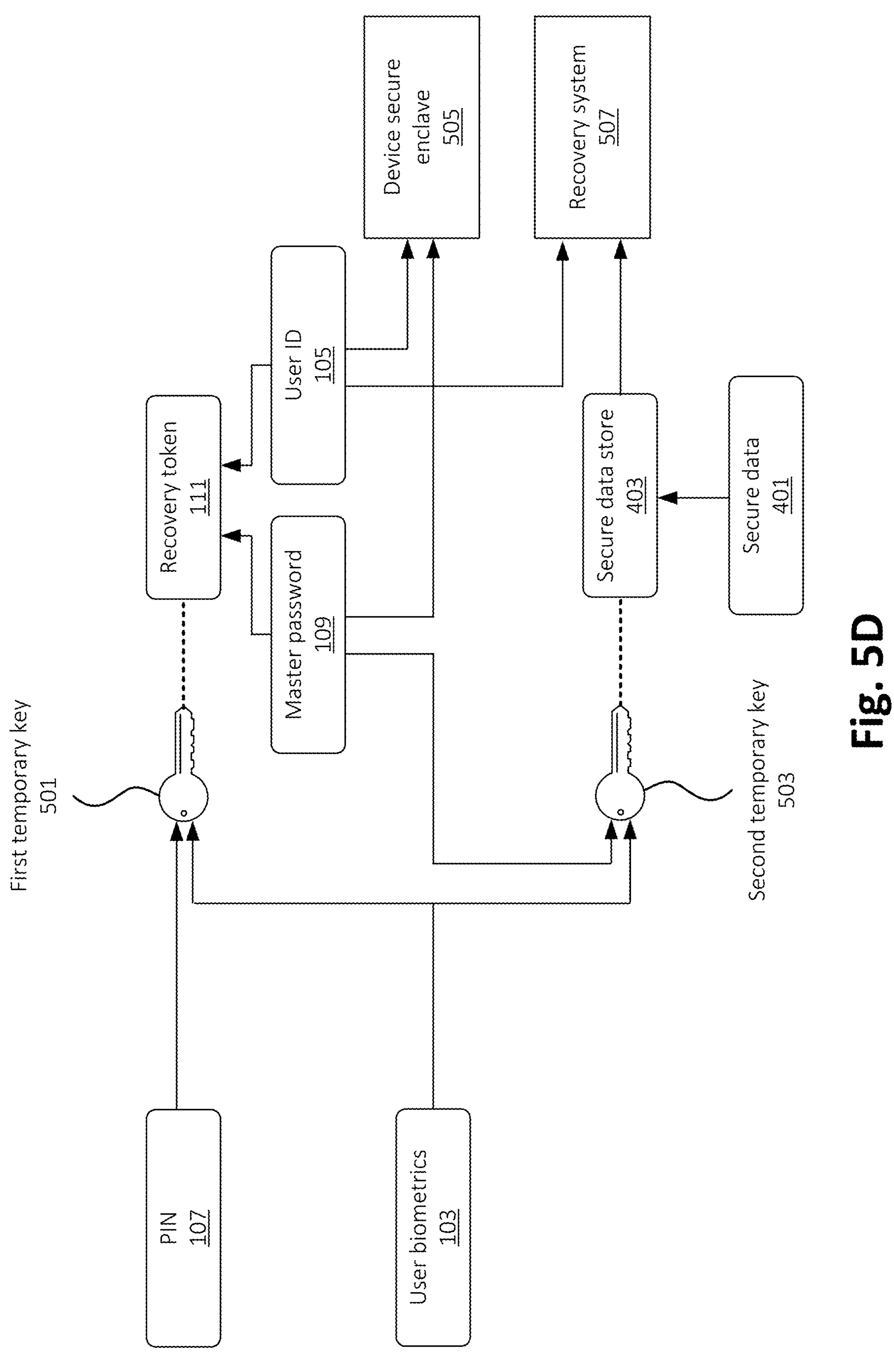

FIG. 5D is a schematic diagram illustrating another variation of the cryptographic key hierarchy involving storage of multiple credentials in a device secure enclave, in accordance with some embodiments. As shown, user device 101 may store both master password 109 and user identifier 105 within device secure enclave 505. In this configuration, device secure enclave 505 acts as a secure local cache for the credentials required to identify the user account and derive the necessary encryption keys (e.g., second temporary key 503). This allows user device 101 to perform operations such as updating secure data store 403 or authenticating with recovery system 507 using locally stored credentials protected by hardware isolation, further reducing reliance on external recovery tokens for routine operations. Upon re-initialization of the user device (e.g. due to change of device), the recovery token 111 may also be used, in conjunction with user biometrics 103 and PIN 107, to reinitialize the device secure enclave 505.

Figure 6C:
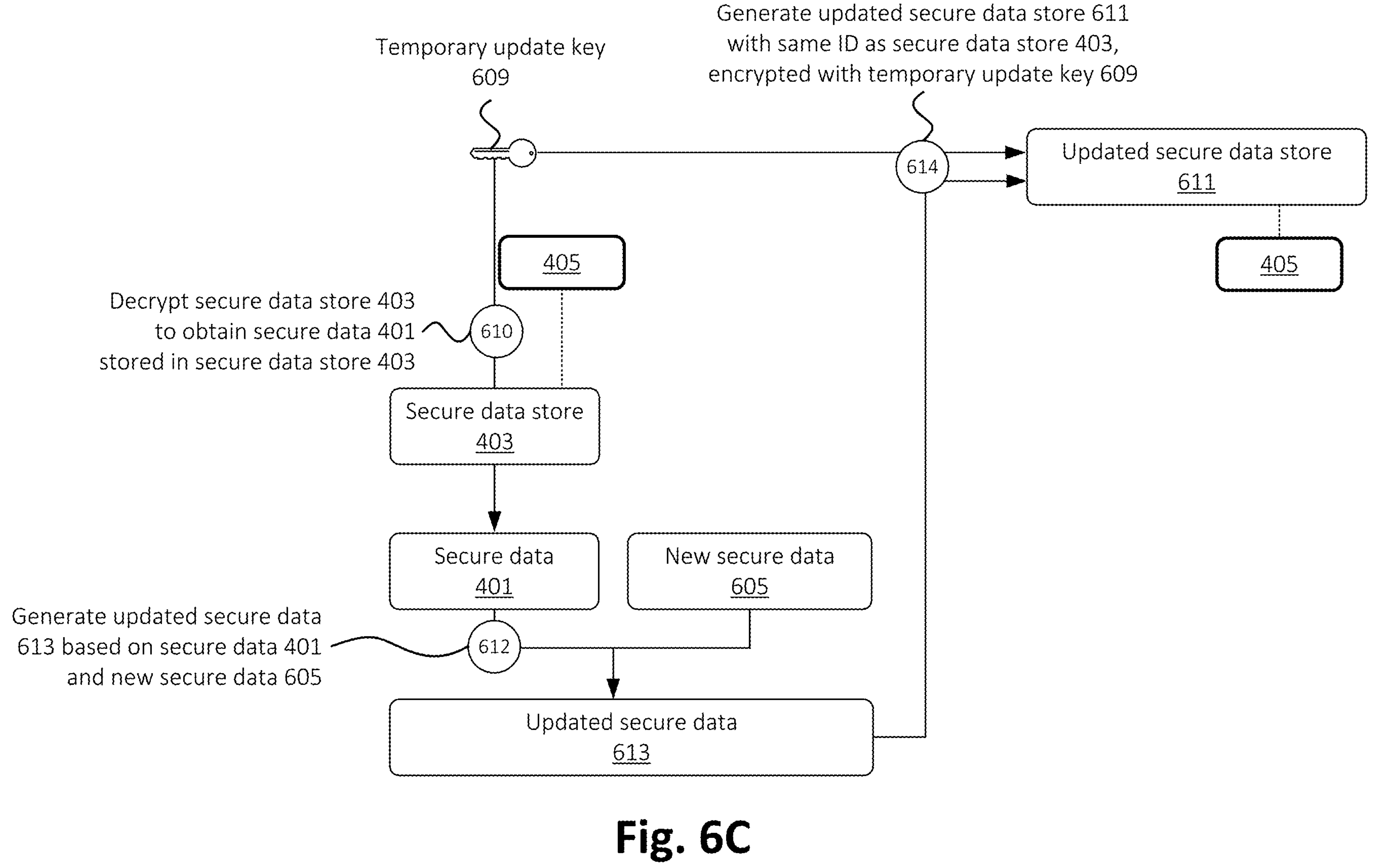

FIGS. 6A-6E illustrate an example procedure for updating information securely stored in a given existing secure data store 403. As shown in FIG. 6A, for example, user device 101 may receive (at 602) a request to update secure data store 403, which may include a request to add new secure data 605 (e.g., a new the OTP seed, a new password, etc.). In some embodiments, this request may correspond to an API call or other type of operation performed by an application executing at user device 101.

As shown, the request (at 602) may include receiving user biometrics 601 and PIN 603. For example, user biometrics 601 and PIN 603 may be a new, or "fresh" set of inputs, received some time after the initialization of recovery token 111 and/or secure data store 403 (e.g., as discussed above with respect to FIGS. 1-5D). That is, user biometrics 103 and PIN 107, may correspond to a first set of user inputs, and biometrics 601 and PIN 603 may correspond to a separate, second set of user inputs.

User device 101 may generate (at 604) temporary recovery key 607 based on the received (at 602) user biometrics 601 and PIN 603. As further shown, user device 101 may obtain (at 606) master password 109 from recovery token 111. For example, user device 101 may decrypt (or attempt to decrypt) recovery token 111 with temporary recovery key 607. Assuming that the decryption of recovery token 111 with temporary recovery key 607 was successful, user device 101 may obtain, retrieve, extract, etc. master password 109 from recovery token 111. Subsequently, user device 101 may generate (at 608) temporary update key 609 based on user biometrics 601 and master password 109. Temporary update key 609 may thus be functionally equivalent to second temporary key 503 (described in FIG. 5B), inasmuch as temporary update key 609 may be used to decrypt secure data store 403, which was originally encrypted with second temporary key 503.

FIG. 6B illustrates an alternative flow for generating temporary update key 609, in accordance with some embodiments. In this example, user device 101 may receive (at 652) a request to add new secure data 605 to an existing secure data store 403, where the request includes user biometrics 601. In this example, the request does not include recovery token 111 or PIN 107. That is, rather than retrieving master password 109 from recovery token 111 (which might require user to scan an external QR code or otherwise provide or locate recovery token 111), user device 101 may access (at 654) device secure enclave 505 using user biometrics 601 and/or some other suitable authentication mechanism implemented by device secure enclave 505. User device 101 may retrieve master password 109 directly from device secure enclave 505. This can allow for a more seamless user experience where temporary update key 609 is generated (at 608) using locally stored, hardware-protected credentials.

In some embodiments, the retrieval of master password 109 and the generation of temporary update key 609 occur entirely within the execution boundary of device secure enclave 505. That is, rather than extracting master password 109 into a general-purpose memory of user device 101, where it might be vulnerable to attack vectors such as malware, user device 101 may provide user biometrics 601, and/or some other suitable authentication mechanism, directly to device secure enclave 505. Device secure enclave 505 may internally authenticate the access (e.g., may authenticate user biometrics 601), retrieve master password 109 from its isolated storage, and perform the key derivation operation (at 608) internally. In such embodiments, device secure enclave 505 outputs only the resulting temporary update key 609, ensuring that master password 109 remains strictly confined to the hardware-protected environment throughout the update procedure.

Once temporary update key 609 is generated (via either the process of FIG. 6A or 6B), user device 101 may proceed to update the information stored in secure data store 403, as shown in FIG. 6C. As shown, user device 101 may use temporary update key 609 to decrypt (at 610) secure data store 403 to obtain the underlying secure data 401 (e.g., the existing encrypted data). User device 101 may generate (at 612) updated secure data 613 by combining, appending, merging, etc. existing secure data 401 with new secure data 605. In other words, original secure data 401 and new secure data 605 may be inputs based on which updated secure data 613 is generated or determined. User device 101 may generate (at 614) updated secure data store 611 by encrypting updated secure data 613 with temporary update key 609.

Figure 6D:
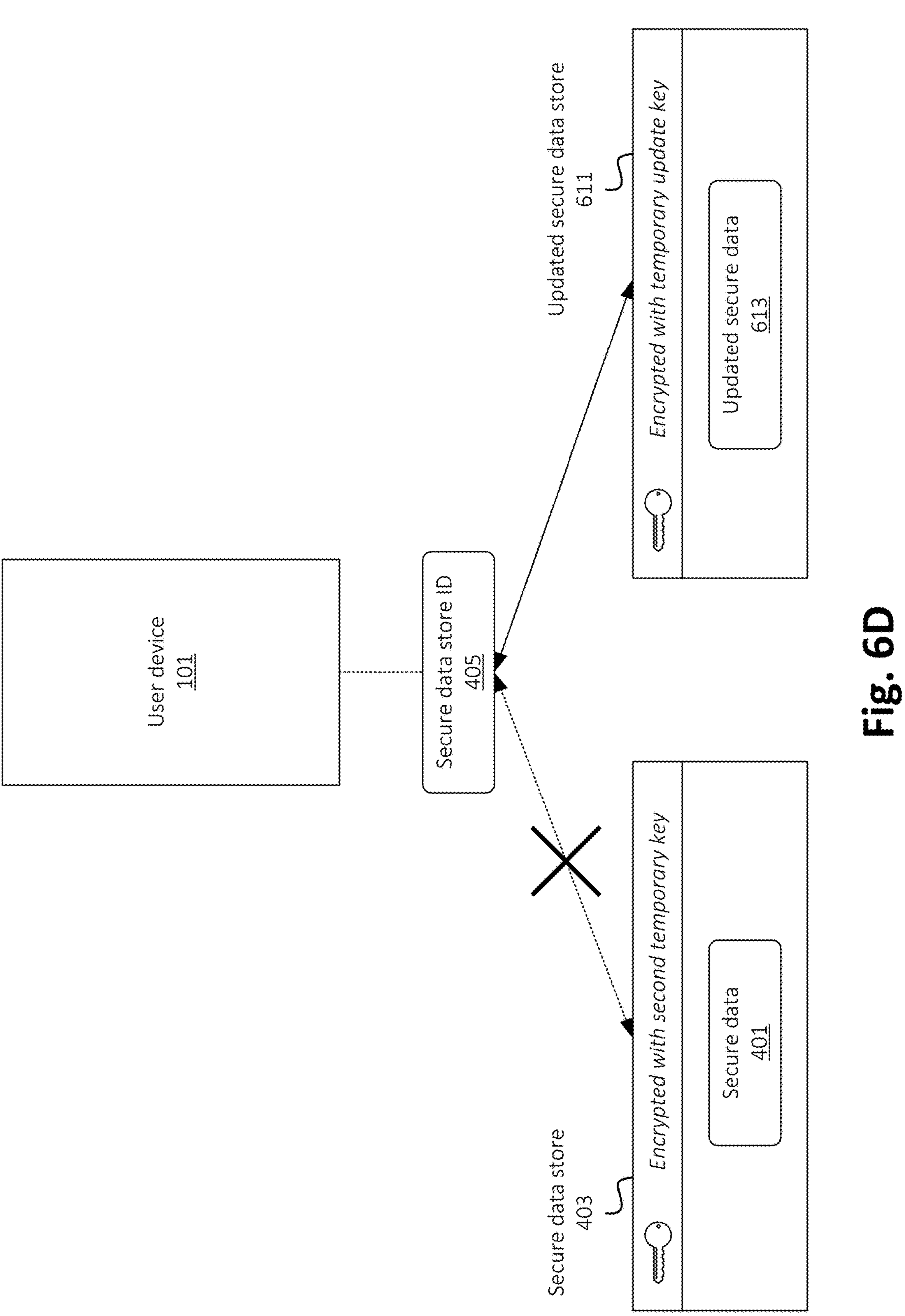
Figure 6E:
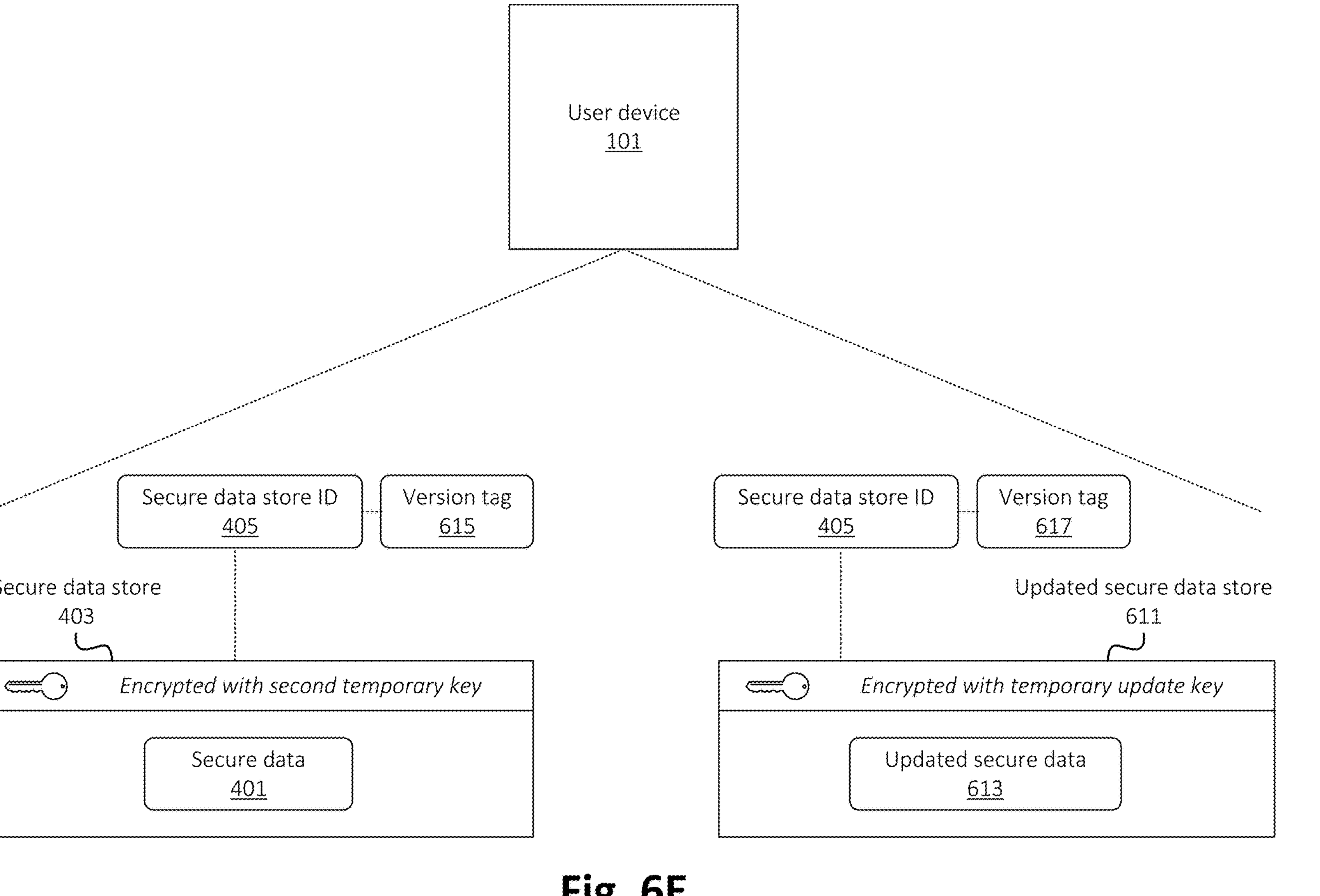

FIGS. 6D and 6E illustrate the storage management of updated secure data 613. As shown in FIG. 6D, updated secure data store 611 may be stored using the same secure data store ID 405 as the original secure data store 403, effectively replacing the old container with the new container encrypted under the fresh key instance. For example, a file system, lookup table, or other suitable data structure or storage schema may be updated to "break" an existing link between secure data store ID 405 and secure data store 403, and to replace such link with a link between secure data store ID 405 and updated secure data store 611.

Alternatively, as shown in FIG. 6E, the file system, lookup table, etc. of user device 101 may implement version control in which secure data store 403 is associated with first version tag 615 and updated secure data store 611 is associated with second version tag 617, allowing user device 101 to maintain access to previous states of the data store if necessary. In some embodiments, one or more other mechanisms may be used to maintain multiple versions of secure data stores (e.g., secure data stores 403 and 611), such as a blockchain. For example, a first block of a blockchain may include secure data store 403 and secure data store ID 405, and a second (e.g., subsequently recorded) block of the blockchain may include updated secure data store 611.

Figure 7A:
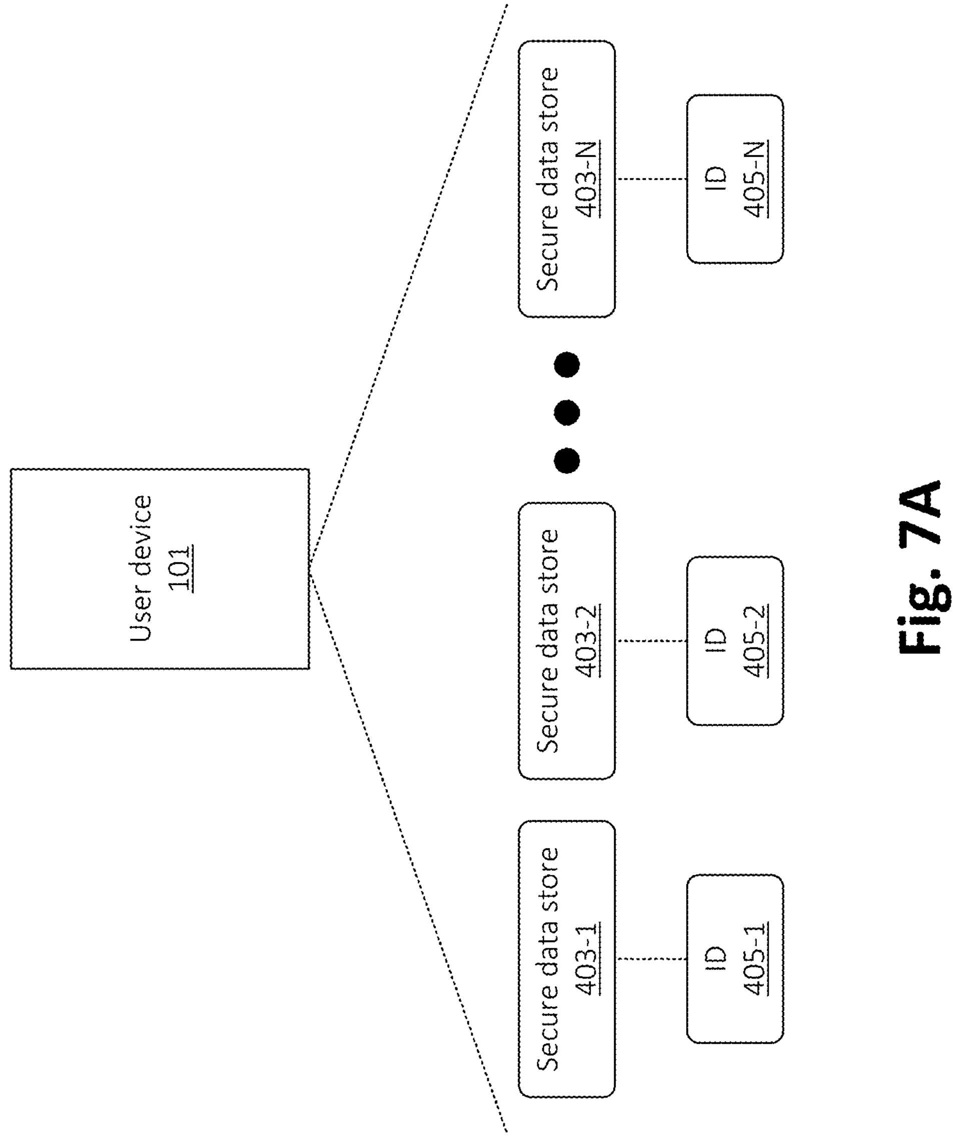
FIGS. 7A and 7B illustrate the management and selective access of multiple secure data stores associated with distinct identifiers on a user device.
Figure 7B:
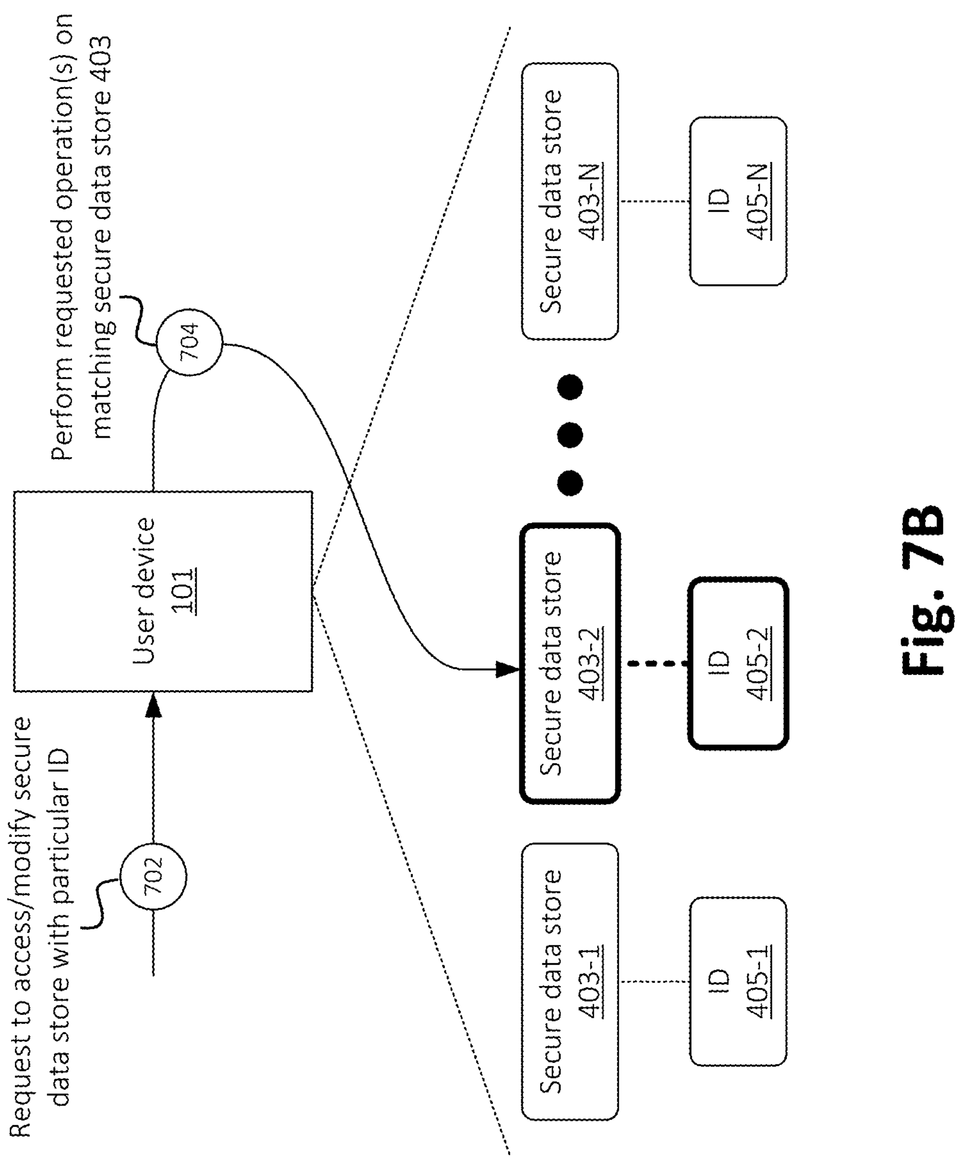

FIGS. 7A and 7B illustrate management and selective access of multiple secure data stores associated with a single user account, in accordance with some embodiments. As shown in FIG. 7A, user device 101 may generate and/or maintain a plurality of secure data stores 403, such as secure data store 403-1, second secure data store 403-2, second secure data store 403-N, etc. In some embodiments, each secure data store 403 may correspond to a distinct application, service, context, or set of credentials. For example, first secure data store 403-1 may encapsulate first secure data (e.g., credentials for a banking application) and may be associated with a first secure data store ID 405-1, second secure data store 403-2 may encapsulate second secure data (e.g., private keys for a secure messaging application) and may be associated with a second secure data store ID 405-2, Nth secure data store 403-N may encapsulate Nth secure data and may be associated with an Nth secure data store ID 405-N, and so on.

In some embodiments, multiple secure data stores 403 (e.g., first secure data store 403-1 and second secure data store 403-2) are encrypted using keys derived from the same master password 109 (e.g., and consequently, are recoverable using recovery token 111). This configuration allows user device 101 to manage disparate sets of sensitive data under a unified recovery root while maintaining logical separation between the data sets. Alternatively, in some embodiments, different secure data stores may be associated with different master passwords 109 or recovery tokens 111 depending on the security requirements of the specific application.

As shown in FIG. 7B, user device 101 may receive (at 702) an access request comprising a particular target identifier. The request may be, for example, a request to add secure data to a particular secure data store 403 to which the particular target identifier corresponds, a request to access secure data stored by the particular secure data store 403 to which the particular target identifier corresponds, and/or some other suitable operation. Assume, for this example, that this target identifier is a particular target secure data store ID 405-2, which uniquely identifies one particular secure data store 403 (e.g., second secure data store 403-2) among the plurality of stored secure data stores 403. Based on the target identifier (i.e., secure data store ID 405-2 in this example), user device 101 may selectively perform (at 704) the requested operations on second secure data store 403-2.

For example, user device 101 may derive the necessary decryption key (e.g., second temporary key 503 or temporary update key 609, as discussed above) to decrypt second secure data store 403-2 and retrieve the encapsulated secure data. Because the access request is scoped by target secure data store ID 405-2, other secure data stores 403 (e.g., first secure data store 403-1) remain encrypted and are not accessed based on the request (at 702). This compartmentalization minimizes the exposure of sensitive data, ensuring that a compromise or access event in one application context does not unnecessarily expose secure data associated with another context.

Figure 8:
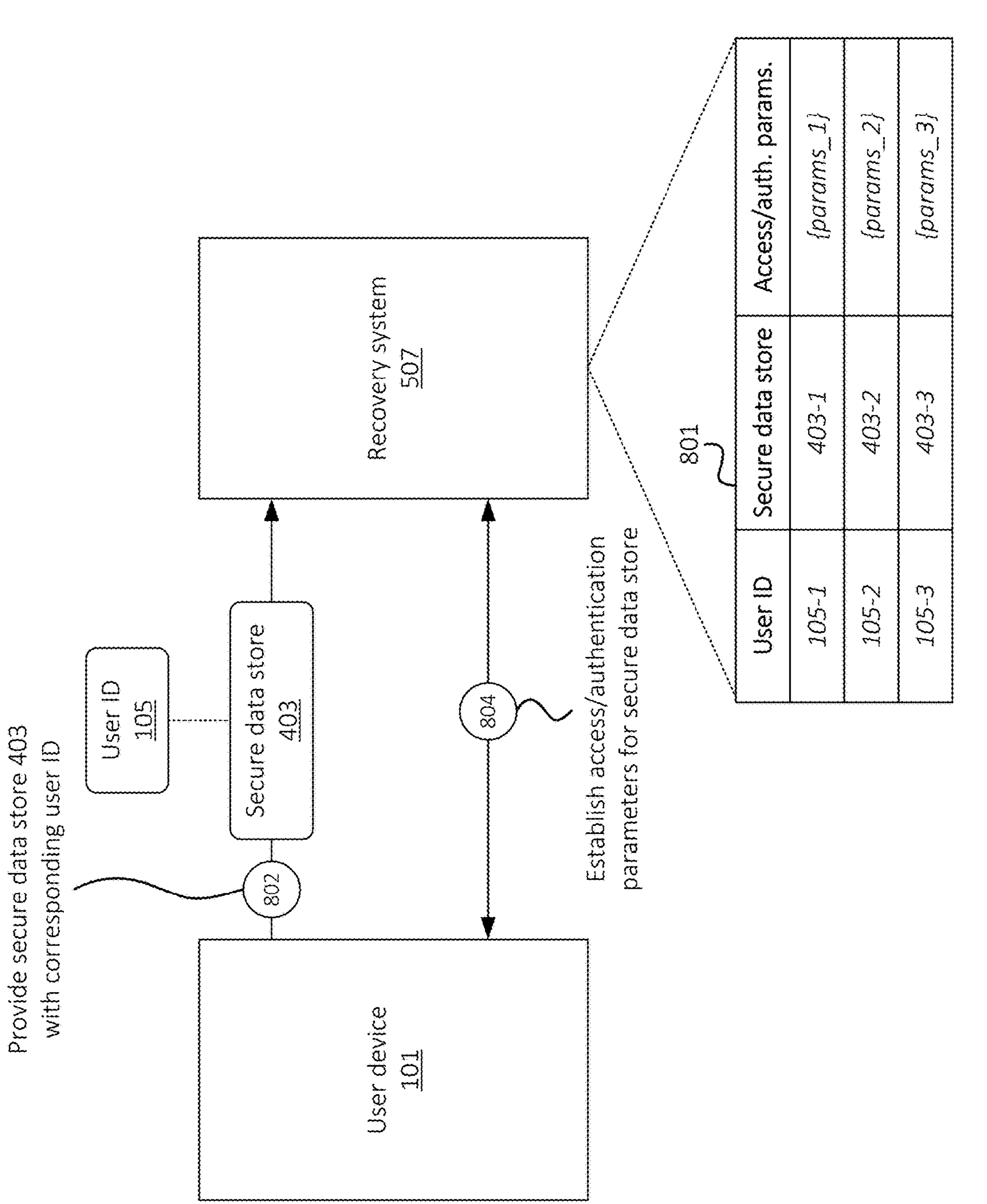
FIG. 8 shows the registration of a secure data store and access parameters with a remote recovery system.

FIG. 8 is a schematic diagram illustrating the secure storage of one or more secure data stores 403 by recovery system 507. As discussed below, recovery system 507 may maintain one or more secure data stores 403, which may potentially be associated with multiple different users or user devices 101, for later retrieval by such users or user devices 101 (e.g., as part of a recovery procedure, such as a device restoration procedure, a "forgot password" procedure, or other type of suitable procedure).

As shown, recovery system 507 may receive (at 802) a particular secure data store 403 (e.g., from a particular user device 101 at which secure data store 403 was initialized or generated, and/or from some other source). In some embodiments, receiving (at 802) the particular secure data store 403 may further include receiving a particular user identifier 105 with which secure data store 403 is associated. In some embodiments, user identifier 105 may be received or generated via the same procedure by which recovery token 111 is generated (e.g., as discussed above with respect to FIG. 1). In some embodiments, user identifier 105 may be received via some other suitable mechanism. In some embodiments, user device 101 may transmit such data via a secure communication channel (e.g., Transport Layer Security ("TLS"), Secure Sockets Layer ("SSL"), etc.), which may be in accordance with security protocols enforced or implemented by recovery system 507 in order to maintain secure access to recovery system 507.

In some embodiments, recovery system 507 may maintain a user table, database, or other suitable storage structure (e.g., as represented by data structure 801). Upon receiving (at 802) the registration data, recovery system 507 may create or update a record in data structure 801 linking user identifier 105 to the received secure data store 403 and/or recovery token 111. In this example, a first user identifier 105-1 may be associated with a first secure data store 403-1 and a first set of access and/or authorization parameters ("params_1"), a second user identifier 105-2 may be associated with a second secure data store 403-2 and a second set of access and/or authorization parameters ("params_2"), and a third user identifier 105-3 may be associated with a third secure data store 403-3 and a third set of access and/or authorization parameters ("params_3").

Although examples described herein refer to recovery system 507 maintaining user identifiers 105 in data structure 801, in some embodiments, recovery system 507 may instead maintain hashed versions of user identifiers 105, and/or other values derived from user identifiers 105, such that a compromise of data structure 801 does not reveal plaintext user identifiers 105. For example, recovery system 507 may maintain secret or secure information, based on which recovery system 507 is able to generate and identify hashed user identifiers 105 stored in data structure 801.

Additionally, recovery system 507 may receive or establish (at 804) access parameters associated with respective secure data stores 403. In some embodiments, access parameters may define security rules, policy requirements, or authentication factors (e.g., requiring specific application signatures, device integrity checks, etc.) that must be satisfied before recovery system 507 is authorized to release secure data store 403 or recovery token 111 to a requesting device in a subsequent recovery procedure. In some embodiments, access parameters for a particular secure data store 403 maintained by recovery system 507 may specify a particular set of user devices 101, users, and/or other entities that are authorized to obtain such secure data store 403.

Figure 9A:
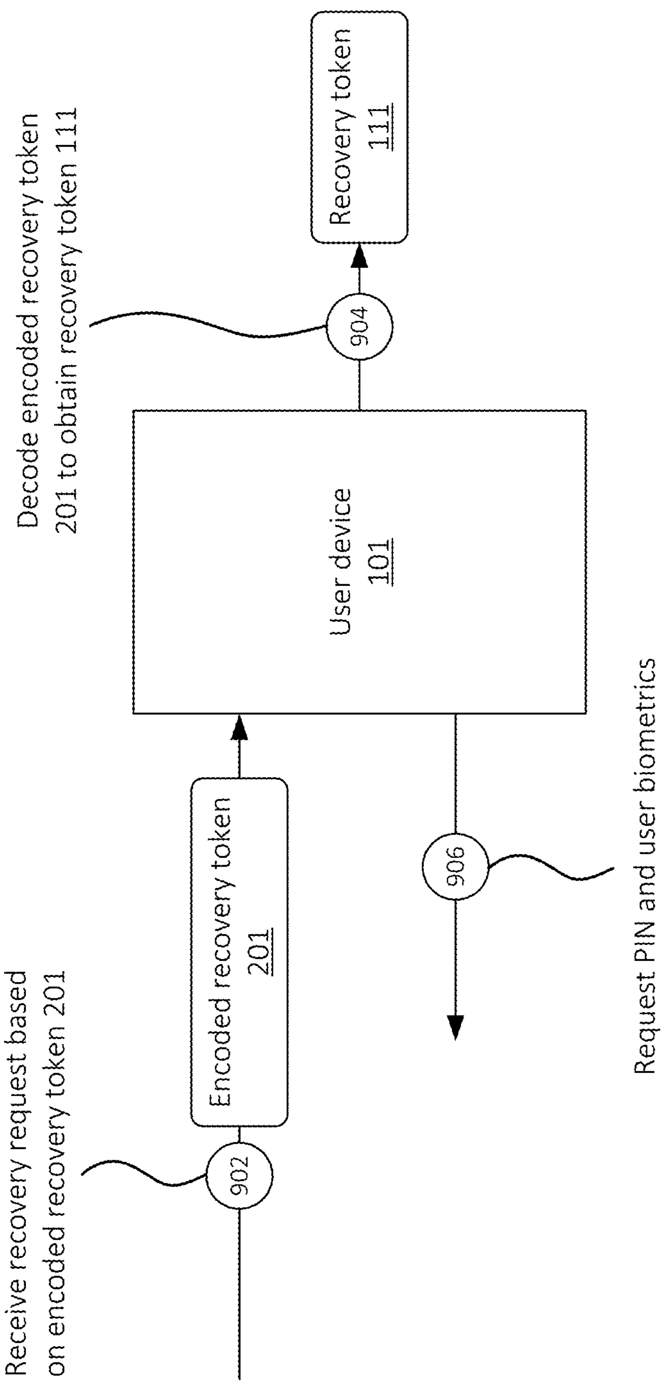
FIGS. 9A-9C detail a recovery procedure, including decoding a recovery token, decrypting it using biometric-derived keys, and retrieving a secure data store from a recovery system.
Figure 9B:
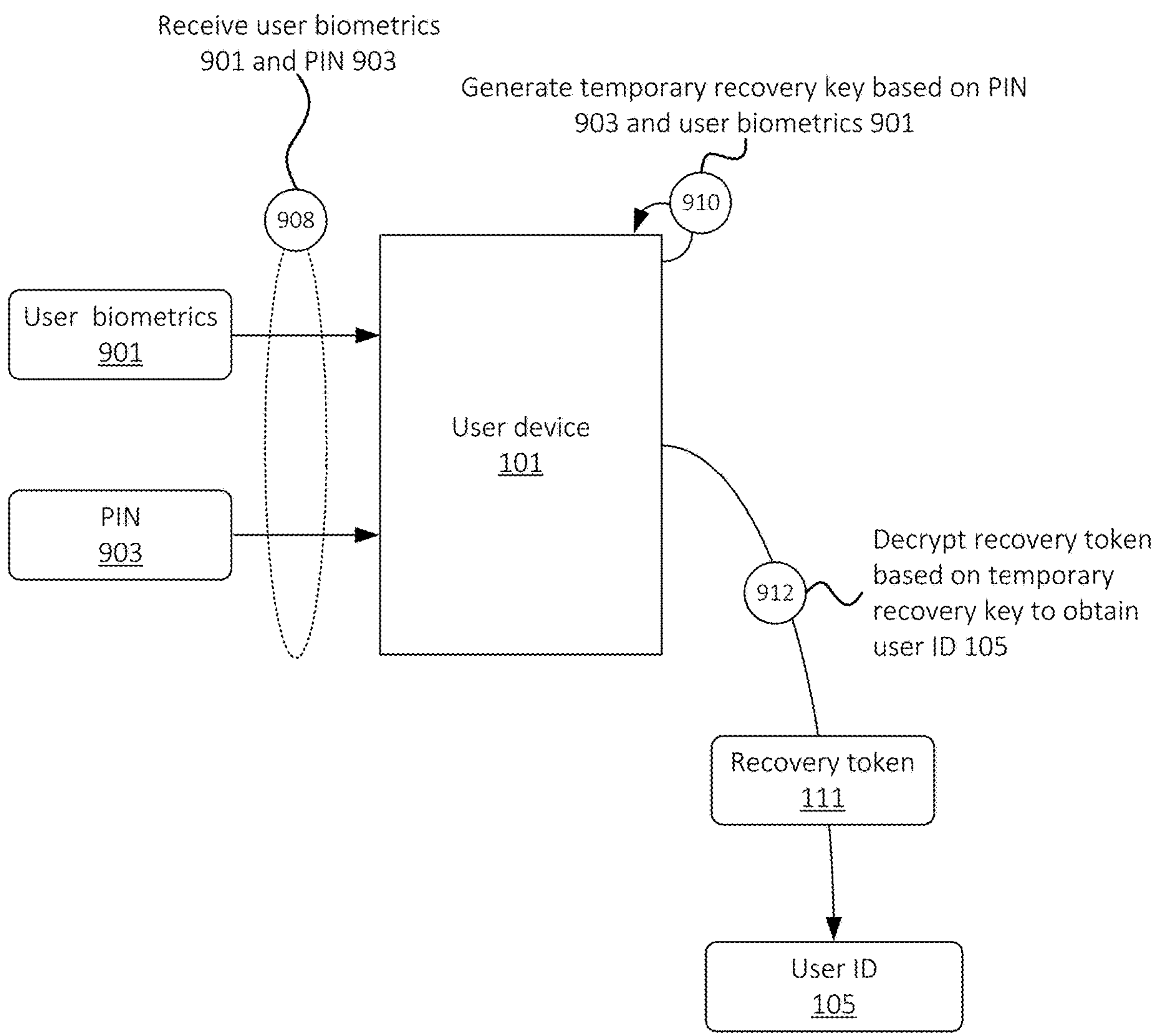
Figure 9C:
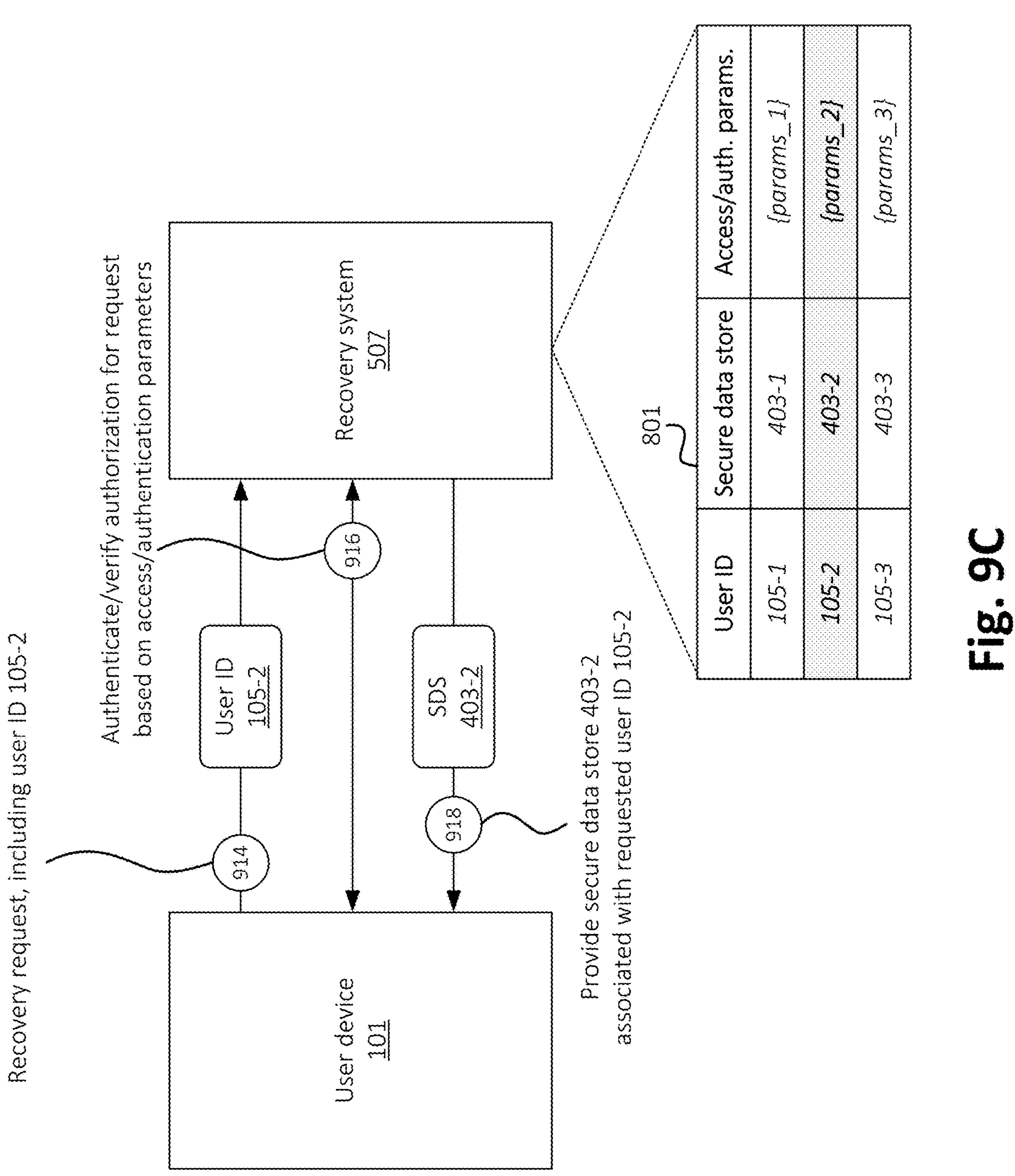

FIGS. 9A-9C illustrate a recovery procedure, which may be initiated at a user device (e.g., user device 101) to restore access to a user account and/or a secure data store (e.g., secure data store 403), in accordance with some embodiments. As shown in FIG. 9A, the recovery procedure may commence with user device 101 receiving (at 902) a recovery request based on encoded recovery token 201. In some embodiments, receiving the request at 902 may include a user of user device 101 scanning a recovery QR code (e.g., recovery QR code 203) using a camera of user device 101, importing a recovery file (e.g., recovery file 205), manually entering a recovery string (e.g., recovery string 207), or otherwise providing encoded recovery token 201. Upon receiving encoded recovery token 201, user device 101 may decode (at 904) encoded recovery token 201 to obtain recovery token 111. For example, user device 101 may parse or otherwise analyze encoded recovery token 201 to extract the underlying cryptographic structure of recovery token 111

(e.g., which may include a PPDS, as discussed above). As further shown in FIG. 9A, user device 101 may request (at 906) a PIN and user biometrics from the user, effectively prompting the user to provide the authentication factors necessary to decrypt the recovery token 111 obtained at step 904.

As shown in FIG. 9B, user device 101 may utilize the inputs requested in FIG. 9A to perform cryptographic recovery operations. User device 101 may receive (at 908) user biometrics 901 and PIN 903. In some embodiments, these inputs correspond to the fresh inputs provided by the user in response to the request at 906. Based on these inputs, user device 101 may generate (at 910) a temporary recovery key. In some embodiments, generating the temporary recovery key may include performing a KDF operation using PIN 903 and user biometrics 901 as inputs (e.g., similar to the generation of first temporary key 501 described above with respect to FIG. 1). Using the generated temporary recovery key, user device 101 may decrypt (at 912) recovery token 111 to obtain user identifier 105. Although recovery token 111 may also contain master password 109, in some embodiments, the decryption at 912 is specifically performed to extract user identifier 105 to facilitate the retrieval of the correct secure data store from a remote system.

While FIGS. 9A and 9B are described in the context of user identifier 105 being recovered from recovery token 111 (e.g., based on an initial input of encoded recovery token 201), similar concepts may be applicable in embodiments where user identifier 105 is maintained by, and obtainable from, device secure enclave 505 of user device 101. For example, as discussed above, suitable authentication or unlock mechanisms associated with device secure enclave 505 may be used to obtain user identifier 105 from device secure enclave 505.

As shown in FIG. 9C, user device 101 may utilize user identifier 105 (e.g., as obtained from recovery token 111 as discussed above with respect to FIGS. 9A and 9B, and/or as obtained from device secure enclave 505) to retrieve a specific secure data store from recovery system 507. In some embodiments, a user of user device 101 may have possession or awareness of user identifier 105, without needing user identifier 105 to be recovered from recovery token 111. User device 101 may transmit (at 914) a recovery request to recovery system 507. As shown, in this example, the recovery request includes a particular user identifier 105-2 (e.g., which may correspond to user identifier 105 obtained in FIG. 9B).

Upon receiving the request, recovery system 507 may authenticate or verify (at 916) authorization for the request based on access/authentication parameters (e.g., as stored in data structure 801). For example, recovery system 507 may verify that the request includes a suitable password or authentication token, that user device 101 is not a known compromised device (e.g., based on an Internet Protocol ("IP") address of user device 101, a device identifier of user device 101 (e.g., a Subscription Permanent Identifier ("SUPI"), a Globally Unique Temporary Identifier ("GUTI"), an Mobile Directory Number ("MDN"), a serial number, a Media Access Control ("MAC") address, an International Mobile Station Equipment Identity ("IMEI"), etc.), that the request originates from a permitted geographic region, that valid application signatures are present, and/or other suitable information. In some embodiments, authenticating and/or verifying (at 916) the request may include determining whether the request includes a password, authentication token, or other information extracted from recovery token 111. For example, in some embodiments, possession of recovery token 111 may be required in order to provide an authorized recovery request, inasmuch as access and/or authorization parameters for a given secure data store 403 may indicate that access to such secure data store 403 is only permissible if a requestor is able to provide a password, authentication token, or other suitable information that was derived from a particular recovery token 111 that is associated with the requested secure data store 403.

Upon successful authentication and/or authorization verification of user device 101, recovery system 507 may provide (at 918) the corresponding secure data store 403-2 associated with user identifier 105-2 to user device 101. Once secure data store 403-2 is received, user device 101 may proceed to decrypt secure data store 403-2 (e.g., using user biometrics 601 and master password 109 recovered from recovery token 111, as similarly described in FIG. 6A) to restore access to the secure data contained therein.

Figure 10:
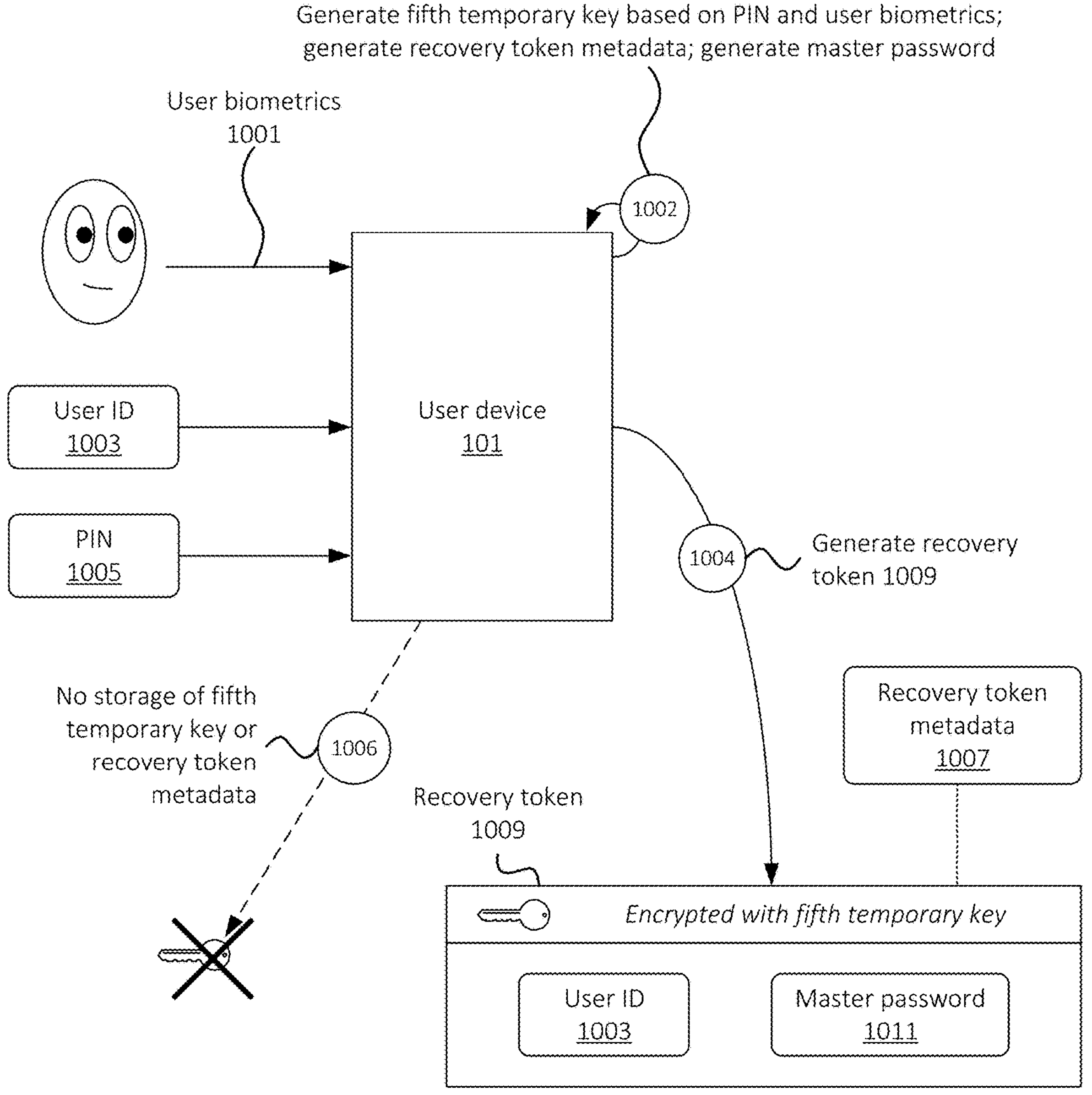
FIG. 10 depicts the generation of a recovery token that includes additional recovery token metadata for enhanced key derivation.
Figure 11A:
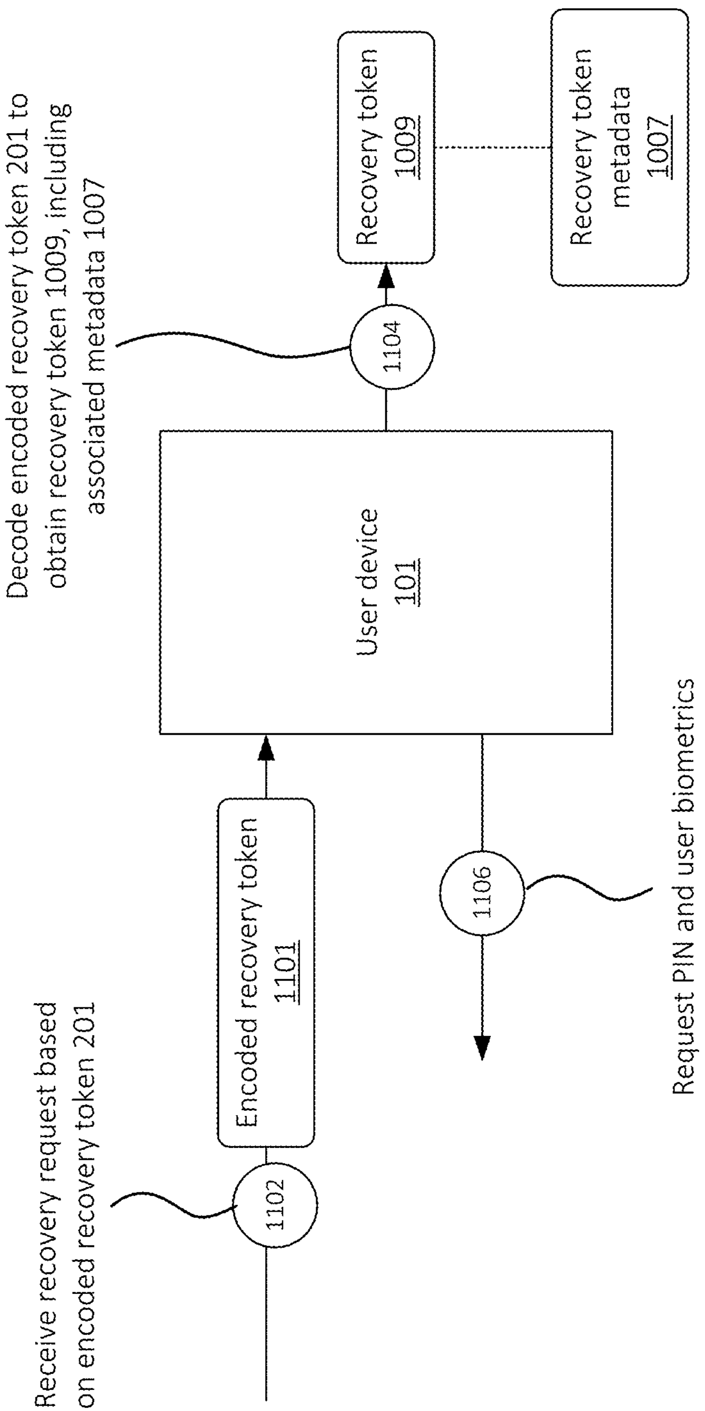
FIGS. 11A and 11B show the processing of a recovery token with associated metadata to derive a temporary recovery key and decrypt user credentials.
Figure 11B:
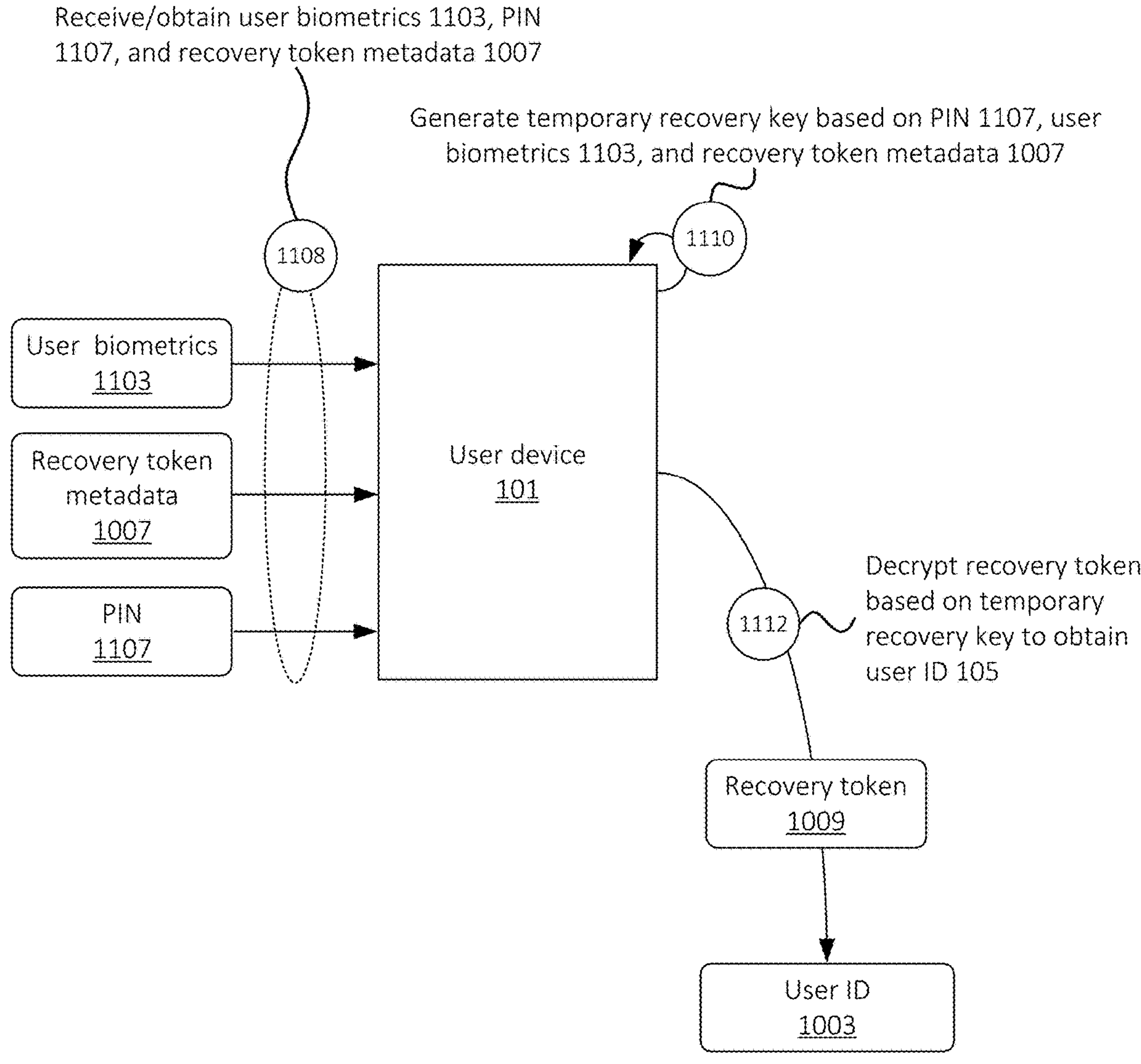

FIGS. 10-11B illustrate the generation and use of recovery token metadata to enhance the security and utility of the cryptographic keys used in the recovery process, in accordance with some embodiments. As shown in FIG. 10, user device 101 may receive user biometrics 1001, user identifier 1003, and PIN 1005. In this embodiment, user device 101 may generate (at 1002) recovery token metadata 1007 (e.g., a random salt, nonce, a high-entropy string, or the like). In some embodiments, recovery token metadata 1007 may include information (e.g., timestamp data, and/or other types of metadata) that is derived from or otherwise based on one or more provided inputs, such as user biometrics 1001, user identifier 1003, and/or PIN 1005.

In some embodiments, generating (at 1002) recovery token metadata 1007 includes generating public helper data, based on user biometrics 1001. This may correspond to an Auxiliary Data ("AD") element of RBR as referenced in ISO/IEC 30136. Because user biometrics 1001 (e.g., a facial scan) may vary slightly in subsequent captures (e.g., due to lighting or angle), user device 101 to the biometric input to produce the helper data. This helper data, stored as part of recovery token metadata 1007, allows user device 101 to reconstruct the exact original bitstring of user biometrics 1001 from a subsequent, slightly different biometric input (e.g., user biometrics 1103) during a recovery procedure, without revealing the raw biometric data itself. This ensures that the fifth temporary key derived in FIG. 11B is bitwise identical to the key generated in FIG. 10, despite natural variations in biometric capture.

User device 101 may subsequently generate a fifth temporary key based on user biometrics 1001, PIN 1005, and the generated recovery token metadata 1007. By incorporating recovery token metadata 1007 into the key derivation, the system increases the resistance of the key to brute-force attacks and adds the advantages to revocability and renewability. Additionally, since the recovery token metadata 1007 may be based on user biometrics 1001 and/or other inputs, recovery token metadata 1007 may be utilized for determining an acceptable level of variance in biometrics that are used to generate decryption keys associated with recovery token 1009, as discussed below.

User device 101 may generate (at 1004) recovery token 1009 by encrypting user identifier 1003 and master password 1011 using the fifth temporary key. Recovery token 1009 may thus include or may be associated with user identifier 1003 and master password 1011 (as encrypted using the fifth temporary key), as well as with recovery token metadata 1007 (which is not encrypted using the fifth temporary key). As similarly discussed above, user device 101 may forgo storing (at 1006) the fifth temporary key or recovery token metadata 1007 locally, instead exporting recovery token metadata 1007 alongside recovery token 1009 (e.g., within an encoded recovery token) for offline storage.

FIG. 11A illustrates the processing of an encoded recovery token containing metadata, in accordance with some embodiments. As similarly discussed above with respect to FIG. 9A, for example, user device 101 may receive (at 1102) a recovery request based on encoded recovery token 1101. User device 101 may decode (at 1104) encoded recovery token 1101 to obtain both recovery token 1009 and the associated recovery token metadata 1007. As similarly described above with respect to FIG. 9A, user device 101 may request (at 1106) a PIN and user biometrics from the user to initiate the decryption process.

As shown in FIG. 11B, user device 101 may receive (at 1108) user biometrics 1103, PIN 1107, and recovery token metadata 1007 (e.g., as obtained in the procedure shown in FIG. 11A). User device 101 may generate (at 1110) a temporary recovery key based on PIN 1107, user biometrics 1103, and recovery token metadata 1007. This operation may effectively reconstruct (or attempt to reconstruct) the "fifth temporary key" originally generated in FIG. 10. In some embodiments, this operation may include performing variance detection, or other suitable factors associated with inputs such as user biometrics 1103. Using this temporary recovery key, user device 101 may decrypt (at 1112) recovery token 1009 to obtain user identifier 1003 (and/or master password 1011), thereby restoring access to the user's secure data. As similarly discussed above (e.g., with respect to FIG. 9C), this user identifier 1003 may subsequently be used in a procedure whereby a suitable secure data store 403 is obtained (e.g., recovered) from recovery system 507 or from some other suitable source.

Figure 12A:
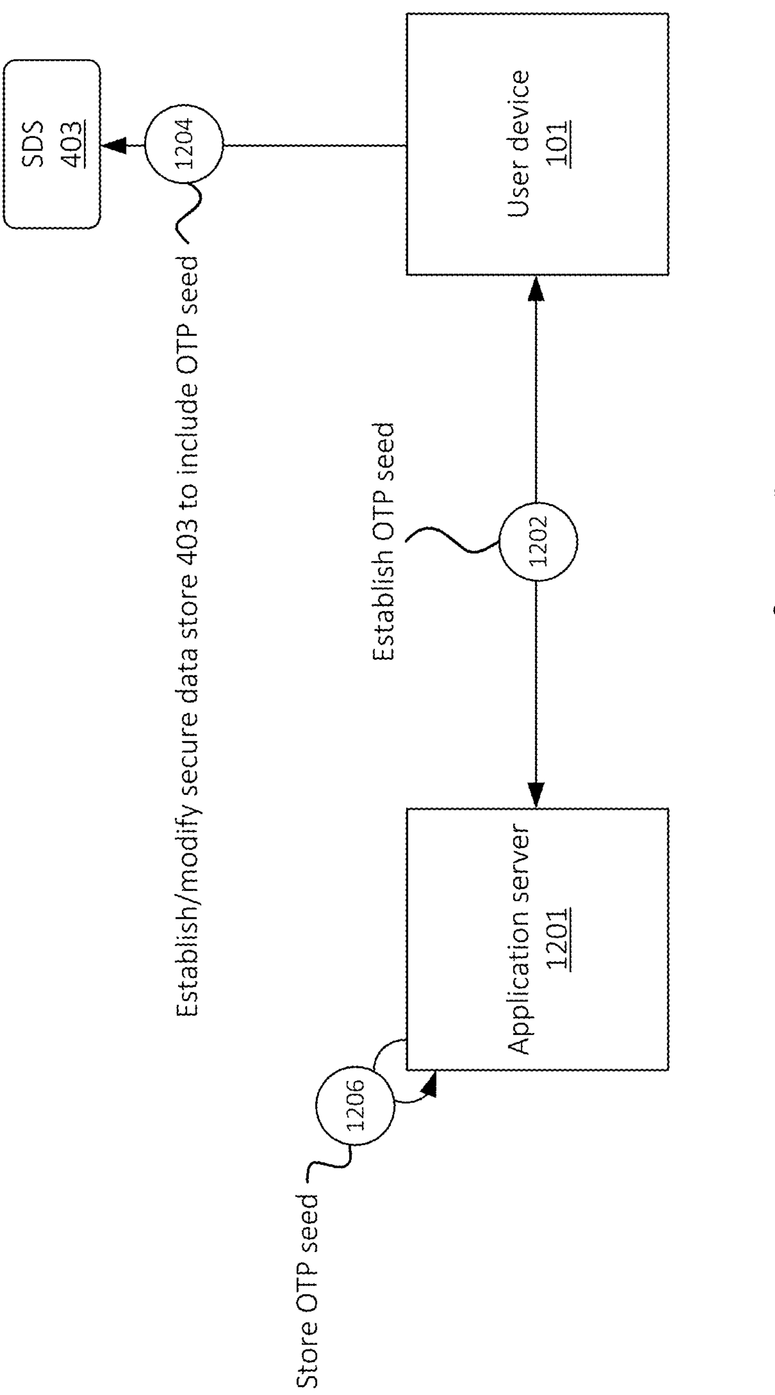
FIGS. 12A and 12B illustrate the establishment and utilization of a One-Time Password (OTP) seed securely stored within a recoverable secure data store.
Figure 12B:
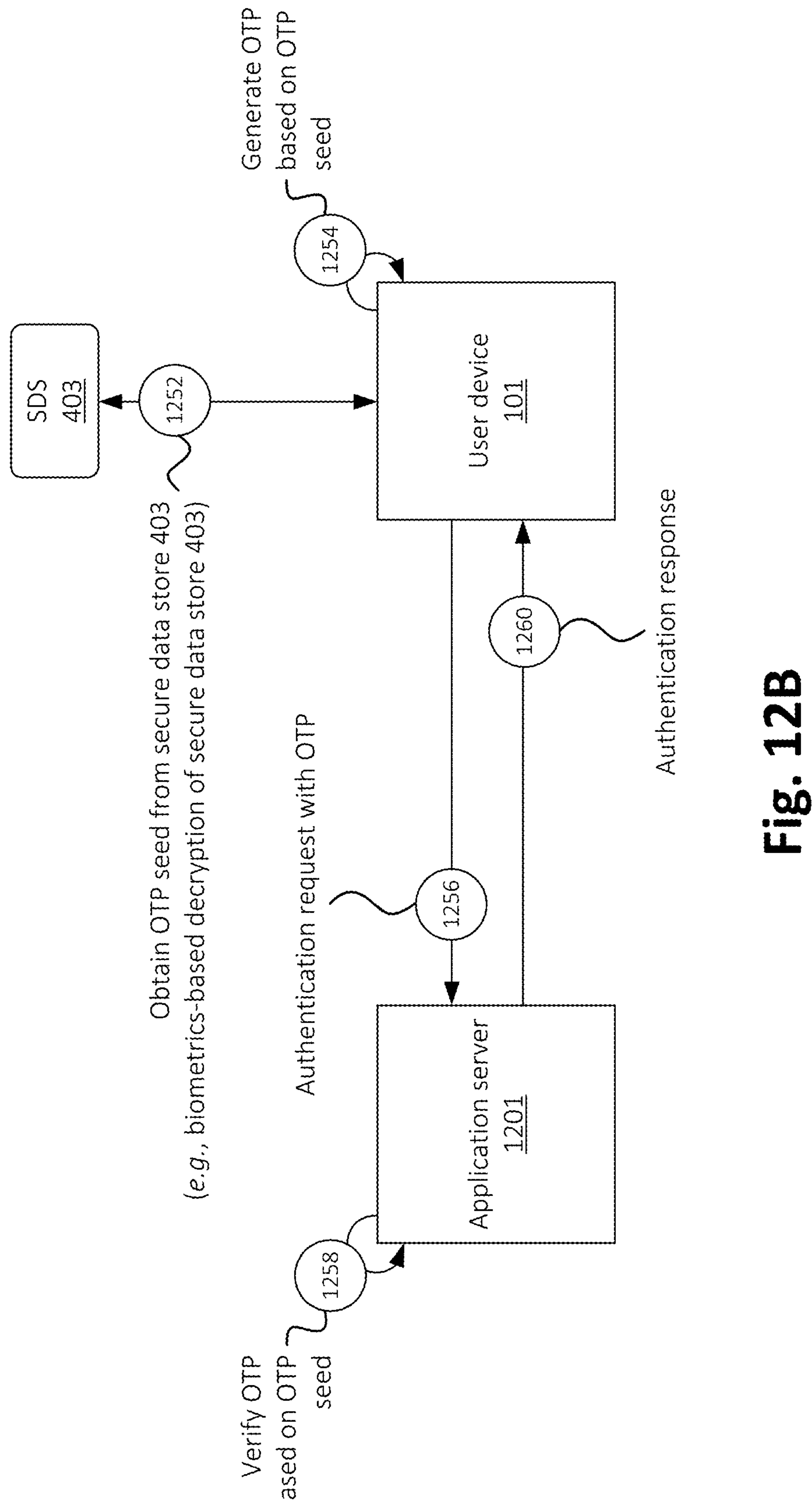

FIGS. 12A and 12B illustrate the secure establishment and utilization of an OTP seed using a secure data store, in accordance with some embodiments. The OTP seed may be, for example, a shared secret utilized by multiple entities, based on which temporary or rolling passwords (e.g., which may change every 30 seconds, every minute, etc.) may be generated. The multiple entities may include, for example, user device 101 and a particular application server 1201.

As shown in FIG. 12A, user device 101 and application server 1201 may communicate to establish (at 1202) an OTP seed. In some embodiments, establishing the OTP seed may occur during an initial account setup, a two-factor authentication ("2FA") enrollment process, a security update, and/or some other suitable procedure. As discussed above, the OTP seed may include a shared secret (e.g., a random string, a hexadecimal key, a QR code content) used to generate time-based or counter-based one-time passwords.

As further shown in FIG. 12A, user device 101 may establish and/or modify (at 1204) secure data store 403 to include the established the OTP seed. In some embodiments, this process may involve the update mechanisms described above (e.g., with respect to FIGS. 6A-6C), in which user device 101 decrypts the existing secure data store 403, adds the OTP seed to the secure data, and re-encrypts the container using a temporary update key. Additionally, or alternatively, user device 101 may initiate a new recoverable secure data store 403 (e.g., as discussed above with respect to some or all of FIGS. 1-4) to store the OTP. For example, encrypted secure data 401, included in such secure data store 403, may include or may be the OTP seed. Application server 1201 may store (at 1206) the OTP seed in a user database or other storage associated with the user's account to facilitate future verification.

As shown in FIG. 12B, user device 101 may subsequently utilize the stored the OTP seed to perform authentication operations. User device 101 may obtain (at 1252) the OTP seed from secure data store 403. As indicated in FIG. 12B, obtaining the OTP seed may include performing a biometrics-based decryption of secure data store 403 (e.g., generating a temporary key based on user biometrics and a master password recovered from device secure enclave 505 or recovery token 111, as described above). User device 101 may generate (at 1254) an OTP (e.g., a 6-digit code or some other type of code or value) based on the obtained the OTP seed, a current time or counter value, and/or other suitable information.

As further shown in FIG. 12B, user device 101 may transmit (at 1256) an authentication request including the generated OTP to application server 1201. Upon receiving the request, application server 1201 may verify (at 1258) the received OTP based on the OTP seed stored by application server 1201 (e.g., by generating an expected OTP using the stored seed and comparing it to the received OTP). Based on the verification result, application server 1201 may transmit (at 1260) an authentication response (e.g., granting or denying access) to user device 101. Assuming that application server 1201 has authenticated user device 101 based on the OTP, application server 1201 may proceed to provide a corresponding service to user device 101, such as a gaming service, a file transfer service, a videoconferencing service, a content streaming service, or the like.

FIGS. 13A-13D illustrate an example of performing deepfake verification using cryptographic tokens derived from user images, in accordance with some embodiments. For example, an entity seeking to determine whether a purported image associated with a given user (e.g., user image 1301) is a true image of the user (e.g., as opposed to "deepfake" such as a doctored image, a computer-generated image, or some other inauthentic image that is not actually a photographic capture of the actual user).

Figure 13A:
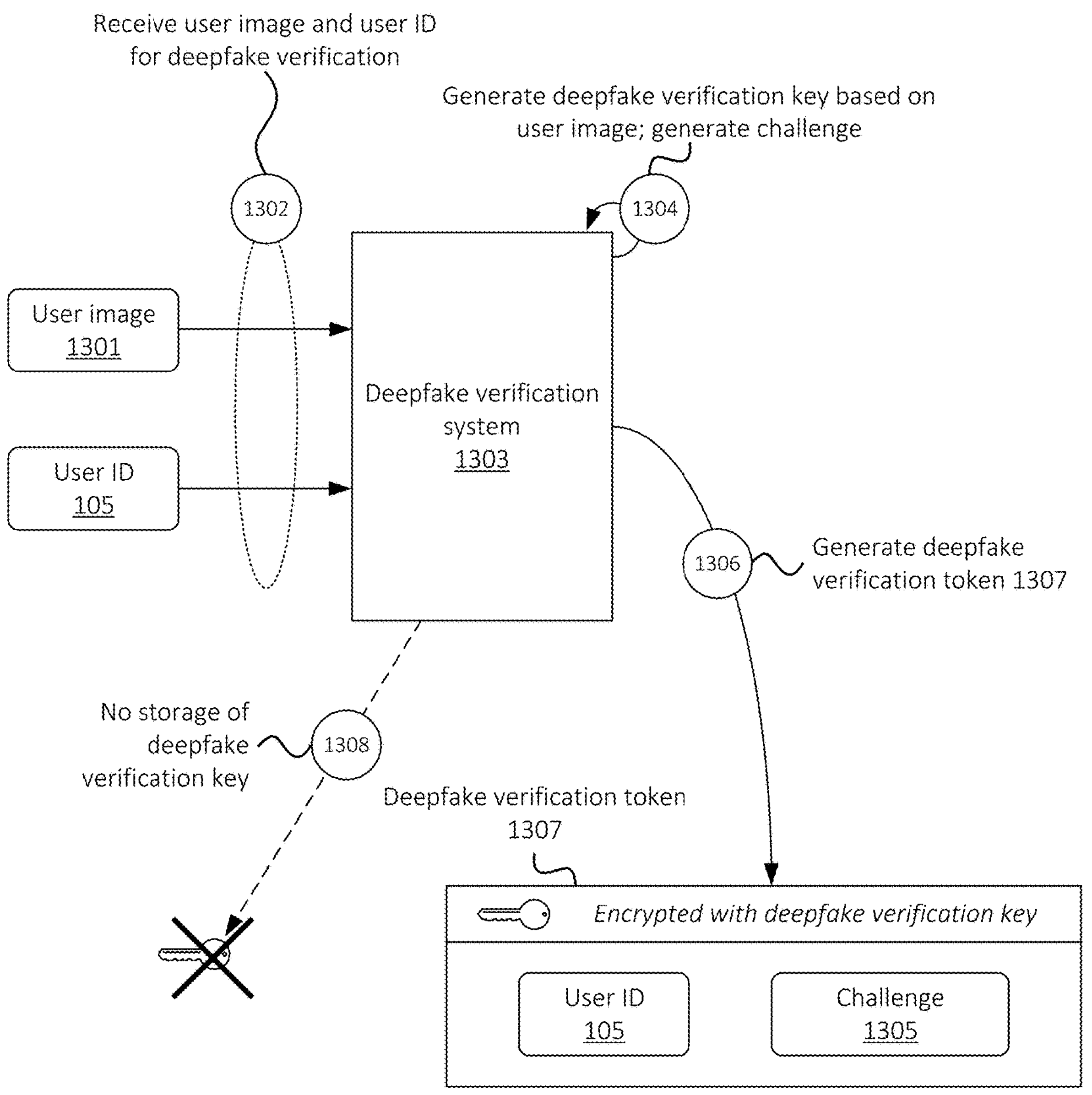
FIGS. 13A-13D present a deepfake verification process using cryptographically bound tokens derived from user images and challenges.

As shown in FIG. 13A, user device 101 may implement or communicate with deepfake verification system 1303 to generate verification materials. User device 101 may receive (at 1302) user image 1301 and user identifier 105 for deepfake verification enrollment. Based on these inputs, deepfake verification system 1303 may generate (at 1304) a deepfake verification key based on user image 1301. Deepfake verification system 1303 may also, in some embodiments, generate challenge 1305 (e.g., a random nonce, a liveness instruction, a session identifier, and/or some other type of value or information).

Subsequently, deepfake verification system 1303 may generate (at 1306) deepfake verification token 1307. As shown, deepfake verification token 1307 may be encrypted with the deepfake verification key (which was derived from user image 1301) and encapsulates user identifier 105 and challenge 1305. Deepfake verification system 1303 may forgo storing (at 1308) the deepfake verification key, ensuring that the key can only be reconstructed by processing a matching user image or biometric scan in the future.

Figure 13B:
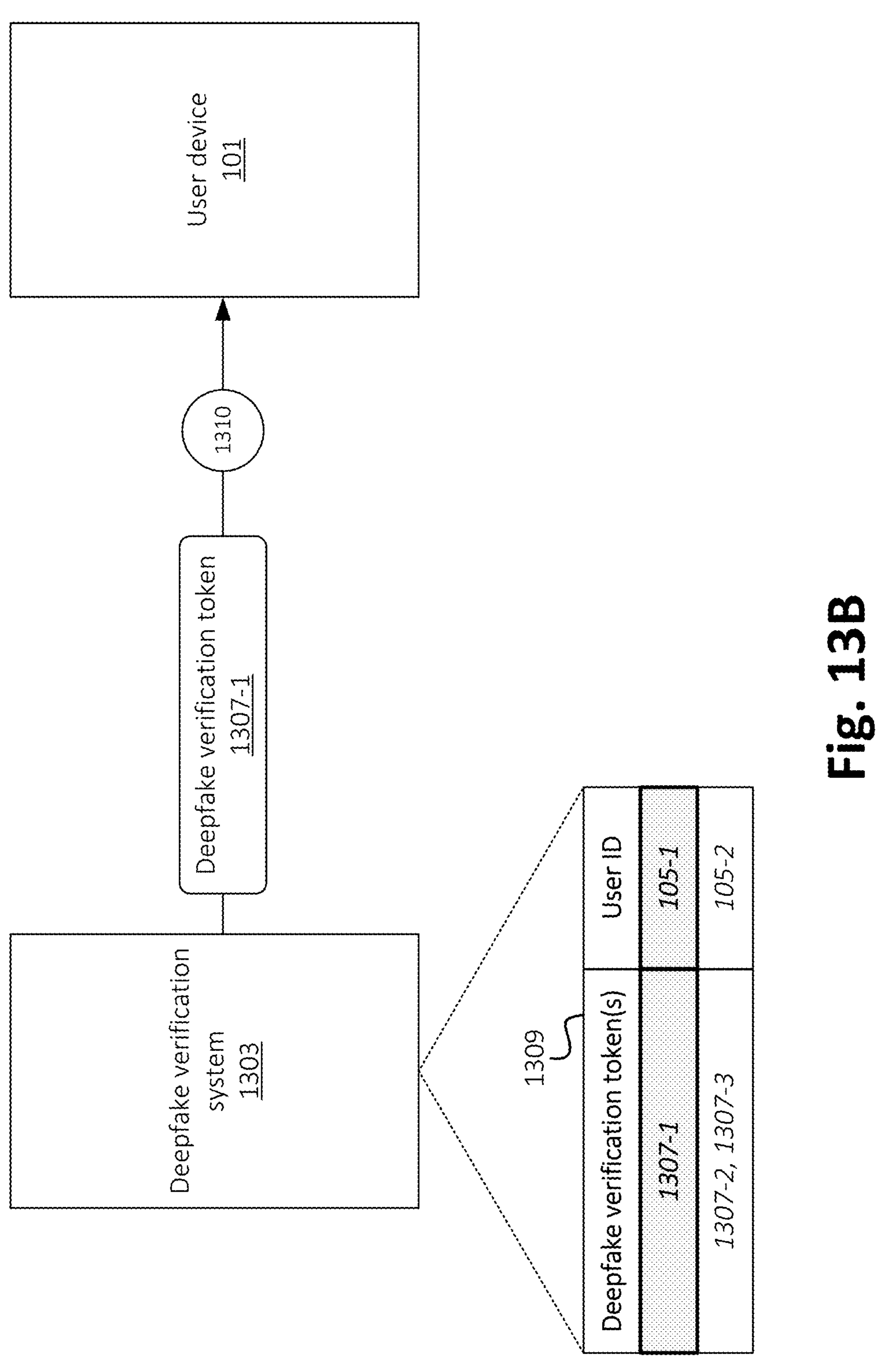

FIG. 13B illustrates the management and distribution of one or more deepfake verification tokens 1307. Deepfake verification system 1303 may, in some embodiments, maintain data structure 1309 linking user identifiers (e.g., 105-1, 105-2) to their respective deepfake verification tokens (e.g., 13*dv*-1, 13*dv*-2, etc.). In some embodiments, in addition to or in lieu of maintaining user identifiers 105 in "plaintext" form, data structure 1309 may include hashed values or other values derived from user identifiers 105. Deepfake verification system 1303 may maintain one or more secret keys, parameters, etc. based on which user identifiers 105 can be converted to hashed values or other suitable types of values, and further based on which user identifiers 105 can be obtained or extracted from such hashed values or other suitable types of values.

For the sake of example, data structure 1309 is described as associating respective user identifiers 105 with respective deepfake verification tokens 1307. For example, a particular user identifier 105-1 may be associated with deepfake verification token 1307-1, and another user identifier 105-2 may be associated with deepfake verification token 1307-2 and deepfake verification token 1307-3. For example, the same user may be associated with multiple different deepfake verification requests, which may be associated with the same or different requesting entities, where such different deepfake verification requests may each be associated with their own respective deepfake verification token 1307. When deepfake tokens are sent over end-to-end encrypted connections, the User ID may be replaced with connection IDs to route messages between anonymous users connected via a connection ID only.

As shown, deepfake verification system 1303 may transmit (at 1310) a specific deepfake verification token 1307 to a particular user device 101. For example, deepfake verification system 1303 may maintain information associating the particular user identifier 105-1 with a particular user device 101, and/or with contact information via which user device 101 is reachable (e.g., a telephone number, an IP address, an application instance identifier, or the like). Additionally, or alternatively, deepfake verification system 1303 may receive contact information associated with user device 101 with the deepfake verification request (received at 1302).

In some embodiments, user device 101 itself may output a deepfake verification request to deepfake verification system 1303. For example, an individual who requested (at 1302) the deepfake verification of the user of user device 101 may communicate (e.g., via voice call, chat message, etc. with the user of user device 101 to indicate that the user should request deepfake verification. Additionally, or alternatively, an individual requesting the deepfake verification may initiate an application-level notification (e.g., via an API) to user device 101, based on which user device 101 may programmatically obtain (at 1310) the corresponding deepfake token 1307-1. In such embodiments, user device 101 may output a user identifier 105 (i.e., user identifier 105-1, in this example) to deepfake verification system 1303, which may provide (at 1310) the corresponding deepfake verification token 1307-1.

Figure 13C:
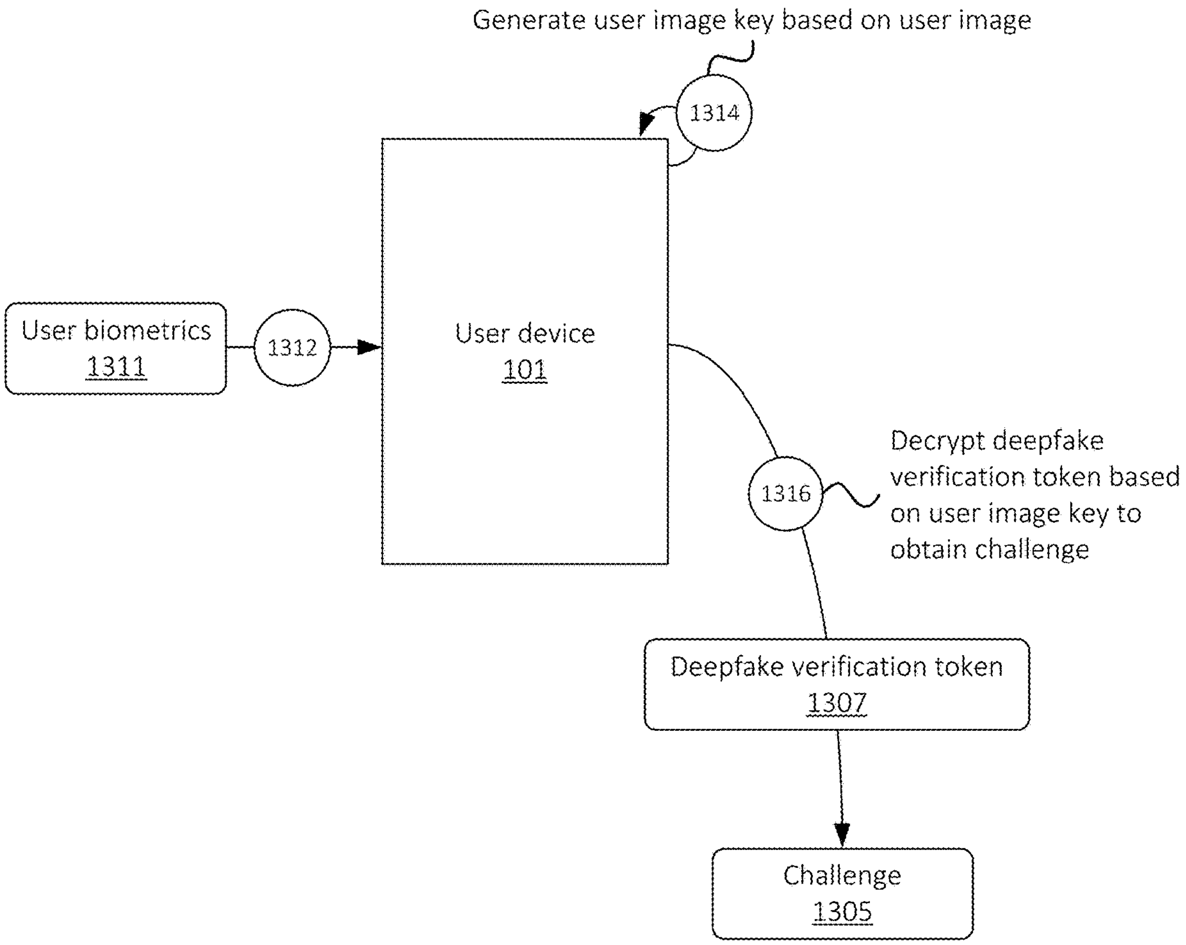

FIG. 13C illustrates the decryption of a deepfake verification token on a user device, which may ultimately serve to verify whether user image 1301 depicts a true image of a given user (or whether user image 1301 is a deepfake). User device 101 may receive (at 1312) user biometrics 1311. In some embodiments, user biometrics 1311 corresponds to a live facial scan or image capture of the user. User device 101 may generate (at 1314) a user image key based on user biometrics 1311 (e.g., using one or more suitable KDF operations or other types of cryptographic operations).

In some embodiments, generating (at 1314) the user image key may be conditional upon a successful liveness detection performed locally by user device 101. For example, before or during the capture of user biometrics 1311, user device 101 may perform an active liveness check (e.g., analyzing gaze tracking, detecting corneal reflections, or verifying depth map consistency) to ensure user biometrics 1311 correspond to a live user rather than a static image or video replay. If the liveness check fails, user device 101 may fundamentally inhibit the generation of the user image key, thereby preventing the decryption of deepfake verification token 1307. Furthermore, in some embodiments, challenge 1305 may include a specific instruction (e.g., "turn head left" or "blink twice") that must be concurrently satisfied by user biometrics 1311 for the generated user image key to successfully decrypt deepfake verification token 1307.

In some embodiments, the generation (at 1314) of the user image key may include some or all of the same operations used (at 1304) by deepfake verification system 1303 to generate the deepfake verification key that was used (at 1306) to encrypt deepfake verification token 1307. If user biometrics 1311 sufficiently match the original user image 1301 used in FIG. 13A, the generated user image key will match the original deepfake verification key. On the other hand, if the user biometrics 1311 sufficiently do not suitably match the original user image 1301, this may indicate that user image 1301 is not a true image of the user (e.g., is a deepfake or some other type of non-authentic image or depiction), and user device 101 may identify that deepfake verification token 1307 cannot be decrypted.

On the other hand, when deepfake verification token 1307 is successfully decrypted (at 1316) by the user image key, this may indicate that user image 1301 is a true capture or depicture of the user associated with user biometrics 1311. User device 101 may accordingly decrypt (at 1316) deepfake verification token 1307 using the generated user image key to obtain the underlying challenge 1305.

Figure 13D:
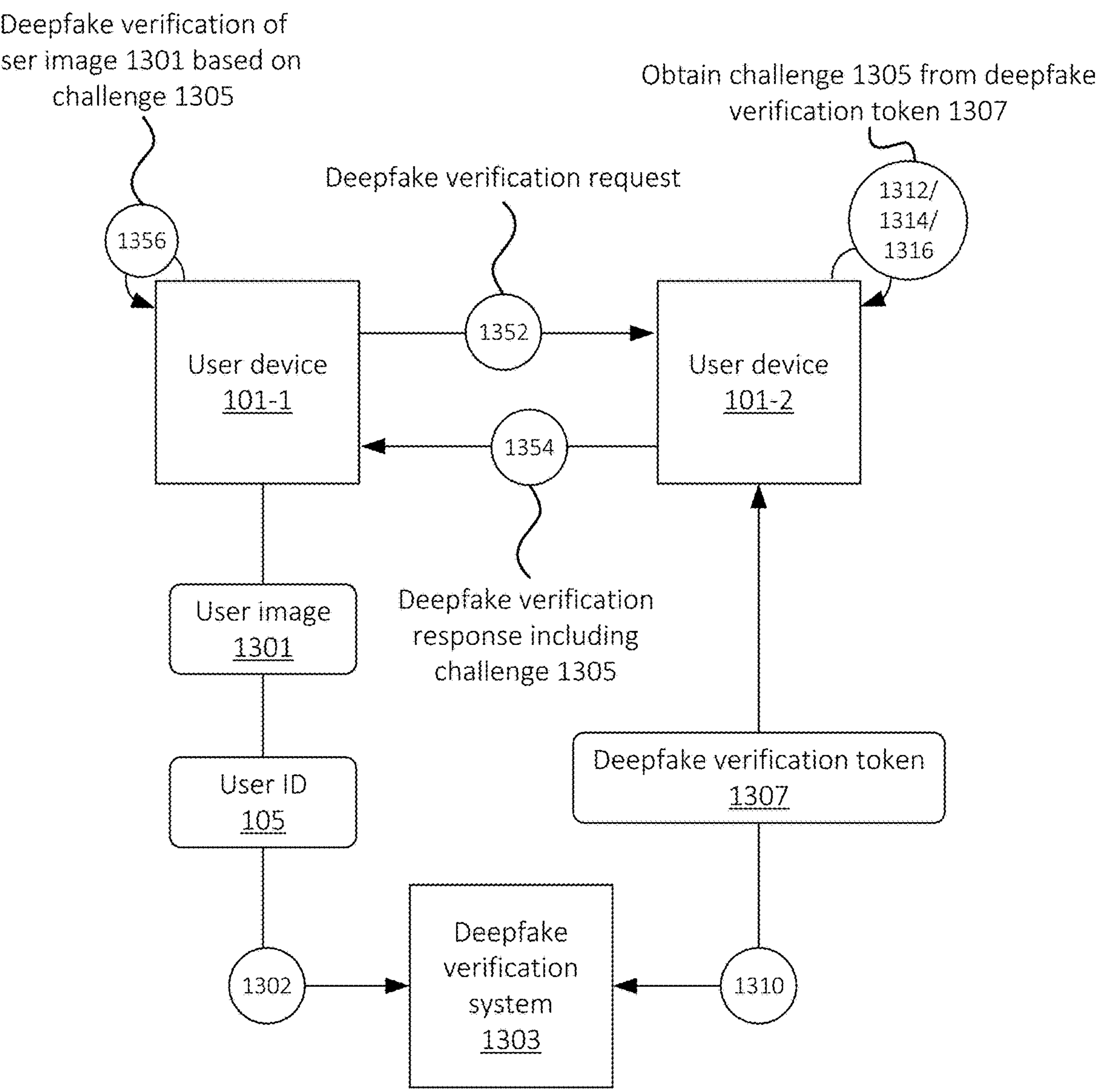

FIG. 13D illustrates a deepfake verification exchange between two user devices 101-1 and 101-2, which may include some or all of the operations described above with respect to FIGS. 13A-13C. Such operations are numbered with the same reference numerals (e.g., 1302, 1310, 1312, 1314, and 1316) as referred to above with respect to FIGS. 13A-13C. For the sake of brevity, some or all of these reference numerals may not be fully described again with respect to FIG. 13D.

As shown in FIG. 13D, a first user device 101-1 (e.g., a verifier) may transmit (at 1352) a deepfake verification request to a second user device 101-2 (e.g., a prover). In some embodiments, user device 101-1 may capture or receive user image 1301 associated with the user of user device 101-2. Deepfake verification system 1303 may provide the appropriate deepfake verification token 1307 to user device 101-2 (e.g., via operation 1310, as discussed above).

User device 101-2 may then decrypt deepfake verification token 1307 and obtain challenge 1305 (e.g., via some or all of operations 1312, 1314, and 1316 described above with respect to FIG. 13C. User device 101-2 may transmit (at 1354) a deepfake verification to user device 101-1. This response may include, or may be based on, the recovered challenge 1305 (and/or may indicate that challenge 1305 could not be recovered, such as due to non-matching user biometrics 1311 with respect to user image 1301).

User device 101-1 may then determine (at 1356) whether the original user image 1301 is a deepfake (or other type of non-authentic image or depiction of a given user) based on the response. For example, if the response (at 1354) included a correct copy of challenge 1305, then user device 101-1 may determine that the user in user image 1301 is the same user associated with user biometrics 1311. In some embodiments, user device 101-1 may use response (at 1354) as a factor based on which user device 101-1 performs deepfake verification or other suitable processes. For example, in some embodiments, the deepfake verification procedure described with respect to FIGS. 13A-13D may be a portion of an overall multi-factor deepfake verification procedure that is based on deepfake verification token-based verification of a given user, as well as one or more other mechanisms.

In addition to securing static data, the privacy-preserving mechanisms described herein may be extended to facilitate secure, peer-to-peer communication sessions between users. Just as secure data store 403 (e.g., a PPDS) protects sensitive information using keys derived from user biometrics and PINs without server-side knowledge, the following figures illustrate how similar biometric-based key derivation techniques can be used to establish ephemeral, end-to-end encrypted messaging channels. By generating public keys directly from user biometrics (e.g., facial scans) and exchanging them to create activation bundles, the system ensures that the routing and decryption of messages are cryptographically bound to the verified identities of the participants, rather than relying solely on centralized directory services or static passwords.

To facilitate per-connection, user biometrics-derived key exchange between peers (e.g., user devices 101 involved in a communication session), each peer may maintain one or more keys (e.g., long term connection establishment keys) which are used to encrypt and/or sign connection establishment messages. In some embodiments, such keys are not necessarily derived from user biometrics, and may be used during a connection establishment handshake, as discussed below. These connection establishment keys include one or more keys stored within secure data store 403, and/or one or more public keys (e.g., encryption and/or signing keys) may be registered with a server (e.g., a message routing server) for easy retrieval during a connection handshake. In some embodiments, while the server is able to provide a directory of public keys (e.g., keys that are not biometrics-derived keys) per peer, these keys are used only to encrypt or otherwise protect public keys exchanged during a connection handshake between the peers. Protecting session-specific public keys during the handshake ensures the server is never aware of, and cannot track, session-bound public keys or their usage ensuring the entire communication system preserves anonymity and confidentiality after the establishment of a connection.

As referred to herein, the long-term public encryption and signing keys of user device 101-1 may be referred to as "LTPK1," and the long-term public encryption and signing keys of user device 101-2 may be referred to as "LTPK2." The long term public keys may each correspond to private, or secret keys. For example, LTPK1 may include a first public key that corresponds to a first long term secret key ("LTSK1"), and LTPK2 may include a second public key that corresponds to a second long term secret key ("LTSK2"). As similarly noted above, LTPK1 may include or refer to multiple public keys, and LTSK1 may accordingly refer to multiple corresponding private, or secret, keys. Additionally, LTPK2 may include or refer to multiple public keys, and LTSK2 may accordingly refer to multiple corresponding private, or secret, keys. In some embodiments, user devices 101 may securely store their private, or secret, keys in respective secure data stores 403, in a manner discussed above.

Furthermore, self-certifying identifiers may be used during message routing, as discussed below. These identifiers may include or may be based on, for each user device 101, its corresponding long-term public key and, a user identifier associated with user device 101 and/or other suitable information. In some embodiments, for example, the self-certifying identifier for user device 101-1 may be generated by hashing (e.g., using Secure Hashing Algorithm ("SHA")-3 and/or some other suitable methodology) LTPK1 and the user identifier associated with user device 101-1. Similarly, the self-certifying identifier for user device 101-2 may be generated by hashing LTPK2 and a user identifier associated with user device 101-2. As discussed herein, these self-certifying identifiers may be used for message routing and detection of person-in-the middle attacks (e.g., which may include key substitution by a message routing server or other entity), as substitution of these keys would render the message routing inoperable, in accordance with some embodiments.

Figure 14:
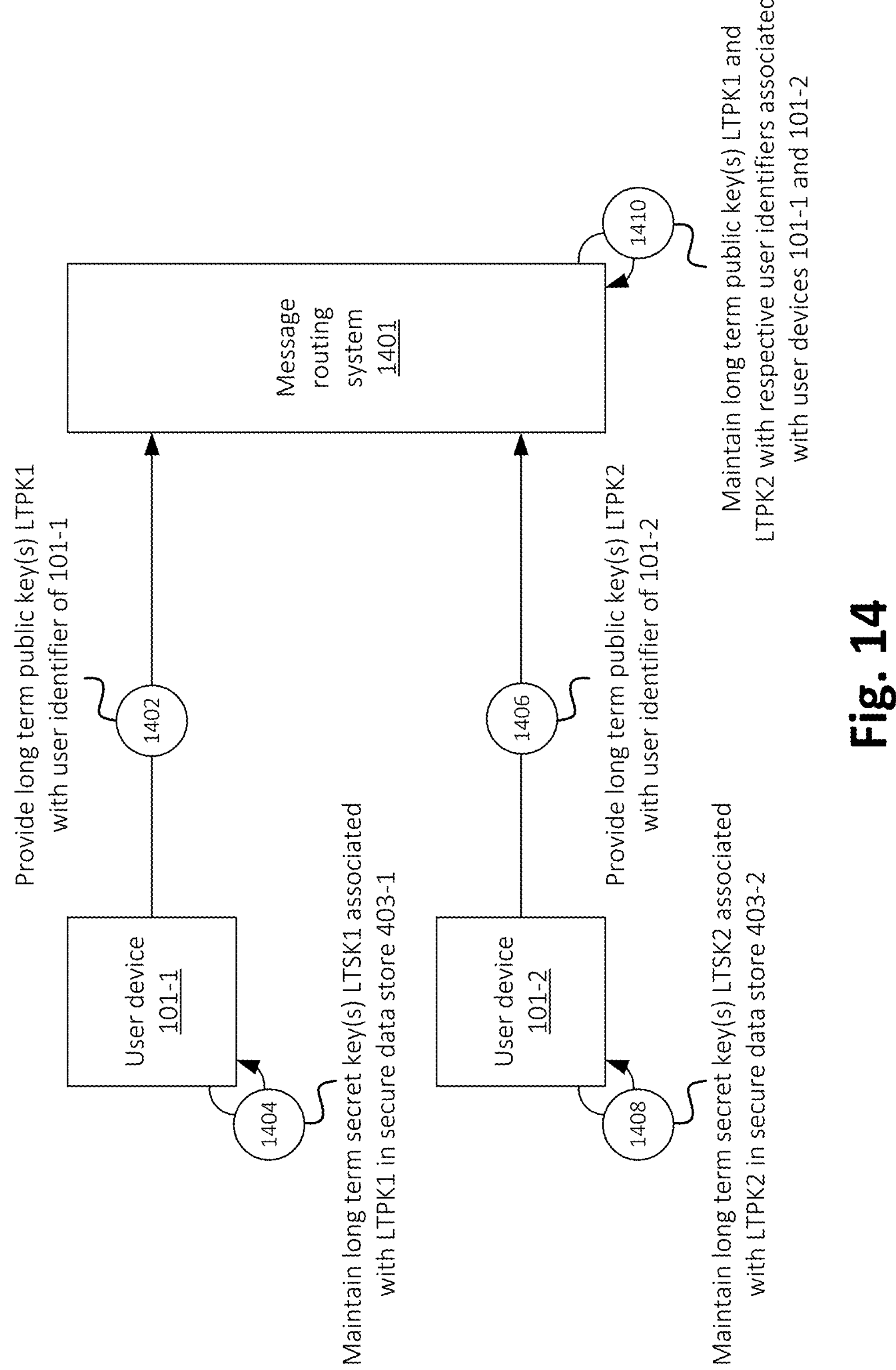
FIG. 14 depicts the exchange and/or establishment of long term public keys associated with one or more user devices, which may be used to establish a secure communication session.

FIG. 14 illustrates the registration of long-term public keys with message routing system 1401 of some embodiments, to facilitate secure connection establishment, in accordance with some embodiments. As shown, a first user device 101-1 may generate, derive, etc. a first long-term public key (LTPK1) and a corresponding long-term secret key (LTSK1). In some embodiments, these keys are generated during an initial account setup or registration phase.

To enable other users to discover and establish secure connections with user device 101-1 in accordance with some embodiments, user device 101-1 may provide (at 1402) LTPK1 to message routing system 1401. As shown, providing (at 1402) LPTK1 may include indicating an association between LTPK1 and a user identifier of user device 101-1 (e.g., a phone number, email address, or handle). Message routing system 1401 may store this association in a directory or lookup table, allowing other devices to retrieve LTPK1 by querying the user identifier. Additionally, as noted above, LPTK1 may be associated with one or more secret or private keys, represented as "LTSK1." User device 101-1 may further maintain or store (at 1404) LTSK1, such as in secure data store 403-1 associated with user device 101-1, using a secure data store generation or modification procedure described above.

Similarly, one or more other user devices 101 (e.g., a second user device 101-2) may generate its own key pair (LTPK2 and LTSK2) and provide (at 1406) LTPK2 along with its user identifier to message routing system 1401, and maintain or store (at 1408) the corresponding LTSK2 (e.g., in secure data store 403-2). Additionally, message routing system 1401 may maintain (at 1410) LTPK1 and LTPK2. By registering these keys centrally (e.g., with message routing system 1401), some embodiments enable devices such as user devices 101-1 and 101-2 to retrieve the necessary public keys (LTPK1 or LTPK2) to encrypt initial connection establishment messages without requiring an insecure direct exchange between the devices. As noted above, while message routing system 1401 maintains these public keys, it does not have access to the corresponding private keys (LTSK1 and/or LTSK2), or biometric-based session keys (e.g., as discussed below) which may be used for secure messaging as discussed below.

FIGS. 15A-16D illustrate an example procedure for activating the communication session with a privacy-preserving messaging system, such as message routing system 1401. As discussed below, message routing system 1401 may facilitate anonymous message queuing and/or routing, in which message routing system 1401 does not associate any message with any given user or user device, but still facilitates proper routing of messages to their intended recipients. Additionally, the message routing mechanics allow user devices (e.g., user devices 101-1 and 101-2) to send and receive messages to and from one another, without needing to send such messages to each other directly (thus removing the ability for a malicious entity to detect direct communications between such user devices).

Figure 15A:
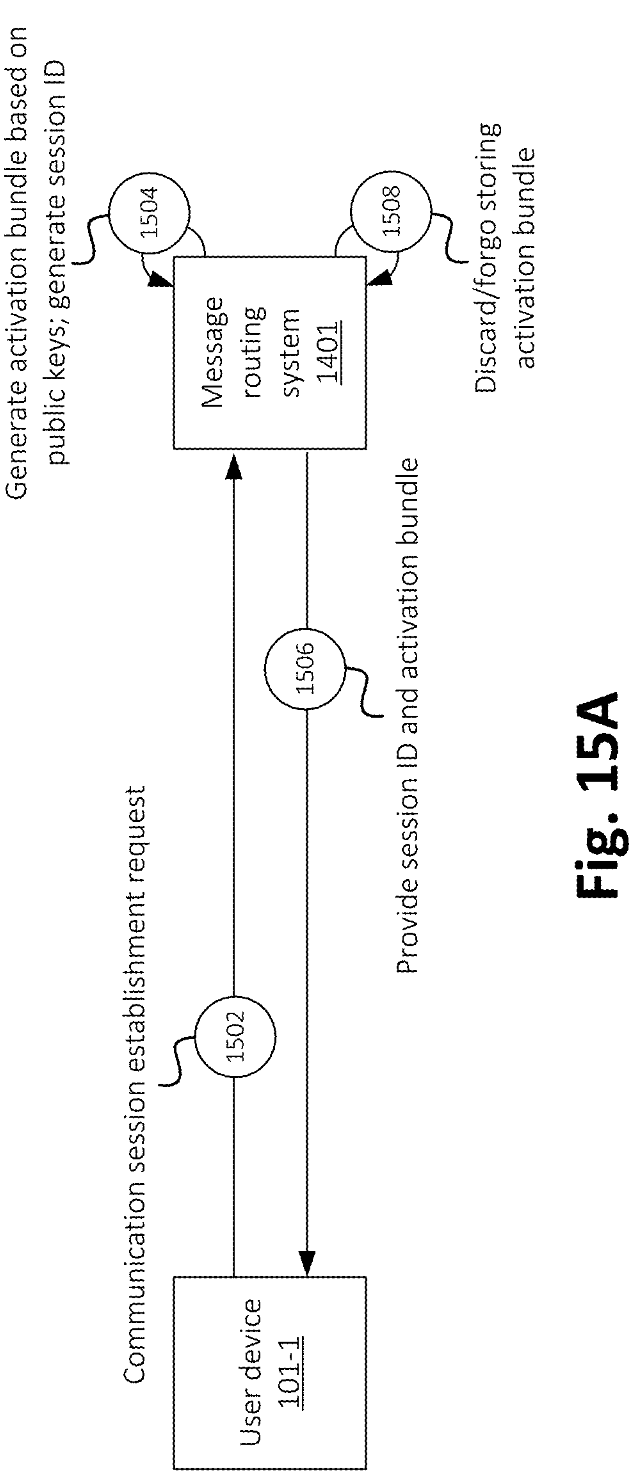

As shown in FIG. 15A, user device 101-1 may transmit (at 1502) a communication session establishment request to message routing system 1401. In some embodiments, the communication session establishment request may include a first user identifier associated with user device 101-1 (e.g., an email address, a user name, etc.) and a second user identifier associated with another user device 101 with which the requested communication session is associated (e.g., an intended participant of the communication session), such as user device 101-2.

Upon receiving the request, message routing system 1401 may generate (at 1504) an activation bundle based on the established long term public keys (e.g., LTPK1 and LTPK2, which may be stored in a local directory of message routing system 1401 and/or which may otherwise be retrieved or obtained by message routing system 1401). For example, message routing system 1401 may identify such long term public keys based on a previously registered association between the user identifiers and their associated long term public keys, as discussed above.

Message routing system 1401 may further generate (at 1504) a session ID associated with the requested communication session. That is, different session IDs may refer to different communication sessions between varying sets of user devices 101. In some embodiments, multiple different communication sessions may be established between the same set of user devices 101 (e.g., multiple communication sessions between user device 101-1 and user device 101-2), where each one of these communication sessions may be associated with its own respective session ID. As discussed below, the activation bundle may be used to signify that user device 101-1 and user device 101-2 have approved the establishment of the communication session, and may further serve to verify the authenticity of secure messages exchanged via message routing system 1401 during a connection handshake.

Figure 15B:
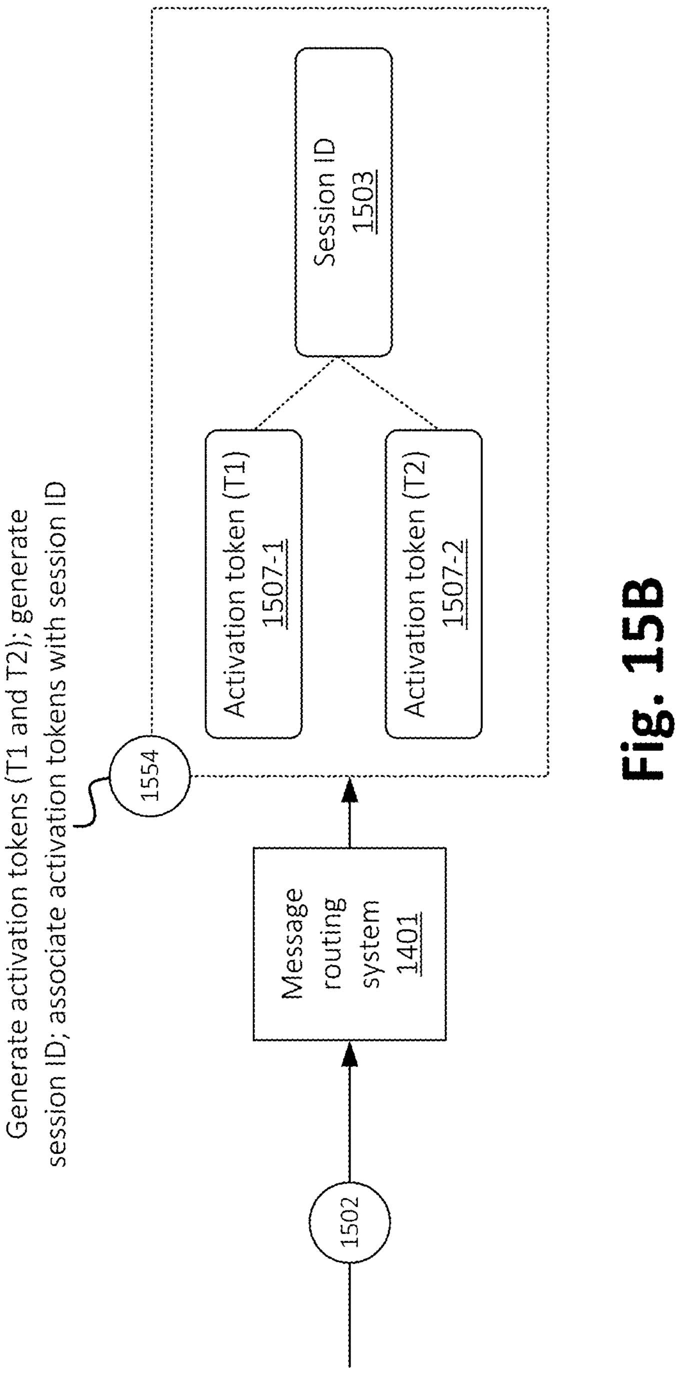

FIG. 15B illustrates an example of the internal generation (e.g., at 1504) of activation tokens and session identifiers by the message routing system, in accordance with some embodiments. Upon receiving the request (at 1502), message routing system 1401 may generate (at 1554) a unique session ID 1503 and a pair of activation tokens, which may include a first activation token (T1) 1507-1 and second activation token (T2) 1507-2. Message routing system 1401 may associate these activation tokens 1507-1 and 1507-2 (e.g., T1 and T2) with the particular session ID 1503, thereby linking activation tokens 1507-1 and 1507-2 to the specific communication session being established. As discussed above, while such communication session is associated with user devices 101-1 and 101-2, message routing system 1401 may not maintain any association between such user devices 101 and activation tokens 1507-1 and/or 1507-2 and/or session ID 1503.

Returning to FIG. 15A, message routing system 1401 may subsequently provide (at 1506) the session ID and the activation bundle to user device 101-1. In some embodiments, to maintain security and secrecy, message routing system 1401 may discard or forgo storing (at 1508) the activation bundle after passing it to user device 101-1.

FIG. 15C illustrates an example data structure 1513 maintained by message routing system 1401, in accordance with some embodiments. Data structure 1513 (e.g., a lookup table or database) may store mappings between specific Session IDs (e.g., "Session_1") and their corresponding activation tokens (e.g., "T1, T2"). This association allows message routing system 1401 to authorize requests to route messages based on the presentation of valid tokens.

Figure 15D:
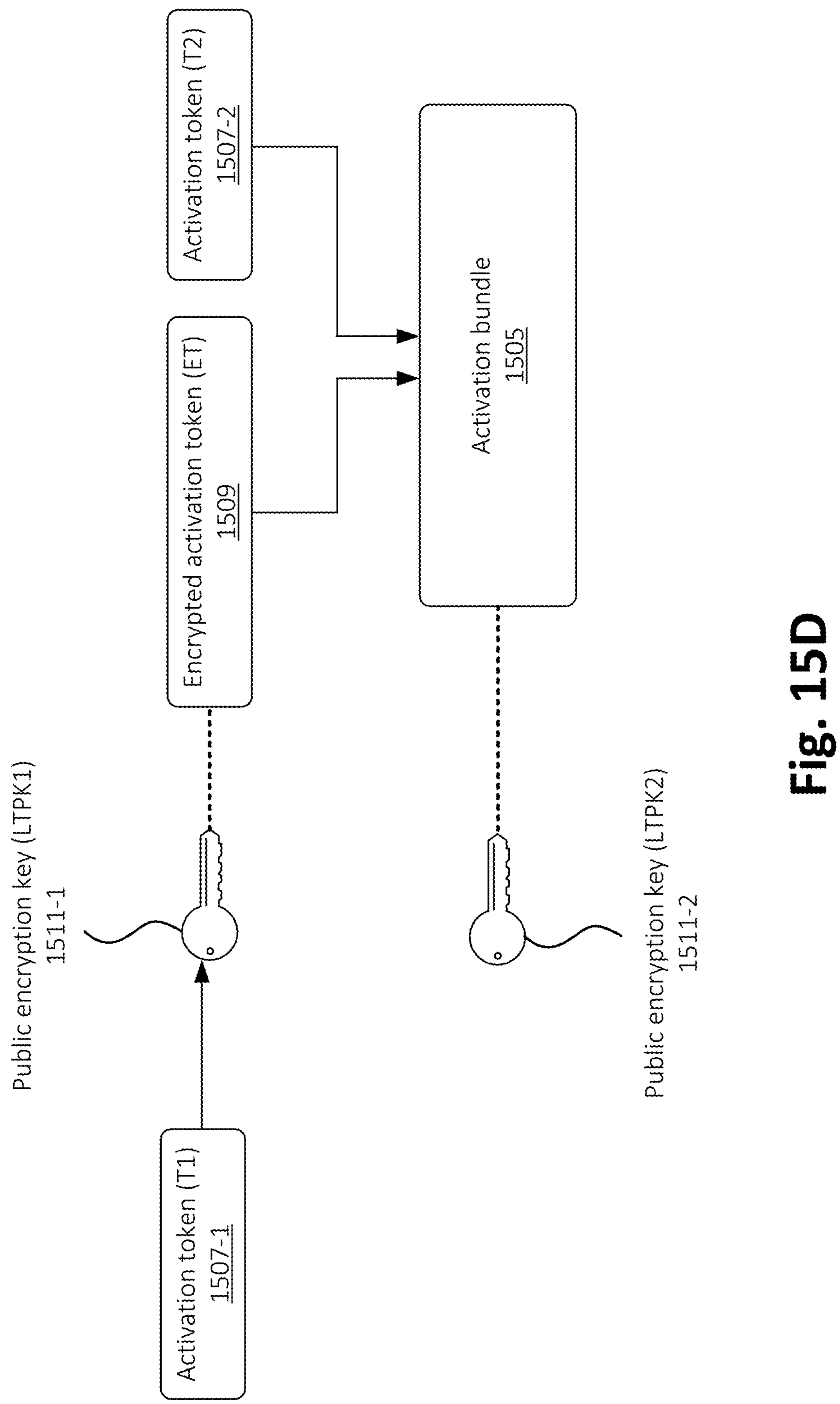

FIG. 15D is a schematic diagram illustrating the cryptographic construction of the activation bundle, in accordance with some embodiments. As shown, first activation token (T1) 1507-1 may be encrypted using a first public encryption key 1511-1 (e.g., LTPK1 or a portion thereof, such as a public encryption key included in LTPK1 when LTPK1 includes the public encryption key, a public signing key, and/or other suitable information) to generate encrypted activation token (ET) 1509. Subsequently, activation bundle 1505 may be generated by combining encrypted activation token (ET) 1509 and second activation token (T2) 1507-2, and encrypting the combination using a second public encryption key 1511-2 (e.g., LTPK2 or a portion thereof). Consequently, activation bundle 1505 is secured such that it must first be processed by the second user.

Figure 15E:
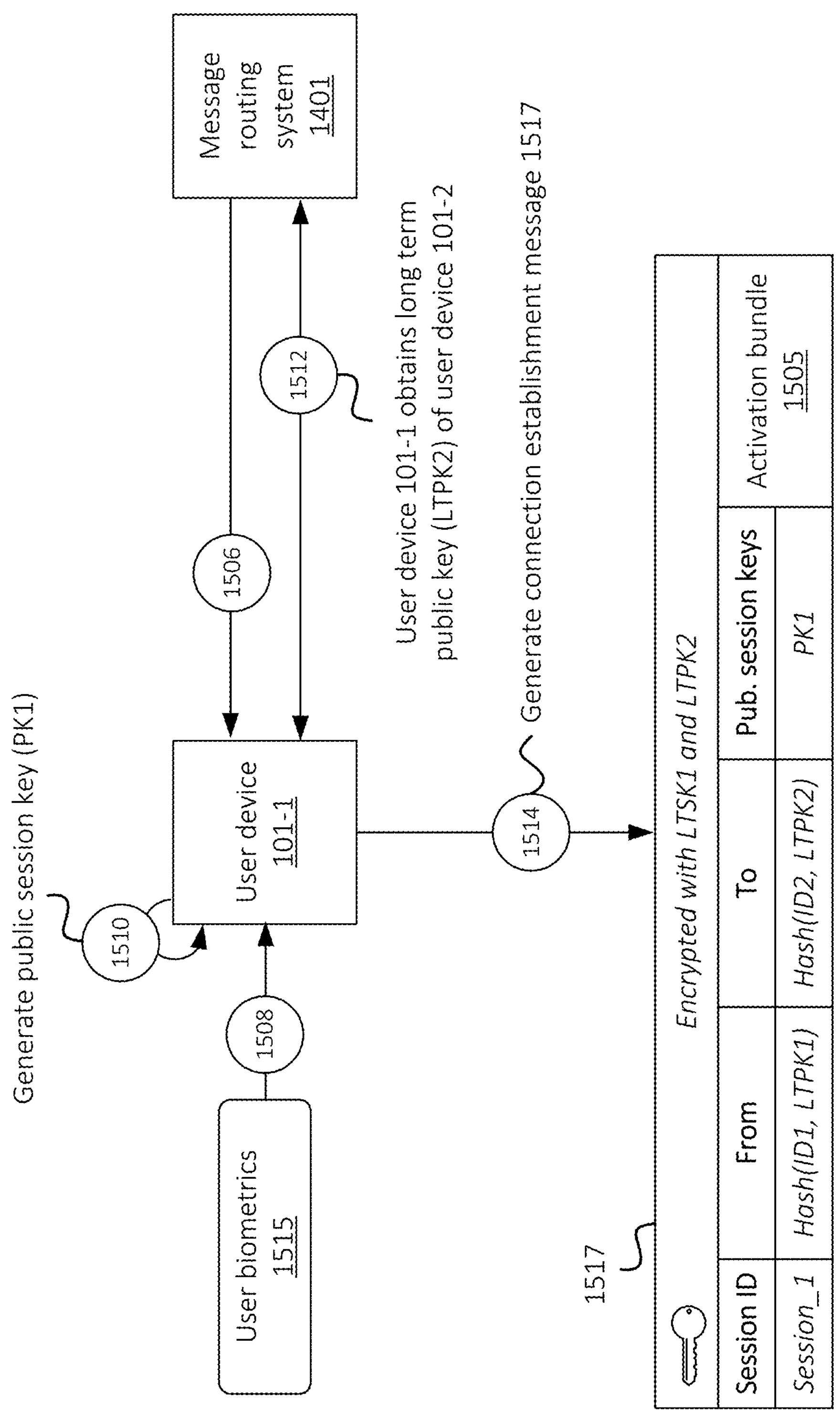

Thus, although activation bundle 1505 is received (at 1506) by the user device 101-1, it is "opaque" (e.g., not able to be decrypted by) user device 101-1, as the overall bundle is encrypted with key information not decryptable by user device 101-1 (e.g., encrypted based on LTPK2, which may require biometrics-derived private keys which is available based on user biometrics associated with a user of user device 101-2). For example, as shown in FIG. 15E, upon receiving (at 1506) the session ID and activation bundle 1505, user device 101-1 may obtain (at 1508) user biometrics 1515 from a user of user device 101-1. For example, user device 101-1 may present a prompt for fresh user biometrics 1515 based on receiving (at 1506) the session ID and/or activation bundle 1505. User device 101-1 may further may generate (at 1510) one or more public session keys (e.g., where a first set of public session keys is referred to as "PK1," a second set of public session keys is referred to as "PK2," and so on) based on the fresh user biometrics 1515, in a manner similar to that discussed above. This process ensures that the public session keys are cryptographically bound to the specific biometric instance (e.g., user biometrics 1515) of the first user. User device 101-1 may further obtain (at 1512) the long term public keys (LTPK2) of the connection target device (e.g., user device 101-2) from message routing system 1401 and/or some other suitable source (e.g., based on a user identifier of user device 101-2).

Using the public encryption key of user device 101-2 (e.g., LTPK2 or a portion thereof), and its own private encryption key (e.g., LTSK1 and a portion thereof), user device 101-1 may generate (at 1514) connection establishment message 1517. As shown, in some embodiments, connection establishment message 1517 may include the session ID, an identifier of user device 101-1 (e.g., as a "from" or "initiator" field), the identifier of user device 101-2 (e.g., as a "to" or "acceptor" field, PK1, and activation bundle 1505. In some embodiments, in addition to or in lieu of "plaintext" identifiers of user devices 101-1 and/or 101-2, connection establishment message 1517 may include hashed values or other type of cryptographically computed values. For example, in addition to or in lieu of a "plaintext" identifier of user device 101-1, connection establishment message 1517 may include a first computed value (e.g., using SHA3 or some other suitable type of operation) associated with user device 101-1 (e.g., based on LTPK1 and a user identifier of user device 101-1), and a second computed value (e.g., using SHA3 or some other suitable type of operation) associated with user device 101-2 (e.g., based on LTPK2 and a user identifier of user device 101-2).

Generating connection establishment message 1517 may include encrypting the connection establishment message with LTPK2 or a portion thereof (e.g., a public encryption key portion of LTPK2), and may sign the connection establishment message with LTSK1 (e.g., a private signing key portion of LTSK1). In some embodiments, connection establishment message 1517 may additionally include metadata (e.g., metadata that is not encrypted with LTPK2 and/or is not encrypted with LTSK1) indicating a user identifier, a device identifier, and/or other suitable identifier of user device 101-1. For example, such metadata may include application layer, network layer, or transport layer metadata such as an IP address, application layer metadata such as a user name, and/or other suitable metadata that is decryptable by or otherwise accessible to user device 101-2.

Figure 16A:
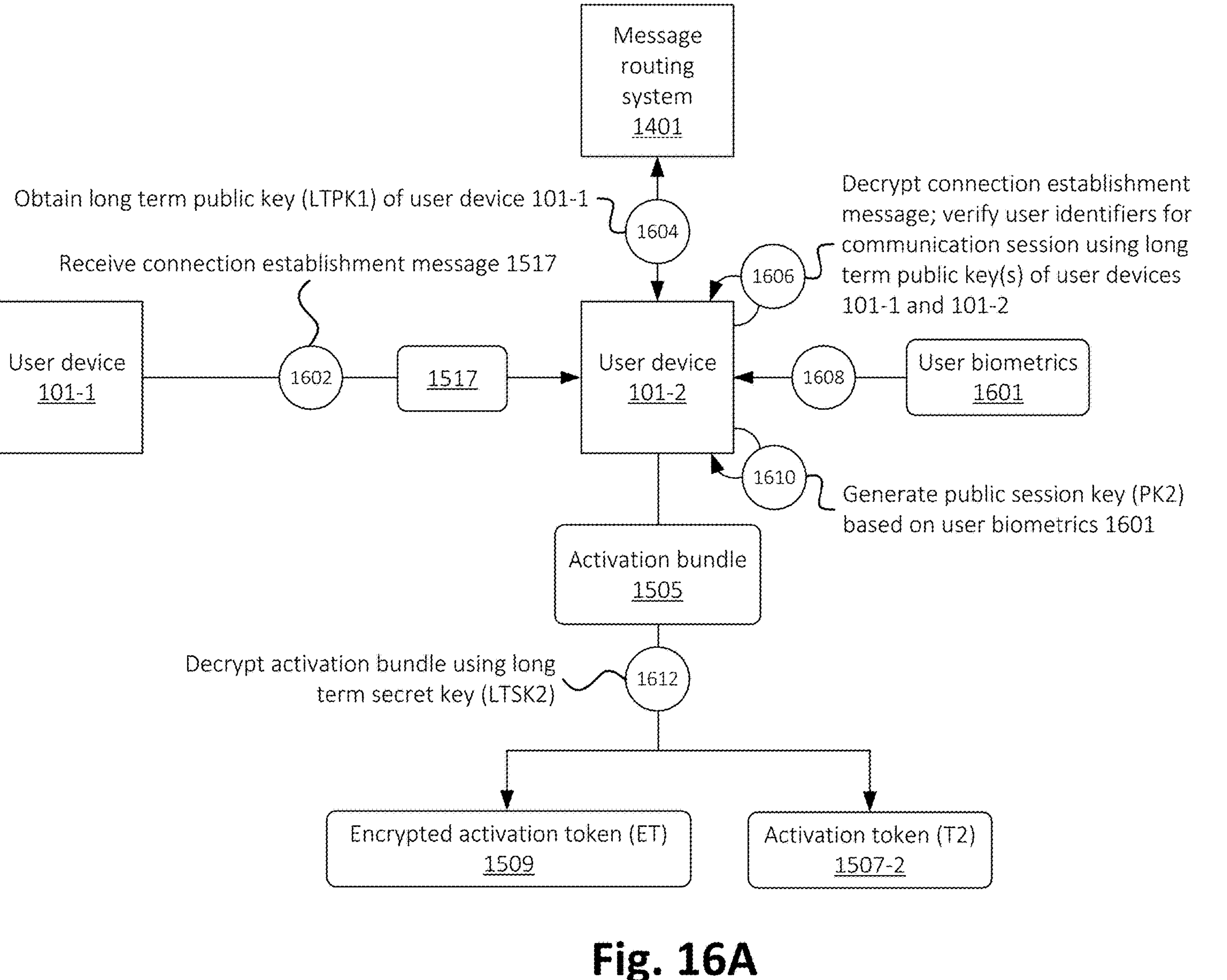
FIGS. 16A-16D illustrate the processing of an activation bundle by user devices to recover activation tokens and the subsequent activation of the session at a message routing system.

FIG. 16A illustrates example processing of connection establishment message 1517 by the second user device 101-2, in accordance with some embodiments. As shown, user device 101-2 may receive (at 1602) connection establishment message 1517 from user device 101-1 (e.g., via a routing mechanism of message routing system 1401 and/or via some other suitable mechanism). Because the connection establishment message is encrypted with LTPK2, PK1 may not be "visible" or accessible (e.g., to message routing system 1401) and/or some other device that routes or forwards connection establishment message 1517. User device 101-2 may identify a user identifier associated with user device 101-1 (e.g., based on metadata of connection establishment message 1517, as discussed above).

User device 101-2 may obtain (at 1604) LTPK1 (e.g., from message routing system 1401 and/or some other suitable source). User device 101-2 may decrypt (at 1606) connection establishment message 1517 (e.g., using its own secret key LTSK2 as well as the obtained LTPK1 associated with user device 101-1). User device 101-2 may use LTPK1 or a portion thereof (e.g., a public signing key included in LTPK1) to verify (at 1606) that connection establishment message 1517 was not tampered with, altered, etc. (e.g., a person-in-the-middle attack). For example, user device 101-2 may generate (at 1606, e.g., using SHA3 or some other suitable type of operation) a first value associated with user device 101-1 (e.g., based on LTPK1 and a user identifier of user device 101-1), and a second value associated with user device 101-2 (e.g., based on LTPK2 and a user identifier of user device 101-2), as similarly discussed above, to ensure that such values match user identifiers (e.g., "from" and/or "to" identifiers in the connection establishment message, as discussed above). This operation may serve to detect and prevent any key substitution, such as by message routing system 1401 or some other entity. In this manner, user device 101-2 may verify that the derived device identifiers associated with user devices 101-1 and 101-2 were the subject of the initial connection establishment request from user device 101-1, as verifying integrity of their corresponding long term public keys. User device 101-2 accordingly has possession of the session ID, the user identifiers specified in the connection establishment message (e.g., the "from" and/or "to" user identifiers associated with user devices 101-1 and 101-2), PK1, and activation bundle 1505.

As further shown, user device 101-2 may receive (at 1608) user biometrics 1601 (e.g., a fresh set of user biometrics, requested based on extracting activation bundle 1505 from connection establishment message 1517), and generate (at 1610) one or more biometrics-based public session keys (e.g., one or more public encryption and/or signing keys that are based on user biometrics of a user of user device 101-2). The biometrics-based public session keys associated with user device 101-2 may be referred to herein as "PK2." In some embodiments, user device 101-2 may maintain (e.g., in secure data store 403-2 of user device 101-2 and/or in some other suitable manner) an association between PK1, PK2, and the session ID, therefore effectively "binding" PK1 (received in connection establishment message 1517), PK2 (generated (at 1610), and the particular communication session with user device 101-1.

User device 101-2 may further decrypt (at 1612, e.g., using LTSK2 or a portion thereof, such as a private encryption key) activation bundle 1505 to obtain ET 1509 and second activation token (T2) 1507-2. Since ET 1509 is encrypted using LTPK1, second activation token (T2) 1507-2 is "opaque" to (e.g., not decryptable by) user device 101-2.

Figure 16B:
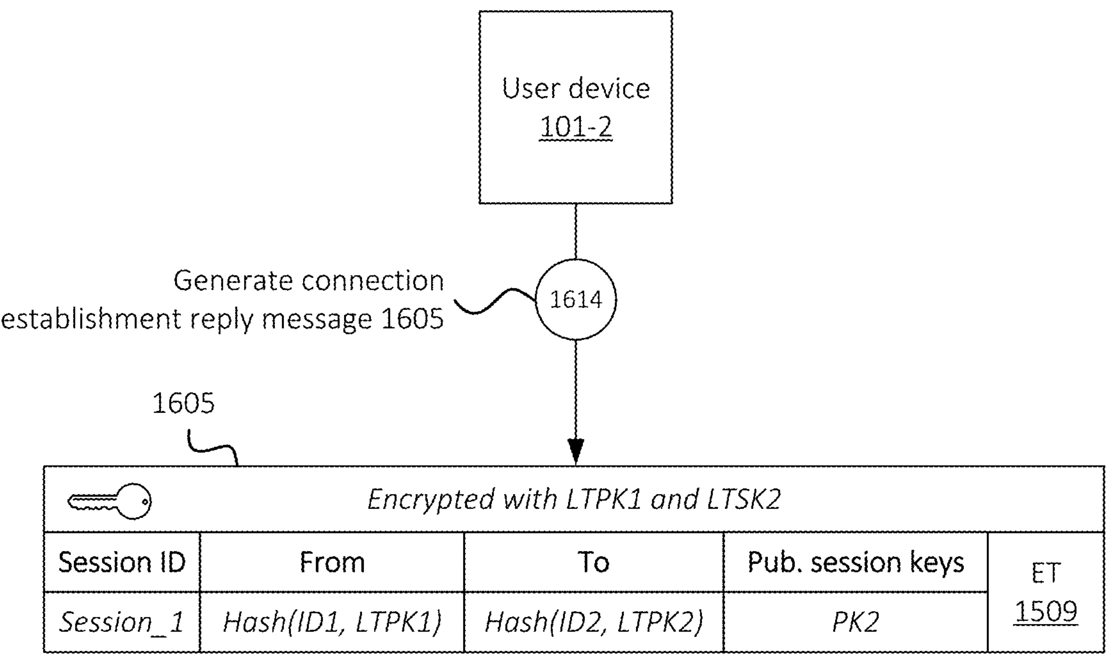
Figure 16C:
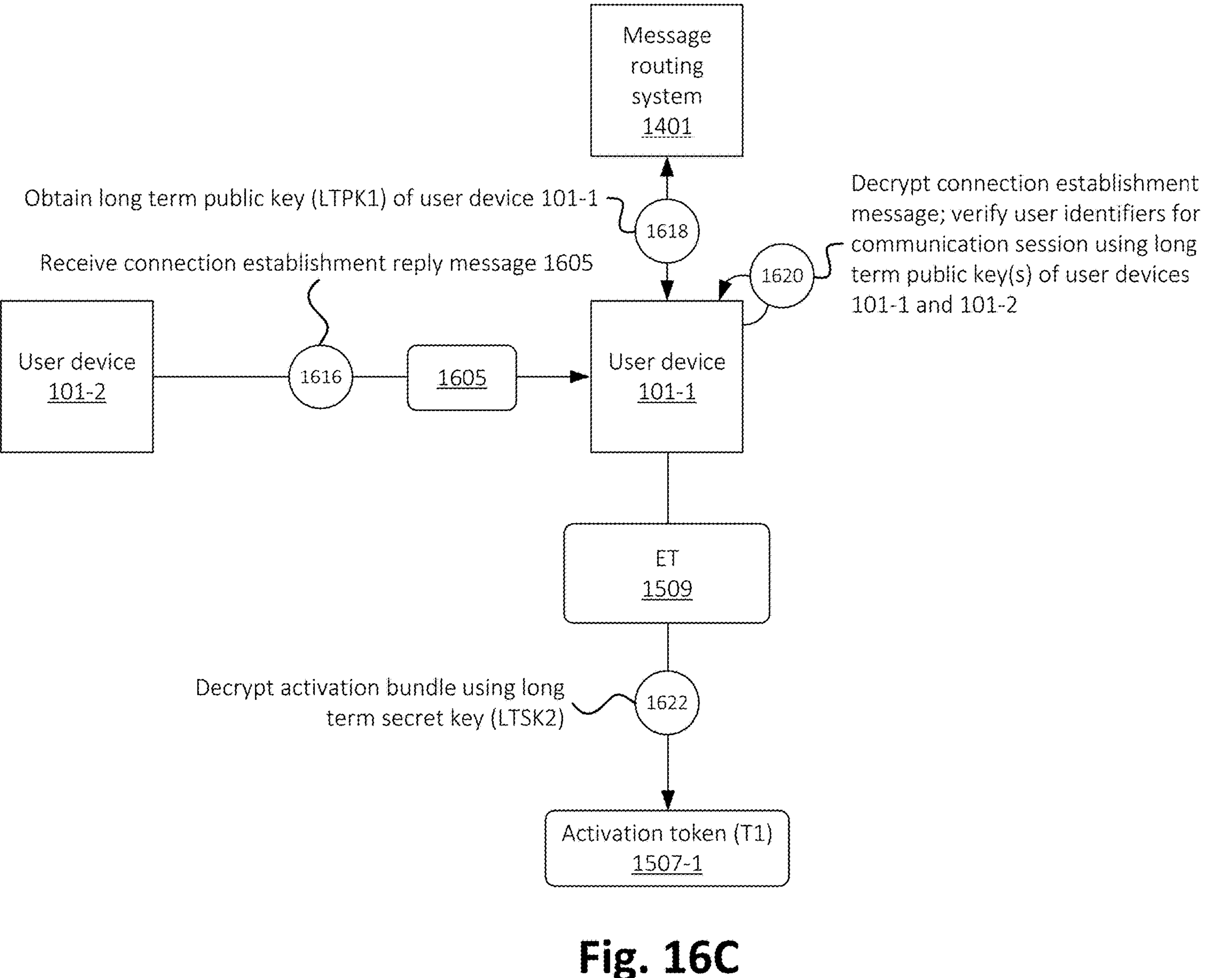

As discussed below, user device 101-2 may securely provide PK2 to user device 101-1 for subsequent use by user device 101-1, in accordance with some embodiments. For example, as shown in FIG. 16B, user device 101-2 may generate (at 1614) connection establishment reply message 1605, which may include the session ID, identifiers of user device 101-1 and 101-2 (e.g., "to" and/or "from" fields) or values derived therefrom (e.g., a first hash computed based on an identifier of user device 101-1 and LTPK1, a second hash computed based on an identifier of user device 101-2 and LTPK2), PK2, and ET 1509. In some embodiments, generating (at 1614) connection establishment reply message 1605 may include encrypting connection establishment reply message 1605 based on LTPK1 or a portion thereof (e.g., a public encryption key portion of LTPK1) and signed using LTSK2 (e.g., a private signing key portion of LTSK2). As shown in FIG. 16C, user device 101-2 may further provide (at 1616) connection establishment reply message 1605 to user device 101-1.

As further shown in FIG. 16C, based on receiving (at 1616) connection establishment reply message 1605, user device 101-1 may identify or obtain (at 1618) one or more public keys associated with the user identifier of user device 101-2 (e.g., may obtain retrieve LTPK2 or a portion thereof, such as a public signing key, from message routing system 1401), based on which user device 101-2 may verify (at 1620) the authenticity of the message (e.g., in a similar manner as described above). For example, user device 101-1 may decrypt (at 1620) connection establishment reply message 1605 (e.g., using its own secret key LTSK1 as well as the obtained LTPK2 associated with user device 101-2). User device 101-1 may use LTPK2 or a portion thereof (e.g., a public signing key included in LTPK2) to verify (at 1620) that connection establishment reply message 1605 was not tampered with, altered, etc. (e.g., a person-in-the-middle attack). For example, user device 101-1 may generate (at 1620, e.g., using SHA3 or some other suitable type of operation) a first value associated with user device 101-1 (e.g., based on LTPK1 and a user identifier of user device 101-1), and a second value associated with user device 101-2 (e.g., based on LTPK2 and a user identifier of user device 101-2), as similarly discussed above, to ensure that such values match user identifiers (e.g., "from" and/or "to" identifiers) in the connection establishment message, as discussed above. This operation may serve to detect and prevent any key substitution, such as by message routing system 1401 or some other entity. In this manner, user device 101-1 may verify that the derived device identifiers associated with user devices 101-1 and 101-2 were the subject of the initial connection establishment request from user device 101-1, as verifying integrity of their corresponding long term public keys. User device 101-1 accordingly has possession of the session ID, the user identifiers specified in connection establishment reply message 1605 (e.g., the "from" and/or "to" user identifiers associated with user devices 101-1 and 101-2), PK2, and ET 1509. Decrypting (at 1620) connection establishment reply message 1605 may include identifying or extracting ET 1509 from connection establishment reply message 1605, once decrypted. User device 101-1 may further decrypt (at 1622) ET 1509 (e.g., using LTSK1) to obtain the first activation token (T1) 1507-1. In some embodiments, user device 101-1 may maintain (e.g., in secure data store 403-1 of user device 101-1 and/or in some other suitable manner) an association between PK1, PK2, and the session ID, therefore effectively "binding" PK1 (generated earlier at 1510), PK2 (received in connection establishment message reply 1616), and the particular communication session with user device 101-2.

Figure 16D:
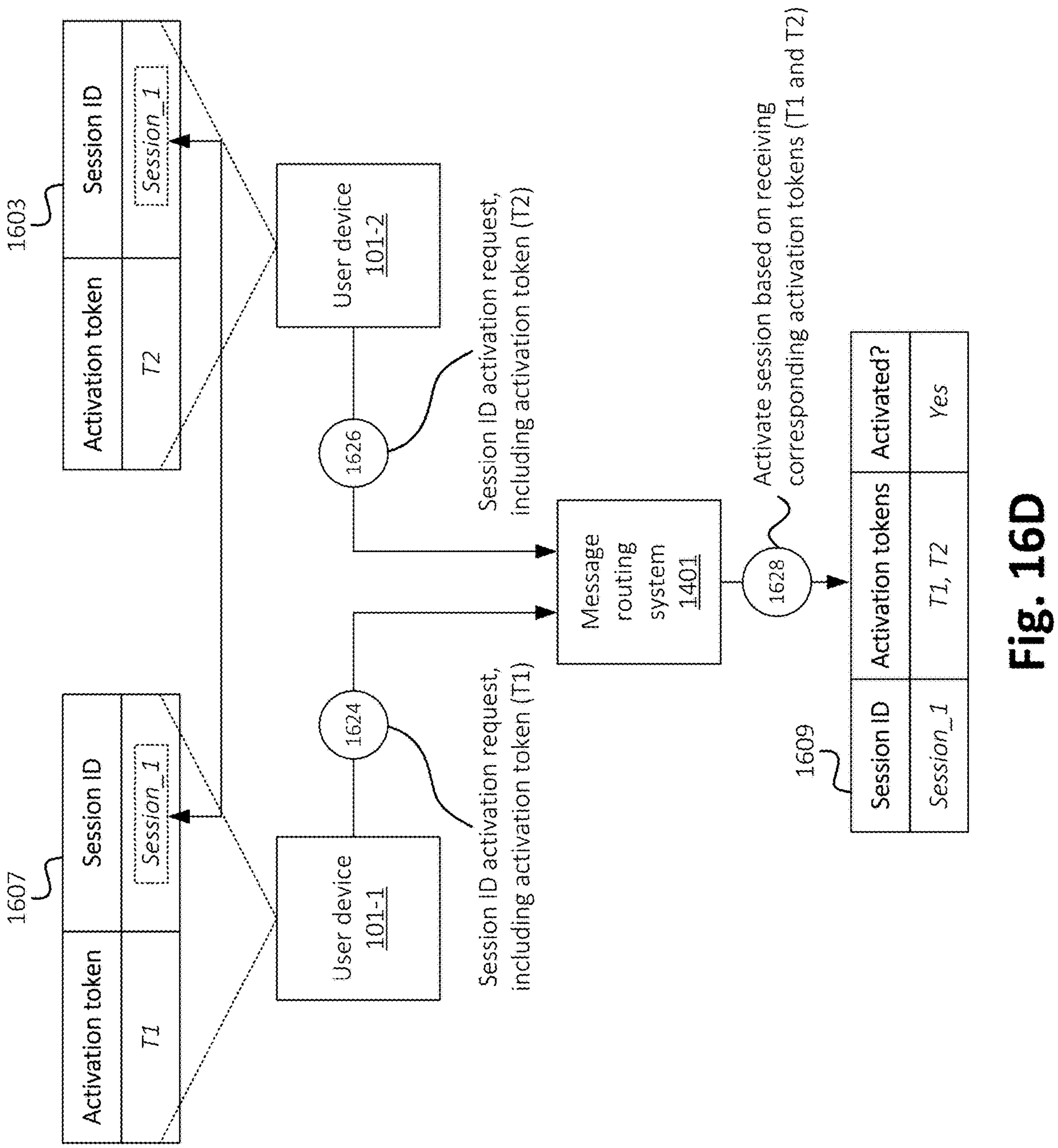

In this manner, as shown in FIG. 16D, local session table 1607 of user device 101-1 and local session table 1603 of user device 101-2 may both include respective activation tokens for the same session ID. User device 101-1 may transmit (at 1624) a session ID activation request, including activation token (T1) 1507-1, and user device 101-2 may transmit (at 1626) a session ID activation request including activation token (T2) 1507-2. Message routing system 1401 may receive these tokens and compare them against information associating session IDs with their respective activation tokens (e.g., as discussed above with respect to data structure 1513). Assuming that the activation tokens match the activation tokens previously associated the particular session ID, message routing system 1401 may generate data structure 1609, which may include an identifier that a particular session ID and/or set of activation tokens (e.g., "Session_1" and/or tokens T1 and T2), signifying (at 1628) that the session is active (e.g., that secure message routing associated with the particular session ID, and/or associated with tokens T1 and/or T2, is authorized to proceed).

FIG. 17A illustrates the routing of a secure message, in accordance with some embodiments. User device 101-1 may output (at 1702) a secure message, which may include or which may be accompanied by activation token (T1) 1507-1. In some embodiments, the secure message may be encrypted, signed, and/or otherwise secure. In some embodiments, the secure message may be encrypted using PK2 (e.g., a public encryption key). In some embodiments, the secure message may be signed using freshly captured user biometrics of a user of user device 101-1. In some embodiments, the signing of the secure message may be further based on a user biometrics-derived and session ID-derived private signing key (SK1) ephemerally generated for signing (corresponding to PK1 held by user device 101-2). In some embodiments, user device 101-1 may provide, with the secure message, a session ID (e.g., an identifier of the established session between user devices 101-1 and 101-2). In some embodiments, user device 101-1 may provide the secure message without the session ID (e.g., may provide the activation token (T1) without the session ID).

Message routing system 1401 may identify (at 1704) message routing information based on the activation token and/or session ID included with the secure message. For example, message routing system 1401 may query previously maintained session and/or activation token information (e.g., as discussed above with respect to data structures 1513 and/or 1609) to identify that the first activation token (T1) is associated with the second activation token (T2) and/or the corresponding session (e.g., Session_1, in this example). That is, message routing system 1401 may determine that messages from the first activation token (T1) should be routed to a device holding the second activation token (T2) (and/or are otherwise directed to or destined for a device holding the second activation token (T2)), and/or that messages associated with Session_1 should be associated with a message queue for this particular session.

Accordingly, message routing system 1401 may add (at 1706) the message to a privacy-preserving message repository 1701, including message routing information. The message routing information may include, for example, an indication that the particular message (shown as "Message_1," in this example) was sent from a device holding the first activation token (T1), that the particular message is directed to a device holding the second activation token (T2), and/or that the particular message is associated with the communication session corresponding to these activation tokens (e.g., Session_1, in this example).

Figure 17B:
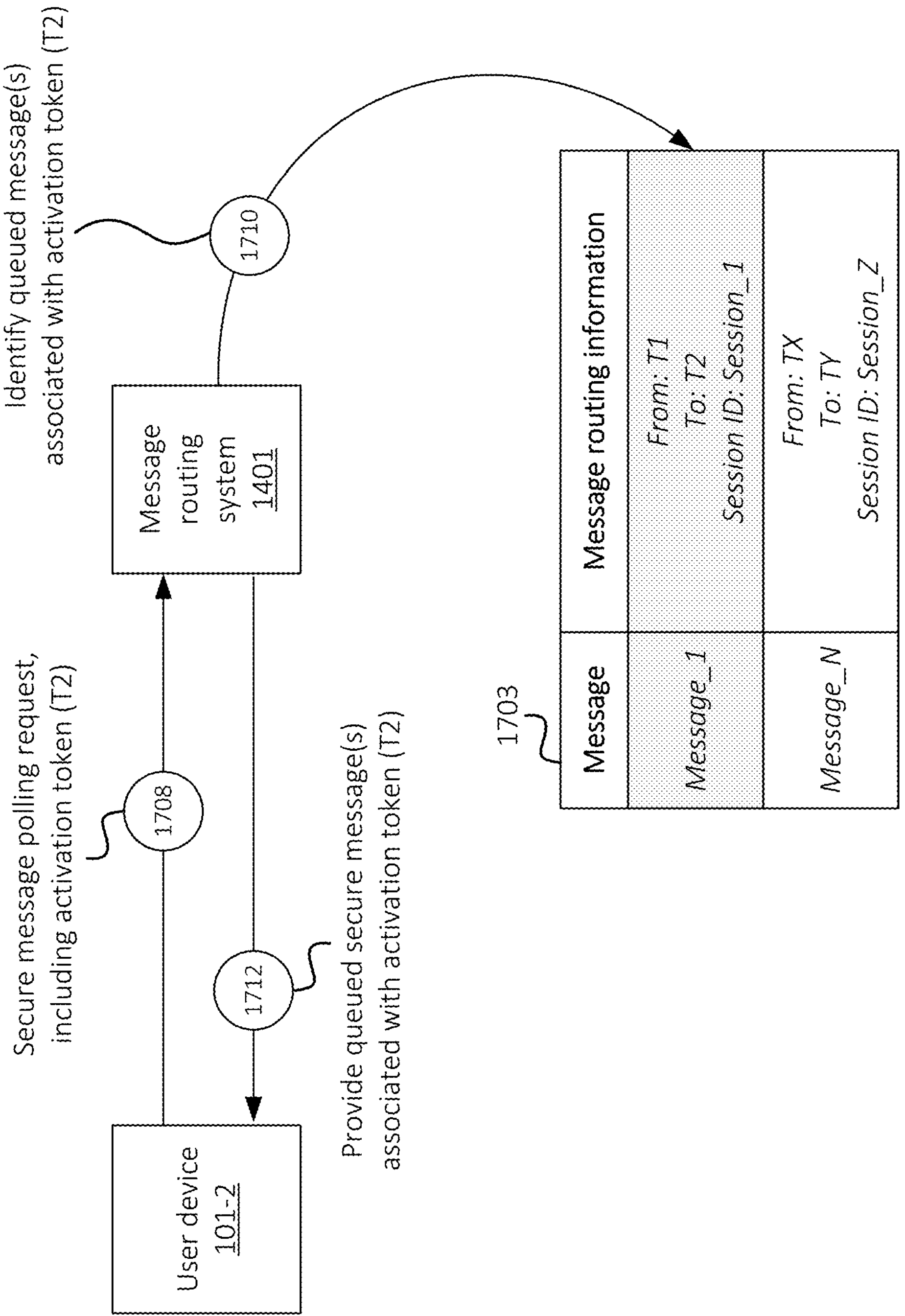

As shown in FIG. 17B, user device 101-2 may transmit (at 1708) a secure message polling request, including activation token (T2) 1507-2. For example, user device 101-2 may periodically or intermittently output (at 1708) the request, may output the request based on receiving an out-of-band notification from user device 101-1, and/or may output the request based on some other mechanism or triggering event.

Message routing system 1401 may identify (at 1710) queued messages associated with activation token (T2) 1507-2 by querying privacy-preserving message repository 1703 (e.g., which may include some or all of the information provided above with respect to privacy-preserving message repository 1701). In this example, privacy-preserving message repository 1703 indicates that "Message_1" is destined for a device holding second activation token (T2). Because user device 101-2 presented (at 1708) the second activation token (T2), message routing system 1401 may determine that user device 101-2 is authorized to receive this message, and may provide (at 1712) the queued secure message (and any other messages that user device 101-2 is authorized to receive, which may include multiple secure messages from user device 101-1 and/or from other senders, which may have been received in the interim between the last time user device 101-2 checked for messages and the current request) to user device 101-2. User device 101-2 may accordingly utilize any suitable mechanism to decrypt, verify, and/or otherwise utilize or present the secure message. In some embodiments, user device 101-2 may verify the signature on the secure message using PK1 (e.g., a public signing key), and decrypt the message with user biometrics-derived and session ID-derived private signing key (SK2) ephemerally generated by a fresh biometric capture (corresponding to PK2 held by user device 101-1). Thus, the system presents a method by which both parties must present fresh biometric captures for both sending and receiving messages. During sending, biometric capture is required to generate the private key to sign an encrypted message. During receiving, after signature verification, biometric capture is required to generate the private key to decrypt the message. This method ensures that both parties are absolutely sure who is on the other side of the connection.

Figure 18:
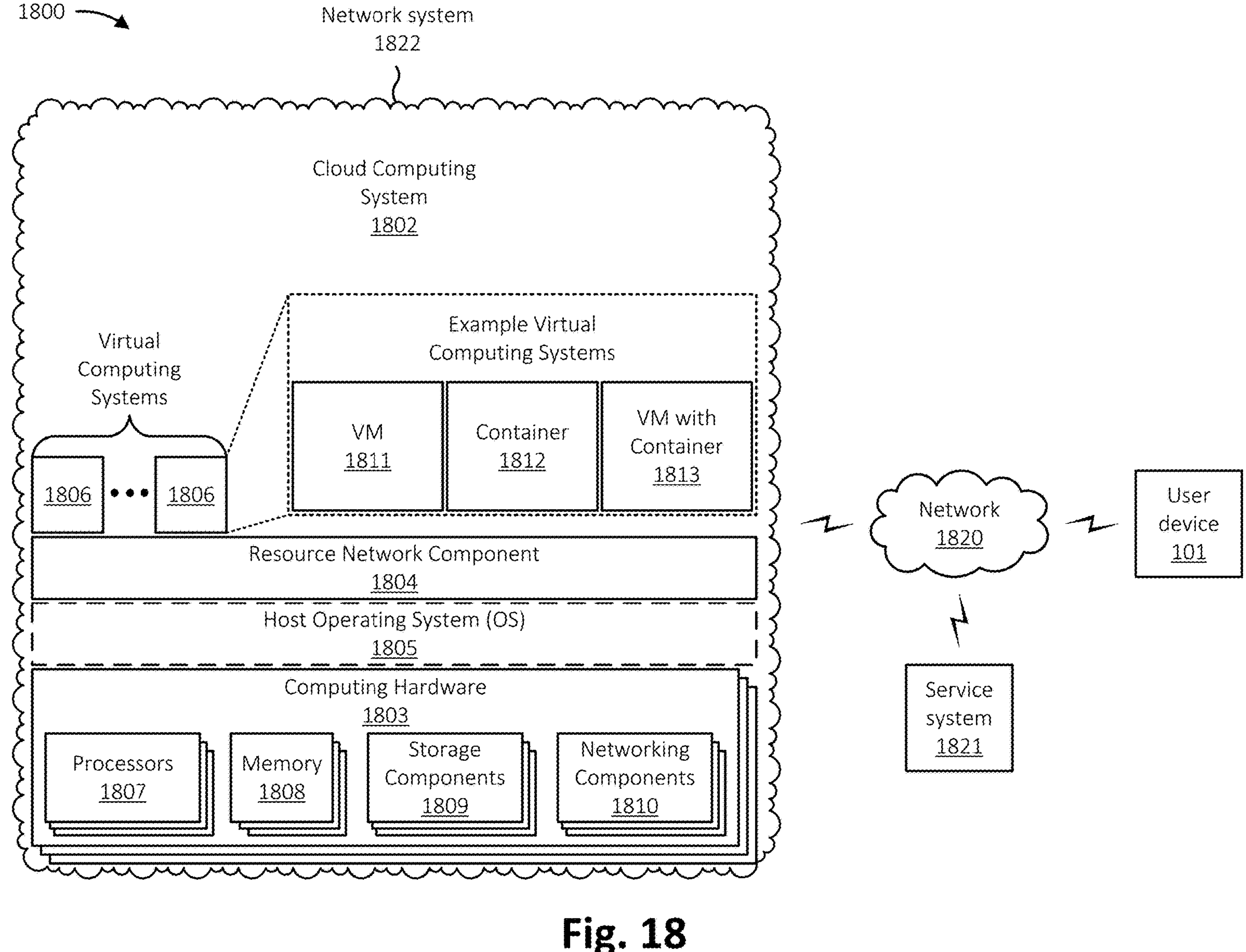
FIG. 18 is a diagram of an example environment in which systems and/or methods described herein may be implemented.

FIG. 18 is a diagram of an example environment 1800 in which systems and/or methods described herein may be implemented. As shown in FIG. 18, environment 1800 may include network system 1822, which may include one or more elements of and/or may execute within a cloud computing system 1802. Cloud computing system 1802 may include one or more elements 1803-1813, as described in more detail below. As further shown in FIG. 18, environment 1800 may include user device 101, service system 1821, and/or network 1820. Devices and/or elements of environment 1800 may interconnect via wired connections and/or wireless connections.

User device 101 may include one or more devices capable of receiving, generating, storing, processing, and/or providing information, as described elsewhere herein. User device 101 may include a communication device and/or a computing device. For example, user device 101 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

Service system 1821 may include one or more devices capable of receiving, generating, storing, processing, providing, and/or routing information, as described elsewhere herein. Service system 1821 may include a communication device and/or a computing device. For example, service system 1821 may include a server, such as an application server, a client server, a web server, a database server, a host server, a proxy server, a virtual server (e.g., executing on computing hardware), or a server in a cloud computing system. In some implementations, service system 1821 may include computing hardware used in a cloud computing environment, such as one or more serverless components (e.g., one or more serverless functions).

Cloud computing system 1802 includes computing hardware 1803, resource management component 1804, host operating system ("OS") 1805, and/or one or more virtual computing systems 1806. Cloud computing system 1802 may execute on, for example, an Amazon Web Services platform, a Microsoft Azure platform, or a Snowflake platform. Resource management component 1804 may perform virtualization (e.g., abstraction) of computing hardware 1803 to create the one or more virtual computing systems 1806. Using virtualization, resource management component 1804 enables a single computing device (e.g., a computer or a server) to operate like multiple computing devices, such as by creating multiple isolated virtual computing systems 1806 from computing hardware 1803 of the single computing device. In this way, computing hardware 1803 can operate more efficiently, with lower power consumption, higher reliability, higher availability, higher utilization, greater flexibility, and lower cost than using separate computing devices. In some embodiments, network system 1822 and/or service system 1821 may include or otherwise correspond to one or more devices described above, such as secure air-gapped storage 301, recovery system 507, application server 1201, deepfake verification system 1303, and/or message routing system 1401.

Computing hardware 1803 includes hardware and corresponding resources from one or more computing devices. For example, computing hardware 1803 may include hardware from a single computing device (e.g., a single server) or from multiple computing devices (e.g., multiple servers), such as multiple computing devices in one or more data centers. As shown, computing hardware 1803 may include one or more processors 1807, one or more memories 1808, one or more storage components 1809, and/or one or more networking components 1810. Examples of a processor, a memory, a storage component, and a networking component (e.g., a communication component) are described elsewhere herein.

Resource management component 1804 includes a virtualization application (e.g., executing on hardware, such as computing hardware 1803) capable of virtualizing computing hardware 1803 to start, stop, and/or manage one or more virtual computing systems 1806. For example, resource management component 1804 may include a hypervisor (e.g., a bare-metal or Type 1 hypervisor, a hosted or Type 2 hypervisor, or another type of hypervisor) or a virtual machine monitor, such as when virtual computing systems 1806 are virtual machines 1811. Additionally, or alternatively, resource management component 1804 may include a container manager, such as when virtual computing systems 1806 are containers 1812. In some implementations, resource management component 1804 executes within and/or in coordination with host operating system 1805.

Virtual computing system 1806 includes a virtual environment that enables cloud-based execution of operations and/or processes described herein using computing hardware 1803. As shown, virtual computing system 1806 may include virtual machine 1811, container 1812, or hybrid environment 1813 that includes a virtual machine and a container, among other examples. Virtual computing system 1806 may execute one or more applications using a file system that includes binary files, software libraries, and/or other resources required to execute applications on a guest operating system (e.g., within virtual computing system 1806) or host operating system 1805.

Although network system 1822 may include one or more elements 1803-1813 of cloud computing system 1802, may execute within cloud computing system 1802, and/or may be hosted within cloud computing system 1802, in some implementations, network system 1822 may not be cloud-based (e.g., may be implemented outside of a cloud computing system) or may be partially cloud-based. For example, network system 1822 may include one or more devices that are not part of cloud computing system 1802, such as device $d00 of FIG. $d, which may include a standalone server or another type of computing device. Network system 1822 may perform one or more operations and/or processes described in more detail elsewhere herein.

Network 1820 includes one or more wired and/or wireless networks. For example, network 1820 may include a cellular network, a public land mobile network ("PLMN"), a local area network ("LAN"), a wide area network ("WAN"), a private network, the Internet, and/or a combination of these or other types of networks. Network 1820 enables communication among the devices of environment 1800. In some implementations, network 1820 includes a network capable of providing network slices, such as a 5G core network.

The number and arrangement of devices and networks shown in FIG. 18 are provided as an example. In practice, there may be additional devices and/or networks, fewer devices and/or networks, different devices and/or networks, or differently arranged devices and/or networks than those shown in FIG. 18. Furthermore, two or more devices shown in FIG. 18 may be implemented within a single device, or a single device shown in FIG. 18 may be implemented as multiple, distributed devices. Additionally, or alternatively, a set of devices (e.g., one or more devices) of environment 1800 may perform one or more functions described as being performed by another set of devices of environment 1800.

Figure 19:
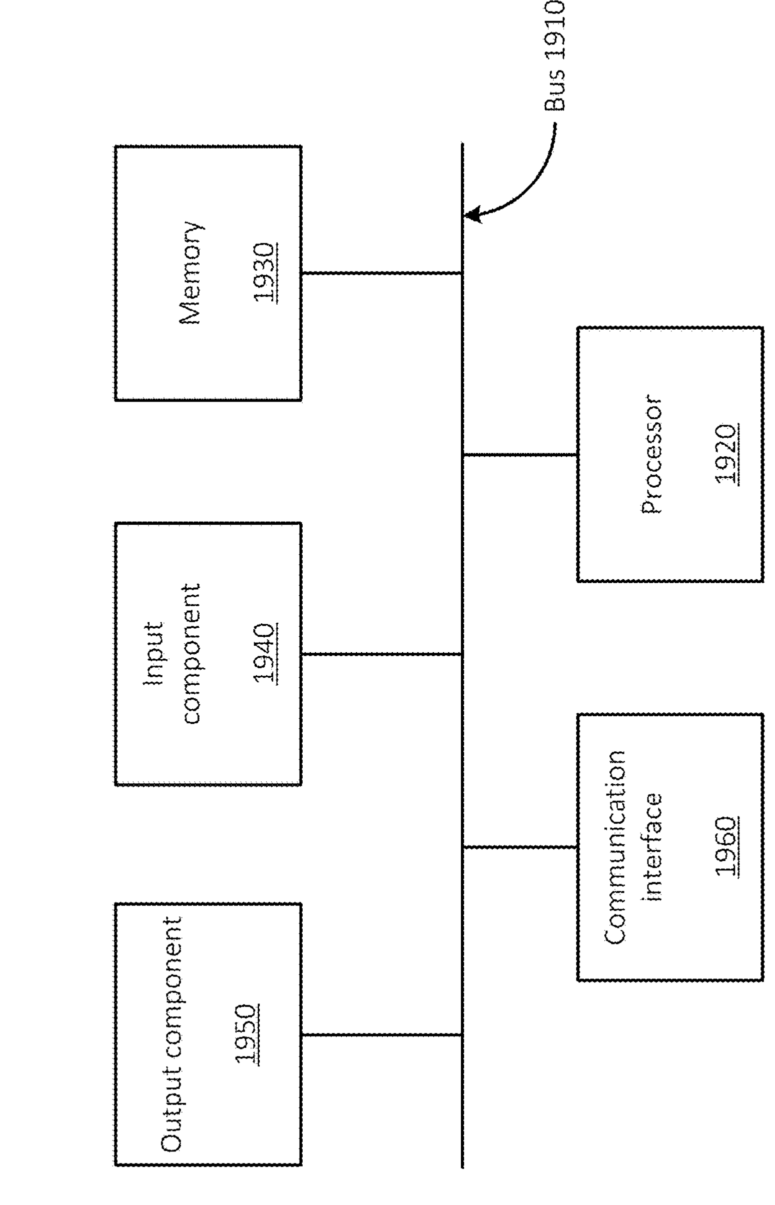
FIG. 19 is a diagram of example components of one or more devices.

FIG. 19 is a diagram of example components of a device 1900, which may correspond to user device 101, network system 1822, and/or service system 1821. In some implementations, user device 101, network system 1822, and/or service system 1821 may include one or more devices 1900 and/or one or more components of device 1900. As shown in FIG. 19, device 1900 may include bus 1910, processor 1920, memory 1930, input component 1940, output component 1950, and communication interface 1960. In another implementation, device 1900 may include additional, fewer, different, or differently arranged components.

Bus 1910 may include one or more communication paths that permit communication among the components of device 1900. Processor 1920 may include a processor, microprocessor, a set of provisioned hardware resources of a cloud computing system, a graphics processing unit ("GPU"), a GPU-based processing unit, a neural processing unit ("NPU"), or other suitable type of hardware that interprets and/or executes instructions (e.g., processor-executable instructions). In some embodiments, processor 1920 may be or may include one or more hardware processors. Memory 1930 may include any type of dynamic storage device that may store information and instructions for execution by processor 1920, and/or any type of non-volatile storage device that may store information for use by processor 1920.

Input component 1940 may include a mechanism that permits an operator to input information to device 1900 and/or other receives or detects input from a source external to input component 1940, such as a touchpad, a touchscreen, a keyboard, a keypad, a button, a switch, a microphone or other audio input component, etc. In some embodiments, input component 1940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1950 may include a mechanism that outputs information to the operator, such as a display, a speaker, one or more light emitting diodes ("LEDs"), etc.

Communication interface 1960 may include any transceiver-like mechanism that enables device 1900 to communicate with other devices and/or systems. For example, communication interface 1960 may include an Ethernet interface, an optical interface, a coaxial interface, or the like. Communication interface 1960 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1900 may include more than one communication interface 1960. For instance, device 1900 may include an optical interface, a wireless interface, an Ethernet interface, and/or one or more other interfaces.

Device 1900 may perform certain operations relating to one or more processes described above. Device 1900 may perform these operations in response to processor 1920 executing instructions, such as software instructions, processor-executable instructions, etc. stored in a computer-readable medium, such as memory 1930. A computer-readable medium may be defined as a non-transitory memory device. A memory device may include space within a single physical memory device or spread across multiple physical memory devices. The instructions may be read into memory 1930 from another computer-readable medium or from another device. The instructions stored in memory 1930 may be processor-executable instructions that cause processor 1920 to perform processes described herein. Alternatively, hardwired circuitry may be used in place of or in combination with software instructions to implement processes described herein. Thus, implementations described herein are not limited to any specific combination of hardware circuitry and software.

In some embodiments, one or more devices include one or more processors configured to execute processor-executable instructions that implement a decentralized and recoverable security architecture for protecting private user data. The device receives particular user biometrics associated with a user, such as facial scan data or fingerprint data, together with a personal identification number (PIN). Based on the particular user biometrics and the PIN, the device generates a first temporary cryptographic key. The device further generates a master password that serves as a root secret for protecting user data. A recovery token is generated to include the master password, and the recovery token is encrypted using the first temporary cryptographic key such that the master password is not accessible without re-derivation of the first temporary cryptographic key.

The device further generates a second temporary cryptographic key based on the master password and the particular user biometrics. Using the second temporary cryptographic key, the device generates a secure data store containing secure user data, such as cryptographic credentials, authentication secrets, or other sensitive information. The secure data store is encrypted using the second temporary cryptographic key. After generation of the recovery token and the secure data store, the device discards the first temporary cryptographic key and the second temporary cryptographic key without storing either key in persistent memory, thereby preventing later extraction of the keys from the device.

In some embodiments, the particular user biometrics used during initialization are first user biometrics. At a later time, the device may receive a request to add new secure data to the secure data store. In response, the device receives second user biometrics and the PIN. Based on the second user biometrics and the PIN, the device generates a temporary recovery key. The temporary recovery key is used to decrypt the recovery token in order to obtain the master password. Using the master password and the second user biometrics, the device generates a temporary update key. The device decrypts the existing secure data store and generates an updated secure data store that includes both previously stored secure data and the new secure data, wherein the updated secure data store is encrypted using the temporary update key.

In some embodiments, the device transmits the encrypted secure data store to a remote recovery system for storage. The remote recovery system stores the secure data store without access to the cryptographic keys required to decrypt its contents. At a later time, the device may receive an encoded version of the recovery token, such as a QR code, recovery file, or encoded string. The device decodes the encoded version to obtain the recovery token and decrypts the recovery token to extract a user identifier included within the recovery token. The device transmits the user identifier to the remote recovery system and receives the secure data store from the remote recovery system based on the user identifier.

In some embodiments, the remote recovery system maintains the secure data store in association with a hash of the user identifier rather than the plaintext user identifier. Upon receiving the user identifier from the device, the remote recovery system generates a hashed version of the received user identifier and compares it to the stored hash. The secure data store is provided to the device when the hashes match, thereby enabling retrieval without exposing the plaintext user identifier.

In some embodiments, the device further supports establishment of a secure communication session. The device generates a first public key based on the first user biometrics, wherein the first public key is cryptographically bound to the biometric characteristics of the user. The first public key is transmitted to a second device to initiate a secure communication session. The device may receive a second public key from the second device and transmit a session establishment request to a message routing system, wherein the session establishment request includes the first public key and the second public key. In response, the message routing system provides a session identifier and an activation bundle.

To process the activation bundle, the device generates an activation unlock key based on the first user biometrics. Using the activation unlock key, the device decrypts the activation bundle to obtain a first activation token. The device associates the first activation token with the session identifier in a local session table. The device transmits a session activation request to the message routing system that includes the first activation token. Once the session is activated, the device outputs secure messages associated with the session identifier, wherein the message routing system routes the secure messages based on the activation token without requiring direct addressing between communicating devices.

The described functionality may be implemented by one or more devices, as a method performed by one or more processors, or as processor-executable instructions stored on a non-transitory computer-readable medium. When executed, the processor-executable instructions cause the processors to perform the described biometric-based key derivation, recovery token generation, secure data store encryption and updating, key discarding, remote recovery, and secure communication session establishment.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks, operations, and/or signals have been described above (e.g., with regard to FIGS. 1-17B), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

While certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent that the phrase "at least one of" is used herein (e.g., "at least one of" a list of items), such phrase refers to any combination of those items, including single members. As an example, "at least one of: A, B, or C" is intended to cover combinations or scenarios such as A only; B only; C only; A and B; A and C; B and C; and A, B, and C. Depending on context, such scenarios may include multiple instances of the same item.

To the extent that "thresholds" (or a "threshold") are described herein, "satisfying" a given threshold may refer to a value being greater than threshold, greater than or equal to the threshold, less than threshold, less than or equal to the threshold, equal to the threshold, not equal to the threshold, or otherwise having a relationship to the threshold, where such relationship is apparent from the context of the discussion of the threshold being satisfied.

To the extent that the above description discusses "selectively" performing an operation, the selective performance of the operation refers to either performing the operation or refraining from (e.g., forgoing) performing the operation. For example, selectively performing an operation based on whether a condition is satisfied means performing the operation if the condition is satisfied, and refraining from performing the operation (e.g., not performing the operation) if the condition is not satisfied. Thus, selectively performing an operation may include determining whether to perform the operation and either performing the operation or refraining from performing the operation based on such determination.

On a similar note, to the extent that the above description discusses selectively performing a first operation or a second operation, such description means performing either the first operation or the second operation. For example, selectively performing a first operation or a second operation based on whether a condition is satisfied means performing the first operation if the condition is satisfied and performing the second operation is performed if the condition is not satisfied. Thus, selectively performing a first operation or a second operation may include determining whether to perform either the first operation or the second operation and then performing either the first operation or the second operation based on that determination. As apparent from the context of such discussion, selectively performing the operation may be an exclusive performance of either the first operation or the second operation. For example, the first operation may be performed in lieu of the second operation if the condition is satisfied (e.g., the second operation is not performed if the condition is satisfied), and the second operation may be performed in lieu of the first operation if the condition is not satisfied (e.g., the first operation is not performed if the condition is not satisfied).

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set. Concepts described above may be embodied by, for example, a device, devices, a system, systems, a method, methods, a non-transitory computer-readable medium, and/or non-transitory computer-readable media, as provided for in the claims.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. One or more devices, comprising:

one or more processors configured to execute a set of processor-executable instructions, wherein executing the set of processor-executable instructions causes the one or more processors to:

receive particular user biometrics and a personal identification number ("PIN");

generate a first temporary key based on the particular user biometrics and the PIN;

generate a master password;

generate a recovery token that includes the master password, wherein the recovery token is encrypted using the first temporary key;

generate a second temporary key based on the master password and the particular user biometrics;

generate a secure data store, wherein the secure data store is encrypted using the second temporary key:

discard the first temporary key and the second temporary key without storing the first temporary key and further without storing the second temporary key;

generate a first public key based on the particular user biometrics, wherein the first public key is cryptographically bound to the particular user biometrics;

transmit the first public key to a second device to initiate a secure communication session;

receive a second public key from the second device;

transmit a session establishment request to a message routing system, wherein the session establishment request includes the first public key and the second public key; and receive, from the message routing system, a session identifier and an activation bundle.

2. The one or more devices of claim 1, wherein the particular user biometrics are first user biometrics, wherein executing the set of processor-executable instructions further causes the one or more processors to:

receive a request to add new secure data to the secure data store;

receive second user biometrics and the PIN;

generate a temporary recovery key based on the second user biometrics and the PIN;

decrypt the recovery token, using the temporary recovery key, to obtain the master password;

generate a temporary update key based on the master password and the second user biometrics; and generate an updated secure data store that includes the secure data and the new secure data, wherein the updated secure data store is encrypted using the temporary update key.

3. The one or more devices of claim 1, wherein the particular user biometrics are first user biometrics, wherein the recovery token further includes a user identifier, wherein executing the set of processor-executable instructions further causes the one or more processors to:

encode the recovery token to generate an encoded version of the recovery token;

output the encoded version of the recovery token;

transmit the secure data store to a remote recovery system for storage;

subsequently receive the encoded version of the recovery token;

decode the subsequently received encoded version to obtain a decoded recovery token;

receive second user biometrics and the PIN;

generate a temporary recovery key based on the second user biometrics and the PIN;

decrypt the decoded recovery token, using the temporary recovery key;

obtain, from the decrypted decoded recovery token, the user identifier;

transmit the user identifier to the remote recovery system; and receive the secure data store from the remote recovery system based on the user identifier.

4. The one or more devices of claim 3, wherein the remote recovery system:

maintains the secure data store with a hash of the user identifier, generates a hashed version of the user identifier transmitted to the remote recovery system, and provides the secure data store based on identifying that the hash of the user identifier, maintained with the secure data store, matches the hashed version of the user identifier transmitted to the remote recovery system.

5. The one or more devices of claim 1, wherein executing the set of processor-executable instructions further causes the one or more processors to:

generate an activation unlock key based on the particular user biometrics;

decrypt the activation bundle using the activation unlock key to obtain a first activation token; and associate the first activation token with the session identifier in a local session table.

6. The one or more devices of claim 5, wherein executing the set of processor-executable instructions further causes the one or more processors to:

transmit a session activation request to the message routing system, wherein the session activation request includes the first activation token; and output a secure message associated with the session identifier, wherein the secure message is routed by the message routing system based on the first activation token.

7. A non-transitory computer-readable medium, storing a plurality of processor-executable instructions to:

receive particular user biometrics and a personal identification number ("PIN");

generate a first temporary key based on the particular user biometrics and the PIN;

generate a master password;

generate a recovery token that includes the master password, wherein the recovery token is encrypted using the first temporary key:

generate a second temporary key based on the master password and the particular user biometrics;

generate a secure data store, wherein the secure data store is encrypted using the second temporary key;

discard the first temporary key and the second temporary key without storing the first temporary key and further without storing the second temporary key;

generate a first public key based on the particular user biometrics, wherein the first public key is cryptographically bound to the particular user biometrics;

transmit the first public key to a second device to initiate a secure communication session;

receive a second public key from the second device;

transmit a session establishment request to a message routing system, wherein the session establishment request includes the first public key and the second public key; and receive, from the message routing system, a session identifier and an activation bundle.

8. The non-transitory computer-readable medium of claim 7, wherein the particular user biometrics are first user biometrics, wherein the plurality of processor-executable instructions further include instructions to:

receive a request to add new secure data to the secure data store;

receive second user biometrics and the PIN;

generate a temporary recovery key based on the second user biometrics and the PIN;

decrypt the recovery token using the temporary recovery key to obtain the master password;

generate a temporary update key based on the master password and the second user biometrics; and generate an updated secure data store that includes the secure data and the new secure data, wherein the updated secure data store is encrypted using the temporary update key.

9. The non-transitory computer-readable medium of claim 7, wherein the particular user biometrics are first user biometrics, wherein the recovery token further includes a user identifier, wherein the plurality of processor-executable instructions further include instructions to:

encode the recovery token to generate an encoded version of the recovery token;

output the encoded version of the recovery token;

transmit the secure data store to a remote recovery system for storage;

subsequently receive the encoded version of the recovery token;

decode the subsequently received encoded version to obtain a decoded recovery token;

receive second user biometrics and the PIN;

generate a temporary recovery key based on the second user biometrics and the PIN;

decrypt the decoded recovery token, using the temporary recovery key;

obtain, from the decrypted decoded recovery token, the user identifier;

transmit the user identifier to the remote recovery system; and receive the secure data store from the remote recovery system based on the user identifier.

10. The non-transitory computer-readable medium of claim 9, wherein the remote recovery system:

maintains the secure data store with a hash of the user identifier, generates a hashed version of the user identifier transmitted to the remote recovery system, and provides the secure data store based on identifying that the hash of the user identifier, maintained with the secure data store, matches the hashed version of the user identifier transmitted to the remote recovery system.

11. The non-transitory computer-readable medium of claim 7, wherein the plurality of processor-executable instructions further include instructions to:

generate an activation unlock key based on the first particular user biometrics;

decrypt the activation bundle using the activation unlock key to obtain a first activation token; and associate the first activation token with the session identifier in a local session table.

12. The non-transitory computer-readable medium of claim 11, wherein the plurality of processor-executable instructions further include instructions to:

transmit a session activation request to the message routing system, wherein the session activation request includes the first activation token; and output a secure message associated with the session identifier, wherein the secure message is routed by the message routing system based on the first activation token.

13. A method, comprising:

receiving particular user biometrics and a personal identification number ("PIN");

generating a first temporary key based on the particular user biometrics and the PIN;

generating a master password;

generating a recovery token that includes the master password, wherein the recovery token is encrypted using the first temporary key;

generating a second temporary key based on the master password and the particular user biometrics;

generating a secure data store, wherein the secure data store is encrypted using the second temporary key;

discarding the first temporary key and the second temporary key without storing the first temporary key and further without storing the second temporary key;

generating a first public key based on the particular user biometrics, wherein the first public key is cryptographically bound to the particular user biometrics;

transmitting the first public key to a second device to initiate a secure communication session;

receiving a second public key from the second device;

transmitting a session establishment request to a message routing system, wherein the session establishment request includes the first public key and the second public key; and receiving, from the message routing system, a session identifier and an activation bundle.

14. The method of claim 13, wherein the particular user biometrics are first user biometrics, wherein the method further comprises:

receiving a request to add new secure data to the secure data store;

receiving second user biometrics and the PIN;

generating a temporary recovery key based on the second user biometrics and the PIN;

decrypting the recovery token, using the temporary recovery key, to obtain the master password;

generating a temporary update key based on the master password and the second user biometrics; and generating an updated secure data store that includes the secure data and the new secure data, wherein the updated secure data store is encrypted using the temporary update key.

15. The method of claim 13, further comprising:

encoding the recovery token to generate an encoded version of the recovery token;

outputting the encoded version of the recovery token; and transmitting the secure data store to a remote recovery system for storage.

16. The method of claim 15, further comprising:

subsequently receiving the encoded version of the recovery token; and decoding the subsequently received encoded version to obtain a decoded recovery token.

17. The method of claim 16, wherein the recovery token further includes a user identifier, the method further comprising:

receiving second user biometrics and the PIN;

generating a temporary recovery key based on the second user biometrics and the PIN;

decrypting the decoded recovery token, using the temporary recovery key; and obtaining, from the decrypted decoded recovery token, the user identifier.

18. The method of claim 17, further comprising:

transmitting the user identifier, obtained from the decrypted decoded recovery token, to the remote recovery system; and receiving the secure data store from the remote recovery system based on the transmitted user identifier.

19. The method of claim 13, further comprising:

generating an activation unlock key based on the particular user biometrics;

decrypting the activation bundle using the activation unlock key to obtain a first activation token; and associating the first activation token with the session identifier in a local session table.

20. The method of claim 19, further comprising:

transmitting a session activation request to the message routing system, wherein the session activation request includes the first activation token; and outputting a secure message associated with the session identifier, wherein the secure message is routed by the message routing system based on the first activation token.

* * * * *